(12) United States Patent
Sturman et al.

(10) Patent No.: US 8,794,579 B2
(45) Date of Patent: Aug. 5, 2014

(54) SUPPORT ARM ASSEMBLY

(75) Inventors: Lane Sturman, Allegan, MI (US); Dan R. Tatman, Jenison, MI (US); Erik R. Peterson, Spring Lake, MI (US); Greg Lok, Jension, MI (US)

(73) Assignee: Steelcase, Inc., Grand Rapids, MI (US)

( * ) Notice: Subject to any disclaimer, the term of this patent is extended or adjusted under 35 U.S.C. 154(b) by 1845 days.

(21) Appl. No.: 11/445,804

(22) Filed: Jun. 2, 2006

(65) Prior Publication Data

US 2007/0040084 A1    Feb. 22, 2007

Related U.S. Application Data

(60) Provisional application No. 60/687,061, filed on Jun. 3, 2005.

(51) Int. Cl.
*E04G 3/00* (2006.01)

(52) U.S. Cl.
USPC ............... 248/284.1; 248/160; 248/282.1; 248/921

(58) Field of Classification Search
USPC ............ 248/276.1, 282.1, 284.1, 286.1, 918, 248/921, 922, 160
See application file for complete search history.

(56) References Cited

U.S. PATENT DOCUMENTS

| | | |
|---|---|---|
| 241,925 A | 5/1881 | Cadwell |
| 419,521 A | 1/1890 | Heald et al. |
| 818,982 A | 4/1906 | Skelley |
| 892,612 A | 7/1908 | O'Neill |
| 895,834 A | 8/1908 | Aungst |
| 1,063,220 A | 6/1913 | Seamon |
| 1,252,207 A | 1/1918 | Walker |
| 1,328,677 A | 1/1920 | Hodnv |
| 1,682,180 A | 8/1928 | Merrill |
| 1,733,107 A | 10/1929 | Ahlberg |
| 1,797,847 A | 3/1931 | Vandagriff |
| 1,826,162 A | 10/1931 | Balk |
| 2,248,410 A | 7/1941 | Moeller |
| 2,287,577 A | 6/1942 | Stava |
| 2,326,558 A | 8/1943 | Pelz |
| 2,588,009 A | 3/1952 | Jones |
| 2,615,664 A | 10/1952 | Reeves |

(Continued)

FOREIGN PATENT DOCUMENTS

| | | |
|---|---|---|
| CH | 674670 A5 | 6/1990 |
| DE | 2002017 A | 7/1971 |

(Continued)

OTHER PUBLICATIONS

Ergotron, Inc., "Total Computer Management Solutions: Ergotron Products," Brochure, 6 Pgs., St. Paul, Minnesota.

(Continued)

*Primary Examiner* — Gwendolyn W Baxter
(74) *Attorney, Agent, or Firm* — Quarles & Brady LLP

(57) ABSTRACT

An assembly for supporting a device for movement between several positions, the assembly comprising a first four-bar subassembly including proximate and distal ends and a second four-bar subassembly including proximate and distal ends and first and second link members that pivot about substantially parallel axis, the distal end of the first four-bar subassembly linked to the proximate end of the second four-bar subassembly for rotation about an additional axis that is substantially perpendicular to the parallel axis.

51 Claims, 16 Drawing Sheets

(56) References Cited

U.S. PATENT DOCUMENTS

| | | |
|---|---|---|
| 2,950,892 A | 10/1956 | Rick |
| 2,897,928 A | 8/1959 | Guenther |
| 2,939,364 A | 6/1960 | Doswell |
| 2,941,776 A | 6/1960 | Lauterbach |
| 3,072,374 A | 1/1963 | Bodian |
| 3,131,251 A | 4/1964 | Ryan |
| 3,139,311 A | 6/1964 | Melton et al. |
| 3,269,684 A | 8/1966 | Iggulden |
| 3,345,461 A | 10/1967 | Bunting |
| 3,358,957 A | 12/1967 | Lindenmuth |
| 3,376,007 A | 4/1968 | Chesterley |
| 3,399,856 A | 9/1968 | Pecaut |
| 3,409,261 A | 11/1968 | Leporati |
| 3,436,046 A | 4/1969 | Valeska |
| 3,498,577 A | 3/1970 | Mehr |
| 3,533,583 A | 10/1970 | Azim |
| 3,550,892 A | 12/1970 | Propst |
| 3,595,511 A | 7/1971 | Summerville, Jr. |
| 3,608,462 A | 9/1971 | Groshong |
| 3,622,116 A | 11/1971 | Fellows |
| 3,662,981 A | 5/1972 | Hogrebe |
| 3,712,669 A | 1/1973 | Cates |
| 3,762,051 A | 10/1973 | Valeska |
| 3,774,873 A | 11/1973 | Krogsrud |
| 3,799,489 A | 3/1974 | Goerditz |
| 3,820,752 A | 6/1974 | Oram |
| 3,829,184 A | 8/1974 | Chevret |
| D233,990 S | 12/1974 | Booth |
| 3,862,734 A | 1/1975 | Buchin |
| 3,881,677 A | 5/1975 | Ihlenfeld |
| 3,896,576 A | 7/1975 | Wolf et al. |
| 3,981,340 A | 9/1976 | Anderson et al. |
| 3,986,263 A | 10/1976 | Borgelt |
| 4,062,470 A | 12/1977 | Boteler |
| 4,082,244 A | 4/1978 | Groff |
| 4,113,217 A | 9/1978 | O'Connell |
| 4,122,956 A | 10/1978 | Hargrove |
| 4,160,536 A | 7/1979 | Krogsrud |
| 4,166,602 A | 9/1979 | Nilsen et al. |
| 4,185,801 A | 1/1980 | Plymoth |
| 4,234,150 A | 11/1980 | Mee et al. |
| 4,266,747 A | 5/1981 | Souder, Jr. et al. |
| 4,305,563 A | 12/1981 | Presson |
| 4,307,672 A | 12/1981 | Shikimi |
| 4,328,536 A | 5/1982 | Wallmark |
| 4,331,062 A | 5/1982 | Rogers |
| 4,346,868 A | 8/1982 | Lindner |
| 4,397,439 A | 8/1983 | Wilbur et al. |
| 4,437,144 A | 3/1984 | Guenther |
| 4,447,031 A | 5/1984 | Souder, Jr. et al. |
| 4,455,008 A | 6/1984 | MacKew |
| 4,487,389 A | 12/1984 | Ziegler |
| 4,516,751 A | 5/1985 | Westbrook |
| 4,523,732 A | 6/1985 | Biber et al. |
| 4,525,052 A | 6/1985 | Kosugi |
| 4,527,942 A | 7/1985 | Smith |
| 4,535,577 A | 8/1985 | Tenser et al. |
| 4,543,739 A | 10/1985 | Zerhoch |
| 4,548,373 A | 10/1985 | Komura |
| 4,561,619 A | 12/1985 | Robillard et al. |
| 4,562,987 A | 1/1986 | Leeds et al. |
| 4,591,122 A | 5/1986 | Kreuzer |
| 4,637,666 A | 1/1987 | Worrell |
| 4,638,969 A | 1/1987 | Brown |
| 4,645,167 A | 2/1987 | Hardwick |
| 4,657,217 A | 4/1987 | Kiesel et al. |
| 4,659,048 A | 4/1987 | Fahrion |
| 4,660,793 A | 4/1987 | Mark |
| 4,687,166 A | 8/1987 | Poehler |
| 4,687,167 A | 8/1987 | Skalka et al. |
| 4,690,362 A | 9/1987 | Helgeland |
| 4,691,886 A | 9/1987 | Wendling et al. |
| 4,695,024 A | 9/1987 | Haven |
| 4,697,783 A | 10/1987 | Kastendieck et al. |
| 4,700,922 A | 10/1987 | Gross |
| 4,703,909 A | 11/1987 | Dayton et al. |
| 4,708,312 A | 11/1987 | Rohr |
| 4,729,533 A | 3/1988 | Hillary et al. |
| 4,733,618 A | 3/1988 | Sarro et al. |
| D295,415 S | 4/1988 | Thies et al. |
| 4,746,836 A | 5/1988 | Emberson |
| 4,747,025 A | 5/1988 | Barton |
| 4,749,364 A | 6/1988 | Arney |
| 4,768,744 A | 9/1988 | Leeds et al. |
| 4,770,384 A | 9/1988 | Kuwazima et al. |
| 4,783,036 A | 11/1988 | Vossoughi |
| 4,795,120 A | 1/1989 | Kuzuya et al. |
| 4,797,916 A | 1/1989 | Kojima |
| 4,817,903 A | 4/1989 | Braehler et al. |
| 4,834,329 A | 5/1989 | Delapp |
| 4,836,478 A | 6/1989 | Sweere |
| 4,836,486 A | 6/1989 | Vossoughi et al. |
| 4,844,387 A | 7/1989 | Sorgi et al. |
| 4,844,388 A | 7/1989 | Kuba et al. |
| 4,846,434 A | 7/1989 | Krogsrud |
| 4,852,842 A | 8/1989 | O'Neill |
| 4,854,538 A | 8/1989 | Von Schalscha |
| D303,661 S | 9/1989 | Manabe et al. |
| 4,863,124 A | 9/1989 | Ball et al. |
| 4,876,835 A | 10/1989 | Kelley et al. |
| 4,903,222 A | 2/1990 | Carter |
| 4,929,973 A | 5/1990 | Nakatani |
| 4,936,533 A | 6/1990 | Adams |
| 4,942,356 A | 7/1990 | Ellingen |
| 4,950,100 A | 8/1990 | Horgas |
| 4,953,822 A | 9/1990 | Sharber et al. |
| 4,974,808 A | 12/1990 | Ball |
| 4,977,848 A | 12/1990 | Currey |
| D313,431 S | 1/1991 | Jaskiel, Jr. et al. |
| D314,505 S | 2/1991 | Chen |
| 4,989,813 A | 2/1991 | Kim et al. |
| 4,994,943 A | 2/1991 | Aspenwall |
| 5,007,608 A | 4/1991 | Carroll, Jr. |
| 5,026,016 A | 6/1991 | Lisowski |
| 5,029,941 A | 7/1991 | Twisselmann |
| 5,033,707 A | 7/1991 | Strater et al. |
| 5,035,627 A | 7/1991 | Burnett |
| D321,179 S | 10/1991 | Oyama |
| D322,603 S | 12/1991 | Uede et al. |
| D323,323 S | 1/1992 | Klaebel |
| D323,324 S | 1/1992 | Suda |
| 5,078,055 A | 1/1992 | Bellini |
| 5,086,958 A | 2/1992 | Nagy |
| 5,092,552 A | 3/1992 | Dayton et al. |
| 5,094,349 A | 3/1992 | DeVito |
| 5,094,649 A | 3/1992 | Hall |
| 5,108,063 A | 4/1992 | Koerber, Sr. et al. |
| D326,847 S | 6/1992 | Savio |
| 5,121,698 A | 6/1992 | Kelley |
| 5,123,621 A | 6/1992 | Gates |
| 5,128,662 A | 7/1992 | Failla |
| 5,144,290 A | 9/1992 | Honda et al. |
| 5,165,644 A | 11/1992 | Allen |
| 5,168,429 A | 12/1992 | Hosoi |
| 5,174,223 A | 12/1992 | Nagy |
| 5,177,616 A | 1/1993 | Riday |
| 5,206,790 A | 4/1993 | Thomas |
| D337,103 S | 7/1993 | Harper |
| 5,233,502 A | 8/1993 | Beatty |
| D340,235 S | 10/1993 | Robak et al. |
| 5,265,952 A | 11/1993 | Greshem et al. |
| D343,168 S | 1/1994 | Morisaki et al. |
| 5,289,378 A | 2/1994 | Miller |
| 5,340,252 A * | 8/1994 | Weddendorf ............... 411/267 |
| 5,352,033 A | 10/1994 | Gresham et al. |
| 5,370,622 A | 12/1994 | Livingston |
| 5,375,749 A | 12/1994 | Oliva |
| 5,377,598 A | 1/1995 | Kirchner et al. |
| 5,381,043 A | 1/1995 | Kohiyama |
| 5,392,350 A | 2/1995 | Swanson |
| 5,400,991 A | 3/1995 | Werner |
| 5,400,993 A | 3/1995 | Hamilton |
| 5,406,063 A | 4/1995 | Jelen |
| 5,408,382 A | 4/1995 | Schultz |

(56) References Cited

U.S. PATENT DOCUMENTS

| | | |
|---|---|---|
| 5,418,684 A | 5/1995 | Koenck |
| 5,428,597 A | 6/1995 | Satoh |
| 5,429,336 A | 7/1995 | Ko |
| 5,433,416 A | 7/1995 | Johnson |
| 5,452,180 A | 9/1995 | Register |
| 5,467,102 A | 11/1995 | Kuno |
| 5,494,447 A | 2/1996 | Zaidan |
| 5,501,420 A | 3/1996 | Watt et al. |
| 5,529,271 A | 6/1996 | Dunchock |
| 5,535,274 A | 7/1996 | Braitberg |
| 5,537,127 A | 7/1996 | Jingu |
| 5,537,209 A | 7/1996 | Lis |
| 5,537,290 A | 7/1996 | Brown |
| 5,553,820 A | 9/1996 | Karten et al. |
| 5,576,687 A | 11/1996 | Blank |
| 5,583,529 A | 12/1996 | Satou |
| 5,590,021 A | 12/1996 | Register |
| 5,608,863 A | 3/1997 | Ishizawa |
| 5,610,979 A | 3/1997 | Yu |
| 5,630,566 A | 5/1997 | Case |
| D380,959 S | 7/1997 | Mitchell |
| 5,649,834 A | 7/1997 | Allison |
| 5,655,736 A | 8/1997 | Kozloff |
| 5,668,570 A | 9/1997 | Ditzik |
| 5,673,170 A | 9/1997 | Register |
| 5,687,939 A | 11/1997 | Moscovitch |
| 5,697,588 A | 12/1997 | Gonzalez |
| D388,762 S | 1/1998 | Nagy |
| 5,704,581 A | 1/1998 | Chen |
| 5,738,316 A | 4/1998 | Sweere et al. |
| 5,738,613 A | 4/1998 | Clayton |
| 5,743,503 A | 4/1998 | Voeller et al. |
| 5,743,505 A | 4/1998 | Sofy |
| 5,745,340 A | 4/1998 | Landau |
| 5,751,546 A | 5/1998 | Clark |
| 5,751,548 A | 5/1998 | Hall |
| D395,298 S | 6/1998 | Rosen |
| 5,765,794 A | 6/1998 | Chen |
| 5,772,174 A | 6/1998 | Hirsch |
| 5,779,305 A | 7/1998 | Hocking |
| 5,787,168 A | 7/1998 | Lien |
| 5,797,568 A | 8/1998 | Canton Gongora |
| 5,799,914 A | 9/1998 | Chivallier |
| 5,805,415 A | 9/1998 | Tran et al. |
| 5,810,712 A | 9/1998 | Dunn |
| 5,812,368 A | 9/1998 | Chen |
| 5,815,735 A | 9/1998 | Baker |
| 5,826,846 A | 10/1998 | Buccieri et al. |
| 5,842,672 A | 12/1998 | Sweere et al. |
| 5,850,954 A | 12/1998 | Dong-Joo |
| 5,854,735 A | 12/1998 | Cheng |
| 5,858,851 A | 1/1999 | Yamagata |
| 5,859,628 A | 1/1999 | Ross |
| 5,876,008 A | 3/1999 | Sweere et al. |
| 5,888,087 A | 3/1999 | Hanson |
| 5,904,328 A | 5/1999 | Leveridge et al. |
| 5,905,477 A | 5/1999 | Kuwayama |
| 5,910,882 A | 6/1999 | Burrell |
| 5,917,435 A | 6/1999 | Kamiya |
| 5,918,841 A | 7/1999 | Sweere |
| 5,923,528 A | 7/1999 | Lee |
| 5,924,665 A | 7/1999 | Sweere et al. |
| 5,933,812 A | 8/1999 | Meyer |
| 5,941,493 A | 8/1999 | Cheng |
| 5,947,429 A | 9/1999 | Sweere et al. |
| 5,947,440 A | 9/1999 | Cho |
| D415,768 S | 10/1999 | Howell |
| 5,961,219 A | 10/1999 | Maughan |
| 5,975,472 A | 11/1999 | Hung |
| 5,992,809 A | 11/1999 | Sweere et al. |
| 6,012,693 A | 1/2000 | Voeller et al. |
| 6,015,120 A | 1/2000 | Sweere et al. |
| 6,019,332 A | 2/2000 | Sweere et al. |
| 6,020,867 A | 2/2000 | Shimada |
| 6,024,335 A | 2/2000 | Min |
| 6,042,414 A | 3/2000 | Kunert |
| 6,056,248 A | 5/2000 | Ma |
| 6,061,104 A | 5/2000 | Evanicky et al. |
| 6,062,518 A | 5/2000 | Etue |
| 6,070,843 A | 6/2000 | Rosen |
| 6,076,785 A | 6/2000 | Oddsen, Jr. |
| 6,102,348 A | 8/2000 | O'Neill |
| 6,108,195 A | 8/2000 | Behl et al. |
| 6,108,200 A | 8/2000 | Fullerton |
| 6,134,103 A | 10/2000 | Ghanma |
| 6,138,041 A | 10/2000 | Yahia |
| 6,138,970 A | 10/2000 | Sohrt et al. |
| 6,152,048 A | 11/2000 | Vander Park |
| RE36,978 E | 12/2000 | Moscovitch |
| 6,155,722 A | 12/2000 | Nonomura |
| 6,166,722 A | 12/2000 | Kawabe |
| 6,168,250 B1 | 1/2001 | Rogov |
| 6,173,933 B1 | 1/2001 | Whiteside et al. |
| 6,188,789 B1 | 2/2001 | Marianetti, II |
| 6,189,842 B1 | 2/2001 | Bergeron Gull |
| 6,189,849 B1 | 2/2001 | Sweere |
| 6,189,850 B1 | 2/2001 | Liao |
| 6,212,067 B1 | 4/2001 | Nakajima |
| 6,216,989 B1 | 4/2001 | Shioya |
| 6,222,507 B1 | 4/2001 | Gouko |
| 6,254,302 B1 | 7/2001 | Kraus |
| 6,273,383 B1 | 8/2001 | Oddsen, Jr. |
| 6,281,804 B1 | 8/2001 | Haller |
| D448,370 S | 9/2001 | Kim |
| 6,283,428 B1 * | 9/2001 | Maples et al. ............. 248/282.1 |
| 6,286,794 B1 | 9/2001 | Harbin |
| 6,288,891 B1 | 9/2001 | Hasegawa et al. |
| 6,299,041 B1 | 10/2001 | Pitisi |
| 6,321,158 B1 | 11/2001 | DeLorme |
| 6,343,006 B1 | 1/2002 | Moscovitch |
| 6,347,433 B1 | 2/2002 | Novin |
| 6,366,453 B1 | 4/2002 | Wang |
| 6,367,756 B1 | 4/2002 | Wang |
| 6,371,424 B1 | 4/2002 | Shaw |
| 6,378,829 B1 | 4/2002 | Strater et al. |
| 6,394,403 B1 | 5/2002 | Hung |
| 6,400,560 B1 | 6/2002 | Chian |
| 6,409,134 B1 | 6/2002 | Oddsen |
| 6,418,010 B1 | 7/2002 | Sawyer |
| 6,419,196 B1 | 7/2002 | Sweere et al. |
| 6,426,872 B1 | 7/2002 | Sutton |
| 6,443,408 B1 | 9/2002 | Hung |
| 6,464,185 B1 | 10/2002 | Minelli |
| 6,476,884 B1 | 11/2002 | Shao |
| 6,478,274 B1 | 11/2002 | Oddsen, Jr. |
| 6,478,275 B1 | 11/2002 | Huang |
| 6,489,950 B1 | 12/2002 | Griffin |
| 6,499,704 B2 | 12/2002 | Oddsen, Jr. |
| 6,505,988 B1 | 1/2003 | Oddsen, Jr. |
| 6,506,988 B2 | 1/2003 | Sato |
| 6,543,734 B2 | 4/2003 | Yeh |
| 6,554,238 B1 | 4/2003 | Hibberd |
| 6,559,829 B1 | 5/2003 | Matsuo |
| 6,561,600 B1 | 5/2003 | Seeley et al. |
| 6,592,090 B1 | 7/2003 | Li |
| D478,088 S | 8/2003 | Hamouz |
| 6,609,465 B2 | 8/2003 | Kolavo |
| 6,609,691 B2 | 8/2003 | Oddsen, Jr. |
| 6,619,606 B2 | 9/2003 | Oddsen, Jr. et al. |
| 6,654,068 B1 | 11/2003 | Brewington |
| 6,655,645 B1 | 12/2003 | Lu |
| 6,672,553 B1 | 1/2004 | Lin |
| 6,695,270 B1 | 2/2004 | Smed |
| 6,695,274 B1 | 2/2004 | Chiu |
| 6,702,238 B1 | 3/2004 | Wang |
| 6,702,604 B1 | 3/2004 | Moscovitch |
| 6,712,321 B1 | 3/2004 | Su |
| 6,719,253 B2 | 4/2004 | Oddsen, Jr. |
| 6,726,167 B2 | 4/2004 | Oddsen, Jr. |
| D489,716 S | 5/2004 | Kim |
| 6,736,364 B2 | 5/2004 | Oddsen, Jr. |
| 6,739,096 B2 | 5/2004 | Feldpausch et al. |
| D491,952 S | 6/2004 | Oddsen et al. |
| 6,752,363 B2 | 6/2004 | Boele |

(56) References Cited

U.S. PATENT DOCUMENTS

| | | |
|---|---|---|
| 6,758,454 B2 | 7/2004 | Smed |
| 6,766,994 B2 | 7/2004 | Serbinski et al. |
| 6,772,983 B1 | 8/2004 | Liao |
| 6,783,105 B2 | 8/2004 | Oddsen, Jr. |
| 6,796,537 B1 | 9/2004 | Lin |
| D497,167 S | 10/2004 | Ozolins et al. |
| D499,704 S | 12/2004 | Song |
| 6,857,610 B1 | 2/2005 | Conner |
| 6,863,252 B2 | 3/2005 | Bosson |
| 6,867,962 B2 | 3/2005 | Cho |
| D503,719 S | 4/2005 | Lin |
| 6,874,738 B2 | 4/2005 | Ishizaki |
| 6,882,529 B2 | 4/2005 | Helot et al. |
| 6,892,650 B2 | 5/2005 | Baloga et al. |
| 6,905,101 B1 * | 6/2005 | Dittmer .............. 248/274.1 |
| D507,270 S | 7/2005 | Ozolins et al. |
| 6,918,564 B2 | 7/2005 | Yen |
| 6,935,883 B2 | 8/2005 | Oddsen, Jr. |
| 6,938,869 B2 | 9/2005 | Lin |
| 6,966,532 B2 | 11/2005 | Ishizaki |
| 6,994,306 B1 | 2/2006 | Sweere |
| 6,997,422 B2 | 2/2006 | Sweere |
| 7,028,961 B1 | 4/2006 | Dittmer |
| 7,032,870 B2 | 4/2006 | Sweere |
| D520,017 S | 5/2006 | van Kuijk et al. |
| D522,009 S | 5/2006 | Chen |
| 7,036,787 B1 | 5/2006 | Lin |
| 7,044,423 B2 | 5/2006 | Bober |
| 7,048,242 B2 | 5/2006 | Oddsen, Jr. |
| 7,061,754 B2 | 6/2006 | Moscovitch |
| 7,063,296 B2 | 6/2006 | Williams |
| 7,066,435 B2 | 6/2006 | Oddsen, Jr. |
| 7,096,560 B2 | 8/2006 | Oddsen, Jr. |
| D530,595 S | 10/2006 | Lam et al. |
| 7,159,828 B1 | 1/2007 | Yau |
| 7,168,665 B2 | 1/2007 | Hong |
| 7,177,144 B2 | 2/2007 | Ha |
| 7,193,843 B2 | 3/2007 | Hsu |
| 7,195,215 B2 | 3/2007 | Lin |
| 7,232,098 B2 | 6/2007 | Rawlings |
| 7,237,755 B2 | 7/2007 | Cho |
| 7,252,277 B2 | 8/2007 | Sweere |
| 7,261,265 B2 | 8/2007 | Burns |
| 7,273,203 B2 | 9/2007 | Carnevali |
| 7,274,555 B2 | 9/2007 | Kim |
| 7,369,401 B1 | 5/2008 | Floersch |
| 7,382,418 B2 | 6/2008 | Uchizono |
| 7,389,965 B2 | 6/2008 | Oddsen, Jr. |
| 7,390,211 B2 | 6/2008 | Moscovitch |
| 7,424,991 B2 | 9/2008 | Kim |
| 7,458,549 B2 | 12/2008 | Oddsen, Jr. |
| 7,472,458 B2 | 1/2009 | Oddsen, Jr. |
| 7,506,853 B2 | 3/2009 | Sweere |
| 7,510,457 B2 | 3/2009 | Hussa-Lietz |
| 7,527,233 B2 | 5/2009 | Yen |
| 7,529,083 B2 | 5/2009 | Jeong |
| 7,540,457 B2 * | 6/2009 | Oddsen et al. ............. 248/278.1 |
| 7,621,500 B2 | 11/2009 | Ishizaki |
| 7,652,846 B2 | 1/2010 | Kondo |
| 7,673,838 B2 | 3/2010 | Oddsen, Jr. |
| 7,722,003 B2 | 5/2010 | Ishizaki |
| 7,806,378 B2 | 10/2010 | Oddsen, Jr. |
| 7,819,368 B2 | 10/2010 | Jung |
| 2001/0023914 A1 | 9/2001 | Oddsen, Jr. |
| 2002/0148936 A1 | 10/2002 | Oddsen, Jr. |
| 2003/0001057 A1 | 1/2003 | Sweere et al. |
| 2003/0075653 A1 | 4/2003 | Li |
| 2003/0075654 A1 | 4/2003 | Oddsen, Jr. |
| 2003/0075655 A1 | 4/2003 | Oddsen, Jr. |
| 2003/0080268 A1 | 5/2003 | Oddsen, Jr. |
| 2003/0080269 A1 | 5/2003 | Oddsen, Jr. |
| 2003/0085328 A1 | 5/2003 | Oddsen, Jr. |
| 2003/0102341 A1 | 6/2003 | Iitsuka |
| 2003/0116687 A1 | 6/2003 | Oddsen, Jr. |
| 2003/0136888 A1 | 7/2003 | Boele |
| 2003/0231460 A1 | 12/2003 | Moscovitch |
| 2003/0234328 A1 | 12/2003 | Oddsen, Jr. |
| 2004/0004170 A1 | 1/2004 | Oddsen, Jr. |
| 2004/0007651 A1 | 1/2004 | Williams et al. |
| 2004/0011932 A1 | 1/2004 | Duff |
| 2004/0011938 A1 | 1/2004 | Oddsen, Jr. |
| 2004/0014349 A1 | 1/2004 | Oddsen, Jr. |
| 2004/0031893 A1 | 2/2004 | Smed |
| 2004/0035987 A1 | 2/2004 | Oddsen, Jr. |
| 2004/0195471 A1 | 10/2004 | Sachen, Jr. |
| 2004/0245420 A1 | 12/2004 | Pfister et al. |
| 2004/0250635 A1 | 12/2004 | Sweere et al. |
| 2004/0251388 A1 | 12/2004 | Williams |
| 2004/0251389 A1 | 12/2004 | Oddsen, Jr. |
| 2004/0262474 A1 | 12/2004 | Boks et al. |
| 2005/0006542 A1 | 1/2005 | Henning et al. |
| 2005/0006543 A1 | 1/2005 | Oddsen, Jr. |
| 2005/0034547 A1 | 2/2005 | Sweere et al. |
| 2005/0146845 A1 | 7/2005 | Moscovitch |
| 2005/0207101 A1 | 9/2005 | Hwang et al. |
| 2006/0126284 A1 | 6/2006 | Moscovitch |
| 2006/0150869 A1 | 7/2006 | Cvek |
| 2006/0184215 A1 | 8/2006 | Bieberich |
| 2006/0219849 A1 | 10/2006 | Chin |
| 2007/0102600 A1 | 5/2007 | Ishizaki et al. |
| 2007/0284488 A1 | 12/2007 | Kim et al. |
| 2008/0061196 A1 | 3/2008 | Oddsen, Jr. |
| 2008/0316689 A1 | 12/2008 | Moscovitch |
| 2009/0078841 A1 | 3/2009 | Oddsen, Jr. |
| 2009/0090831 A1 | 4/2009 | Henning et al. |
| 2010/0123059 A1 | 5/2010 | Saez |

FOREIGN PATENT DOCUMENTS

| | | |
|---|---|---|
| DE | 2061 662 | 6/1972 |
| DE | 2 320 266 | 3/1974 |
| DE | 23 60 616 | 6/1975 |
| DE | 32 39 371 A1 | 4/1984 |
| DE | 33 11 161 A1 | 9/1984 |
| DE | 34 15 497 A1 | 2/1985 |
| DE | 3506381 A1 | 8/1986 |
| DE | 41 06 947 A1 | 9/1991 |
| DE | 40 14 009 A1 | 10/1991 |
| DE | 19748480 A1 | 5/1999 |
| EP | 0 145 410 A2 | 6/1985 |
| EP | 0256160 A1 | 8/1986 |
| EP | 0 230 236 A1 | 7/1987 |
| EP | 0 230 236 B1 | 7/1987 |
| EP | 0424074 A2 | 4/1991 |
| EP | 1312852 A2 | 5/2003 |
| FR | 2 503 049 | 10/1982 |
| GB | 1 451 088 | 9/1976 |
| GB | 2 222 939 | 3/1990 |
| JP | 3240116 A | 10/1991 |
| JP | 3291722 A | 12/1991 |
| JP | 04015680 | 1/1992 |
| JP | 04218870 | 8/1992 |
| JP | 04278615 | 10/1992 |
| JP | 05006140 | 1/1993 |
| JP | 05011707 | 1/1993 |
| JP | 06038834 | 2/1994 |
| JP | 7261671 A | 10/1995 |
| JP | 8295185 A | 11/1996 |
| JP | 8312885 | 11/1996 |
| JP | 9285341 A | 11/1997 |
| JP | 9326980 A | 12/1997 |
| JP | 11007250 A | 1/1999 |
| JP | 11338576 A | 12/1999 |
| JP | 2001304488 | 10/2001 |
| JP | 03240116 B2 | 12/2001 |
| JP | 03291722 B2 | 6/2002 |
| JP | 2004191601 A | 7/2004 |
| KR | 1999015738 A | 3/1999 |
| WO | WO 00/39493 | 7/2000 |
| WO | WO 03/009269 A2 | 1/2003 |
| WO | WO 03/041386 A2 | 5/2003 |
| WO | 03050787 A1 | 6/2003 |
| WO | WO 03/049071 A2 | 6/2003 |
| WO | 2004018927 A1 | 3/2004 |

(56) References Cited

FOREIGN PATENT DOCUMENTS

| WO | 2004065842 A1 | 8/2004 |
|---|---|---|
| WO | 2005012783 A2 | 2/2005 |
| WO | 2005054110 A2 | 6/2005 |
| WO | WO 2005/073032 | 8/2005 |

OTHER PUBLICATIONS

Ergotron, Inc., "Ergonomic Computer WorkCenters: Command Post Adjustable Systems." 1995, 2 Pgs., Brochure #: CPS Jan. 15, 1995, St. Paul, Minnesota.

Ergotron, Inc., "Ergonomic Computer WorkCenters: Power Lift 2000 Computer WorkCenter," 1995, 2 Pgs., Catalog #: POW Feb. 25, 1995, St. Paul, Minnesota.

Medaes Incorporated, "Computer Mounting Solutions Product Identification Sheet," 1996, 2 Pgs., Rev. 04/96, Norcross, Georgia.

Medaes Incorporated, "Computer Hardware Management Systems," 1996, 4 Pgs., Brochure CHMS/CB/3/96, Norcross, Georgia.

Medaes Incorporated, "Physiological Monitoring Management Systems—Track Mounted Suspension Arms," 5 Pgs., Brochure, Norcross, Georgia.

Ergotron, Inc., "Ergonomic Computer WorkCenters: Computer WorkCenters and LAN Racking Systems," 1994, 8 Pgs., Catalogue #: FLC. Jan. 1, 1994, St. Paul, Minnesota.

Ergotron, Inc., "Ergotron Computer Mounting Solutions," 1995, 2 Pgs., Brochure, St. Paul, Minnesota.

US 7,428,141, 09/2008, Moscovitch (withdrawn)

\* cited by examiner

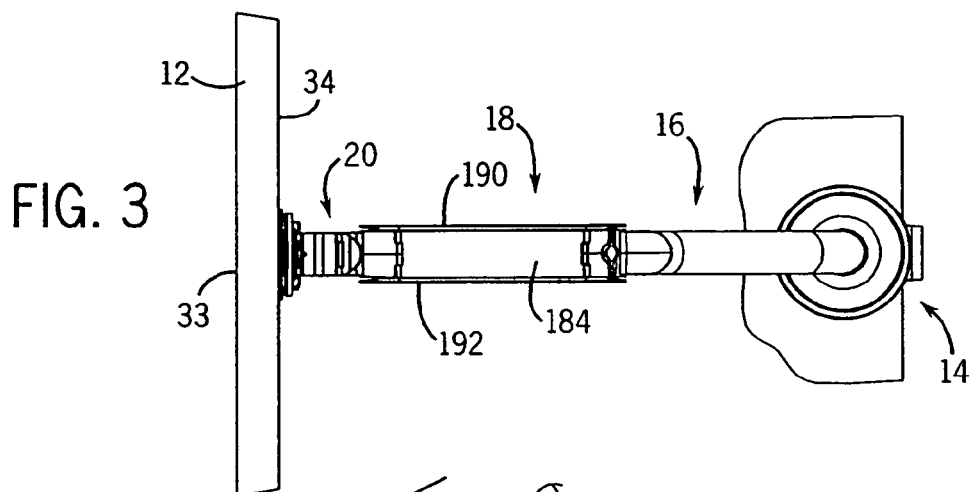
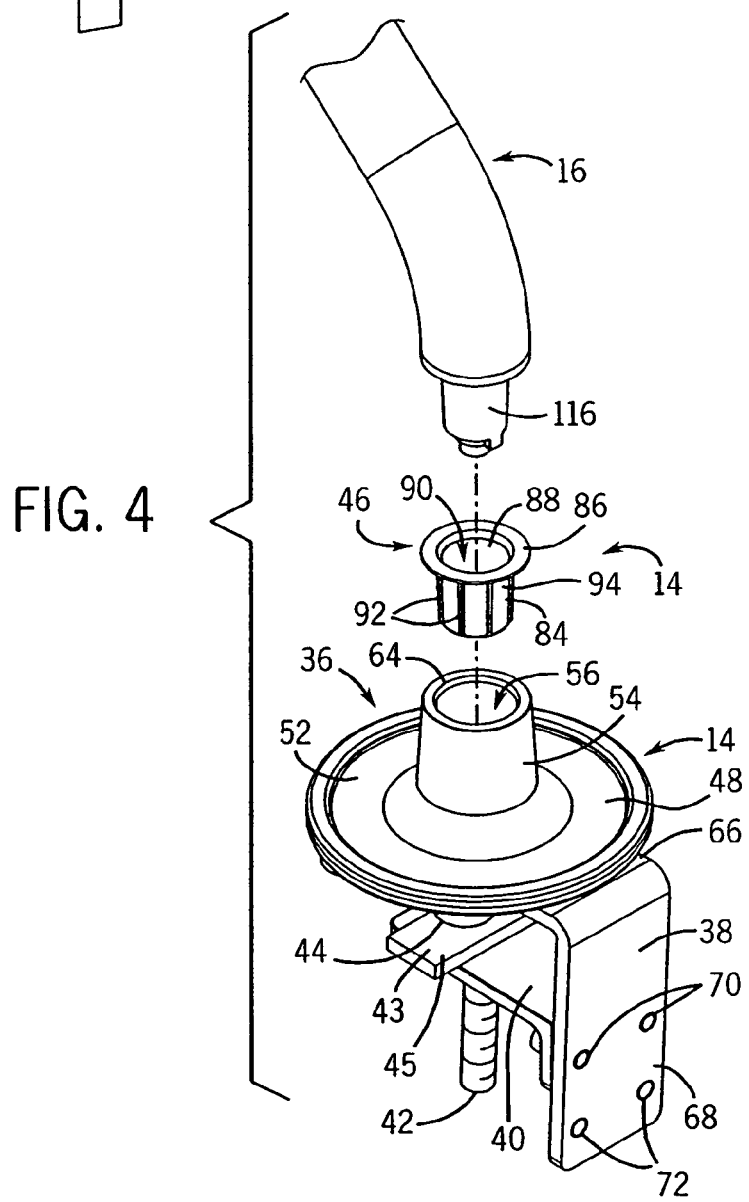

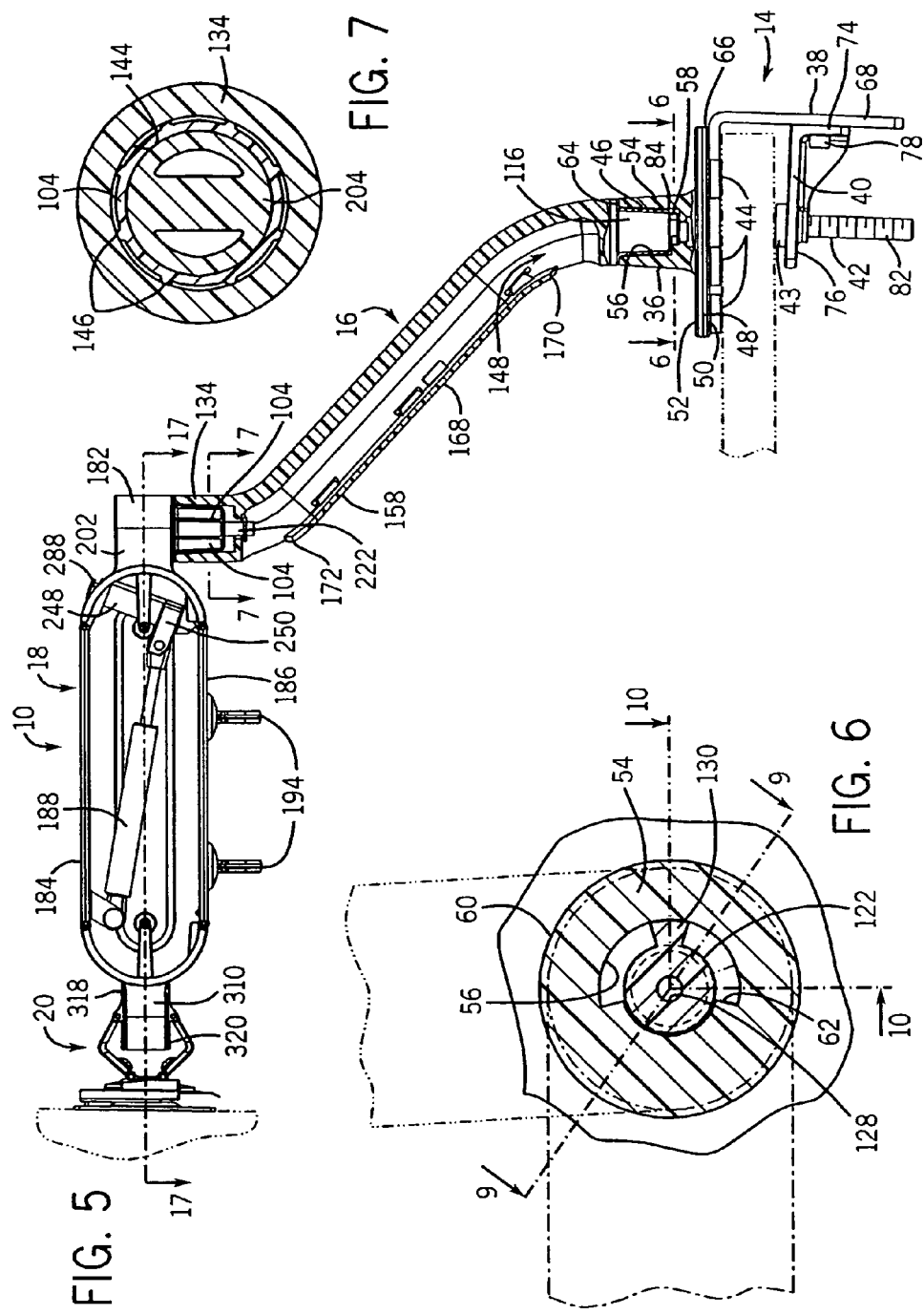

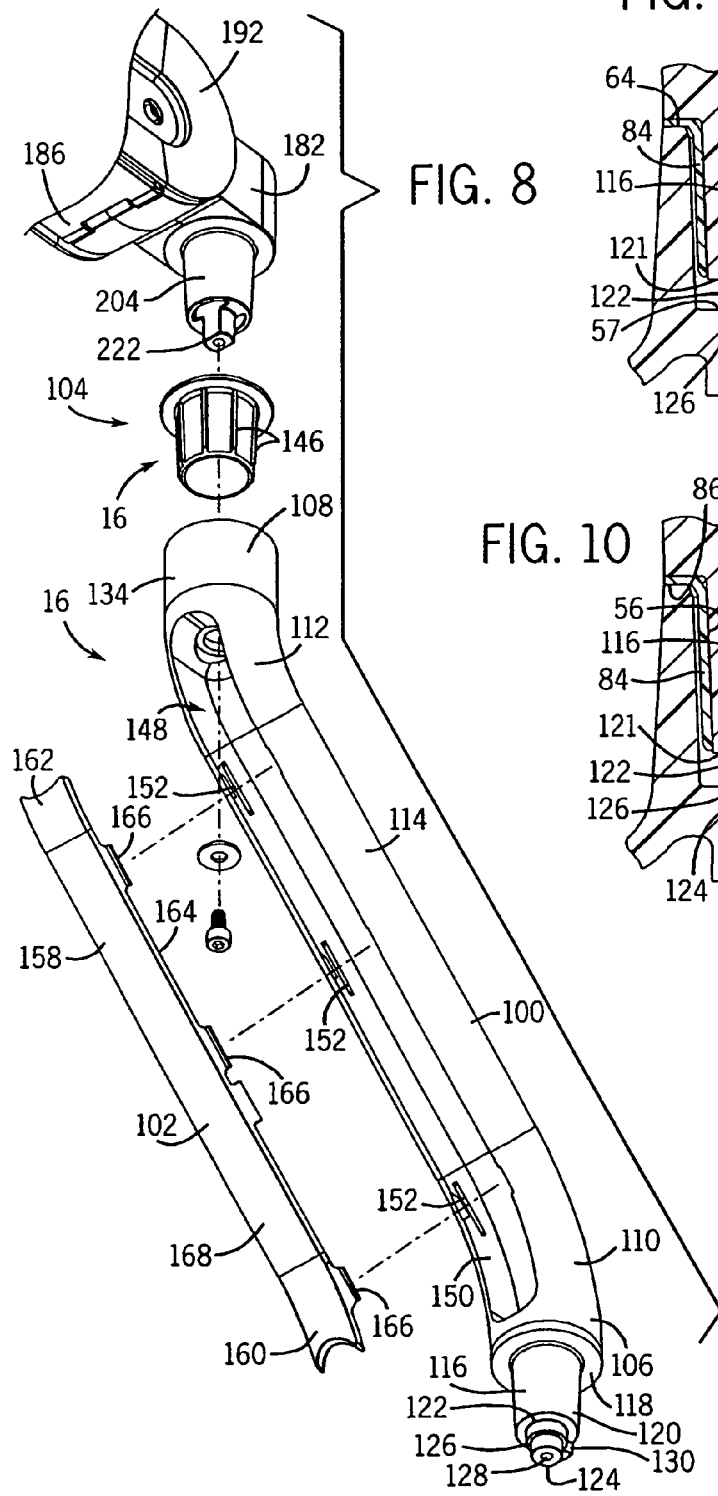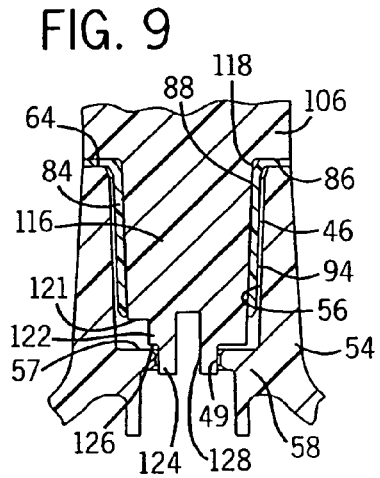

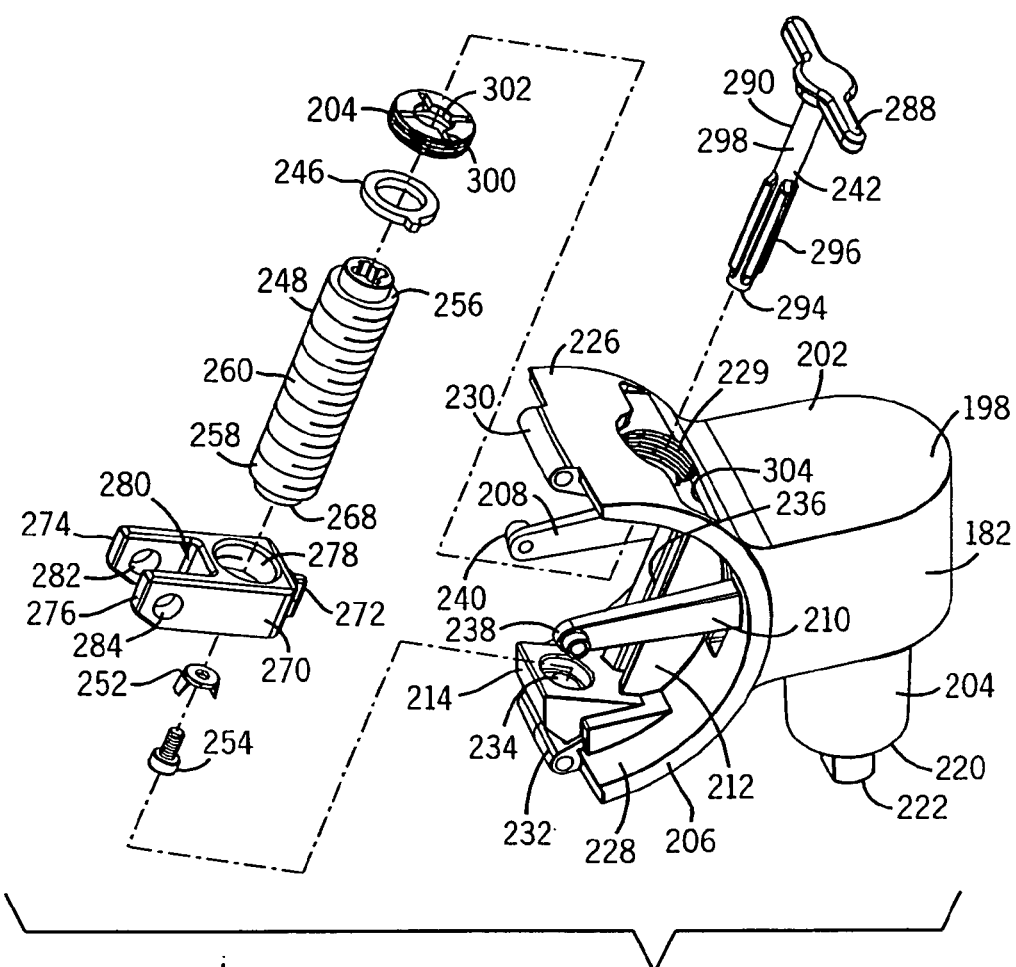
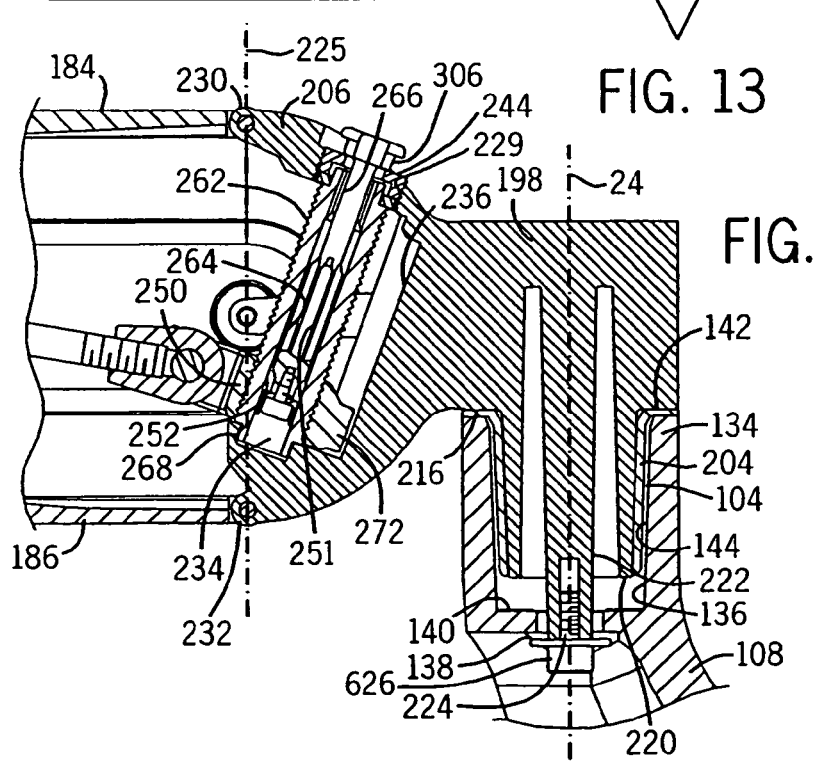
FIG. 13
FIG. 12

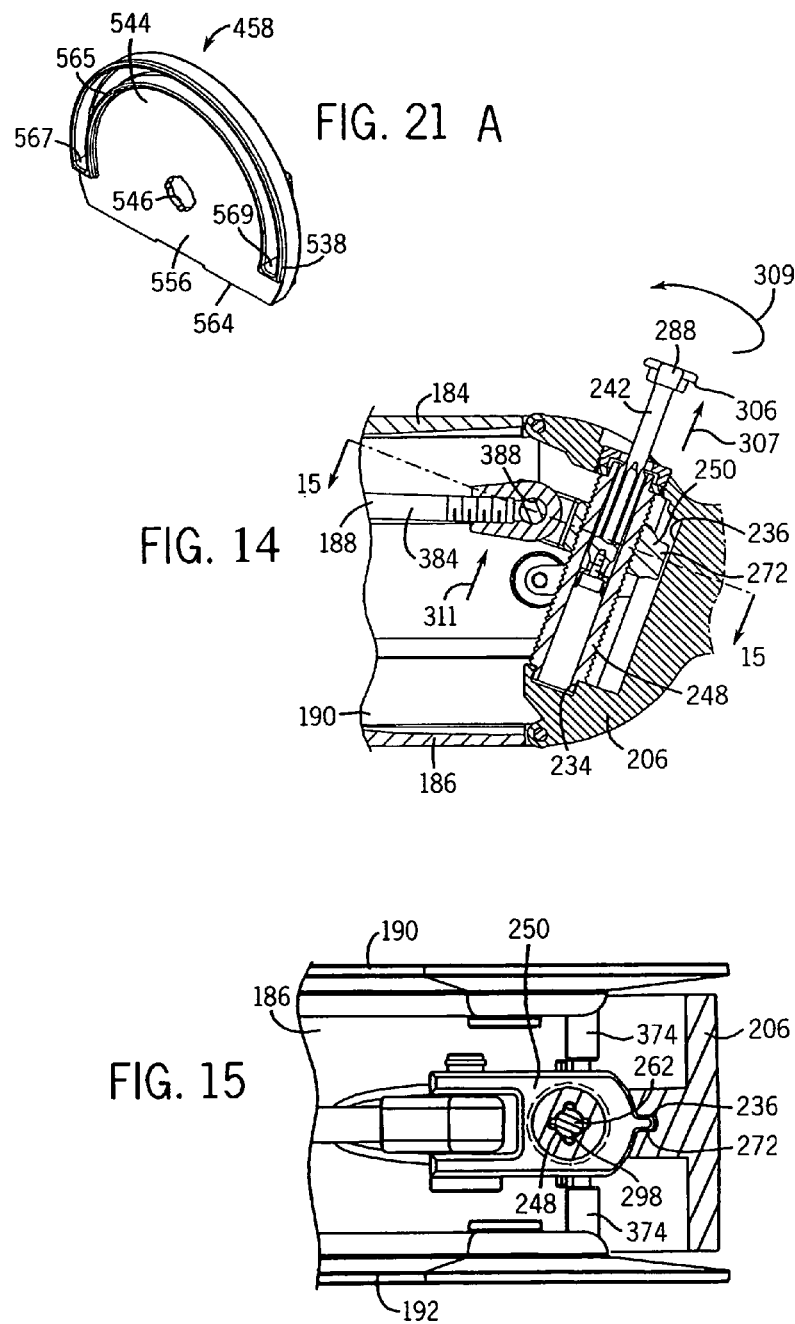

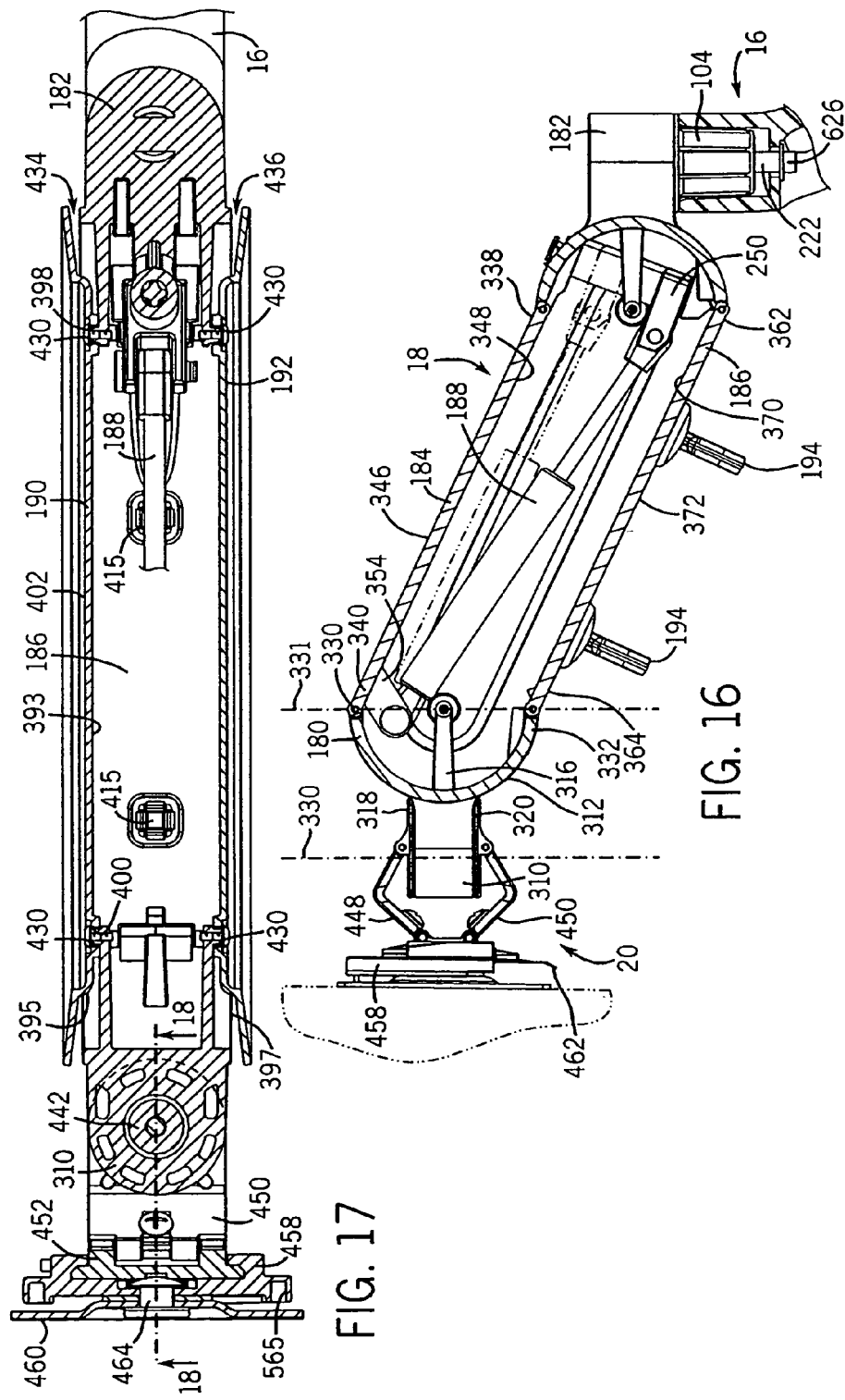

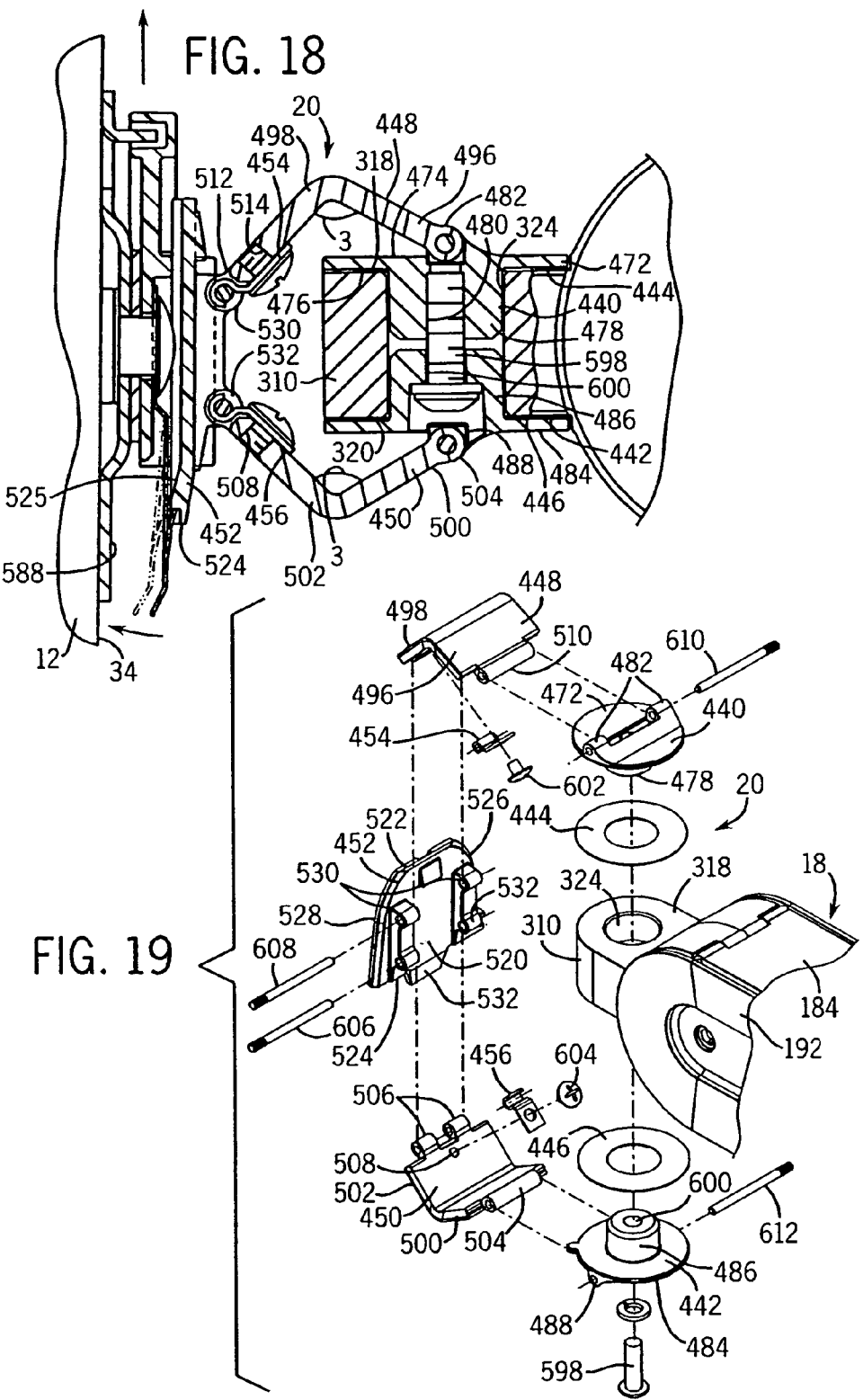

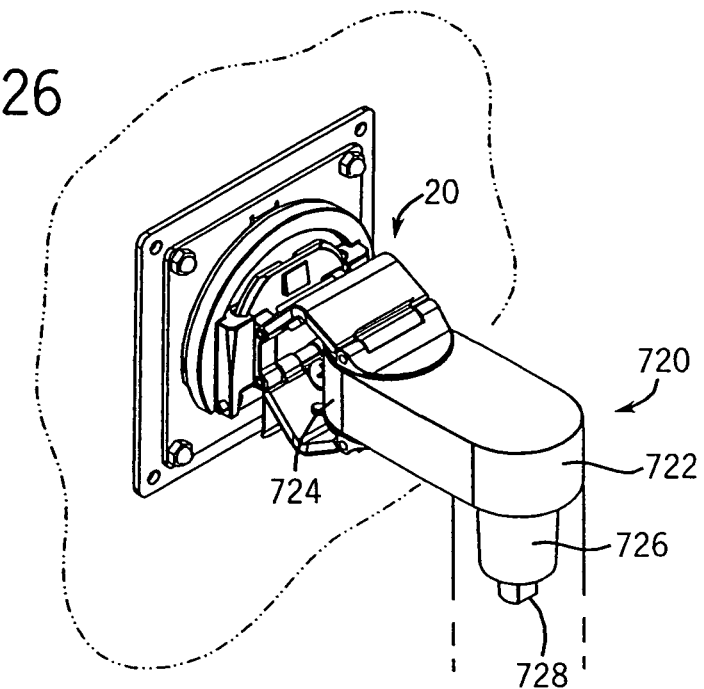
FIG. 26
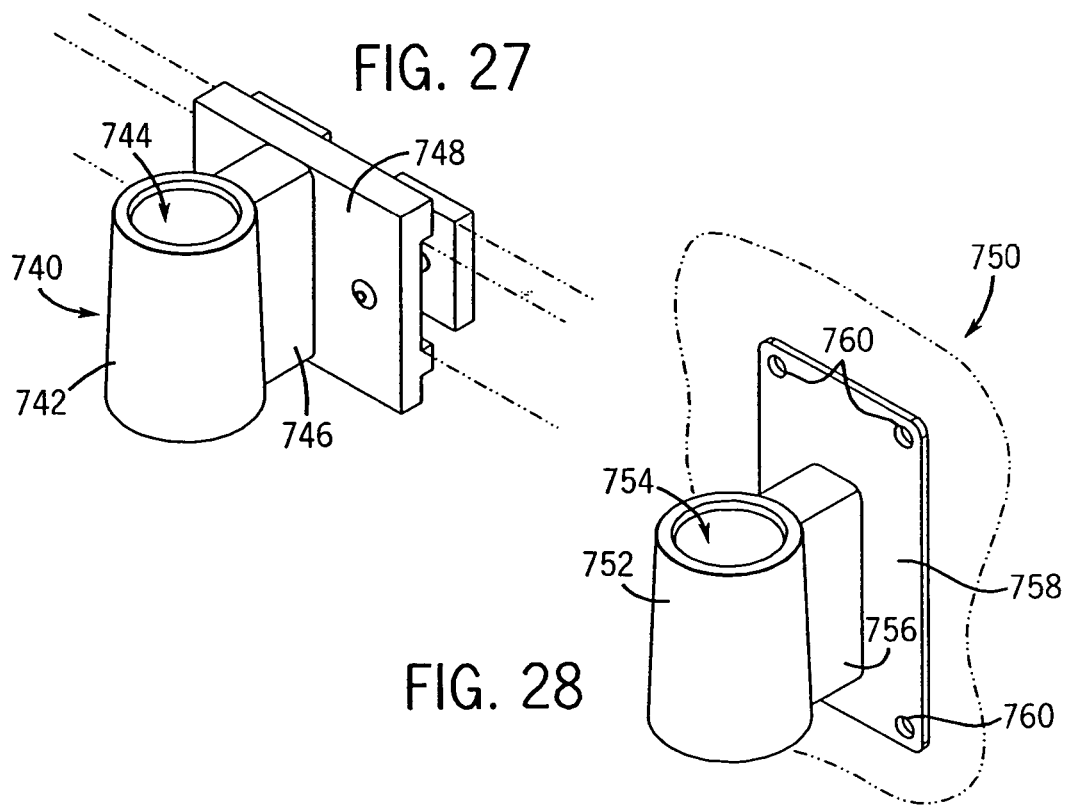
FIG. 27
FIG. 28

SUPPORT ARM ASSEMBLY

CROSS-REFERENCE TO RELATED APPLICATIONS

This application is related to and claims priority from U.S. provisional Pat. Appln. No. 60/687,061 which was filed on Jun. 3, 2005 and which has the title "Support Arm Assembly."

STATEMENT REGARDING FEDERALLY SPONSORED RESEARCH OR DEVELOPMENT

Not applicable.

BACKGROUND OF THE INVENTION

The present invention relates to support arms and more specifically to multi-position adjustable support arms for supporting electronic devices such as flat panel electronic display screens or the like.

Most work stations, lap tops, etc., include some type of display screen for displaying information for viewing. Early workstations included relatively bulky cathode ray tube (CRT) type displays that typically had box type forms to accommodate a tube required to create display images. While CRTs were useful for displaying information, such displays had several shortcomings. First, because of their large size, CRTs required a large amount of worktop space. CRT space requirements are especially problematic in relatively small partitioned personal spaces where workstation users often have a minimal amount of worktop space.

Second, CRTs are not ergonomically friendly. To this end, it has been known for a long time in the furniture industry that people are most comfortable when supporting furniture can be at least somewhat customized to fit specific body characteristics. For instance, most office chairs now include height adjustable seat mechanisms that, as the label implies, allow seat height to be raised and lowered by a user so that an optimal height for supporting a specific user can be configured. As another instance, many office chairs include height adjustable arm supports that, like the adjustable seats, facilitate raising and lowering of arm supports to optimally support different chair users.

In addition, it has been known for a long time in the furniture industry that, even where only one person uses a piece of furniture, comfort over extended periods can be increased appreciably if the furniture is adjustable to support the user in several different positions. To this end, anyone that has had to sit in an airline seat during an extended flight knows first hand that, while the seat may initially seem comfortable, by the end of a several hour flight, despite ability to change position to a limited degree, stiffness and even pain often result.

In the case of a display screen, to accommodate physical differences between users (e.g., at a receptionist desk, at a ticket counter, etc.) and indeed the same user over an extended period, a display screen should be moveable in many different ways so that the relative position of a screen surface to a user's eyes is optimally adjustable. In this regard, optimally, display screen position should be changeable vertically (i.e., up and down), laterally (i.e., left and right) about a vertical axis (i.e., so that a vertical lateral edge can be moved forward or rearward while the opposite lateral edge moves rearward and forward, respectively)), about a first horizontal axis parallel to the display screen surface (i.e., so that the top edge of the screen surface can tip forward or rearward while the lower edge tips rearward or forward, respectively), along a depth dimension (i.e., the screen can be moved forward or rearward) and about a second horizontal axis perpendicular to the display screen surface (i.e., so that a first edge of the display screen that is initially a top horizontal edge can be rotated into a vertical lateral edge orientation—i.e., enabling either landscape or portrait viewing).

In the case of CRTs, the size and related weight of a typical CRT has made it difficult to cost effectively support a CRT for optimal movement. For instance, while some CRTs are supported for rotation about a vertical axis and/or tipping about a horizontal axis, in most cases CRTs are not supported to enable the full compliment of optimal adjustability. Where CRTs are supported to facilitate a subset of optimal movement, there is no known support structure that facilitates the full compliment of movement (e.g., no support structure facilitates rotation about the second horizontal axis perpendicular to the display surface). In addition, where CRTs are supported to facilitate a subset of optimal movement, the structure required is usually relatively bulky, complex, expensive to configure and, in many cases, is not believed to work very well.

With respect to functionality, a CRT support structure works well if the structure allows smooth and minimal effort transitions of the CRT between different positions and if the CRT remains in a set position after the CRT is released. Hereinafter the phrase "position maintenance" will be used to refer to the notion of a display screen remaining in a set position after release (i.e., position performance is a measure of how well a screen remains in a set position after release). In the case of known CRT support structure, it is believed that the structure may not operate smoothly, with minimal effort and/or may not exhibit acceptable position maintenance.

Third, known support structure for CRTs often is configured to support a single CRT type having known dimensions and weight and therefore cannot be used with other CRT types. In fact, in many cases adjustable support structure is built right into a CRT base and cannot be used to support another CRT when, for instance, a user decides to upgrade to a new CRT including a larger or more vivid screen.

Fourth, where support assemblies have been configured that can be used with CRTs having different dimensions and weights, the structure required to secure a CRT to the support assembly has usually required many components and the mounting task has typically included many steps and required excessive time to accomplish. Here, because of the cost associated with such structures, often office administrators opt to forego the advantages associated with such systems and, because of the costs (i.e., time, hassle) associated with upgrading to better displays, administrators opt to forego advantages associated with display upgrades.

Fifth, even where a CRT is supported by a structure that enables many relative display positions, such structures usually do not allow the CRT to be effectively removed from the space above a work surface so that essentially the entire work surface is useable for other purposes. For instance, in the case of a partitioned personal space, the rear edges of work surfaces are typically up against partition walls so that the CRT position is always somewhere above and obstructing the work surface.

In the last few years new technologies have evolved that have enabled configuration of flat or thin panel type monitors. For instance, liquid crystal displays (LCDs) and plasma displays have been developed that have relatively narrow depth dimensions (e.g., on the order to 1 to 2 inches). Hereinafter, the phrase "flat panel display" will be used generally to refer to any type of flat or thin panel including but not limited to LCDs, plasma displays, etc. In addition to being thinner along the depth dimension, flat panel displays are typically lighter weight that CRTs having the same viewing screen size.

Support arm structure for flat panels has been developed that overcomes many of the problems described above with respect to CRT support structure. For instance, arm structure has been developed for supporting flat panel displays so that the displays can be moved into any of the optimal orientations. In addition, support structure has been developed that allows flat panel display screens to be moved essentially up against wall structure adjacent a work surface so that the screens are out of the way of a work surface user. Moreover, support structure has been developed that allows a user to quickly release a flat panel display for removal or replacement and for supporting universal type mounting of different types of flat panel display screens. Furthermore, support structure has been developed that can be adjusted to counter-balance different weights of various flat panel displays that may be used with the support structure.

While the new support arm structures for flat panel displays overcome many of the problems associated with CRT type support structures, even these new structures have several shortcomings. First, in many cases it is believed that these new structures will not operate in a smooth fashion with minimal effort and may not exhibit good position maintenance. For instance, in many cases first and second components linked to enable rotation of a flat panel display screen about a horizontal axis that is parallel to the display screen surface will be linked by a pin or bushing where frictional force between the two components is relied upon to maintain a set position. Here, where the frictional force is sufficient to maintain a set position (i.e., to facilitate good position maintenance), when the position is to be altered, often a large force has to be applied to start the movement such that the screen position will shoot past an intended or target position and another adjustment is required to compensate for the overshoot. Thus, in these cases movement is not smooth, effort to change positions is not minimal and, in some cases, position maintenance is not good or may deteriorate over time (e.g., during repeated use, pin/bushing friction may decrease).

Second, some flat panel support assemblies include components that, while enabling a full compliment of optimal screen movements, require multiple machinations to change screen position. For instance, to facilitate smooth and minimal effort movement and position maintenance, some assemblies include components that can be tightened and loosened to maintain relative positions and to allow position changes. For instance, in the case of first and second components linked to facilitate rotation of a screen about a horizontal axis parallel to a display screen surface, a tightening screw or the like may be provided to adjust the friction between the first and second components, the screw tightened to increase friction and maintain relative positions and loosened to decrease friction and allow position changes.

Here, to change screen position about the horizontal axis, a user has to loosen the tightening screw, adjust screen position and then tighten the screw again. During this process, the user will typically need to access the space behind the screen to loosen and tighten the screw and therefore will not be in a normal screen using position (i.e., in front of the screen). Thus, after adjustment and when the user is positioned in the normal using position, the user may find that the new position is not optimal and may have to re-perform the adjusting process (i.e., loosening, movement and tightening). While this process may not appear burdensome at first blush, when the process is repeated several times a day which is necessary to constantly have the display in an optimal position, the machinations required to change position become extremely burdensome. Moreover, where a support structure includes several tightening screws or other friction adjusting components for increasing position maintenance forces, the task of optimally adjusting position is exacerbated.

Third, while at least some flat panel display support assemblies include mechanical configurations that enable quick release of the display from the support assembly for attachment/removal and/or replacement, known mechanical configurations are relatively clumsy to use. For instance, known configurations may require a user to unscrew one or several small screws that are located in the space to the rear of the display screen prior to removal of the display from the support assembly. In other known cases two separate leaf springs have to be simultaneously pressed to unlock a display screen from a support assembly where the leaf springs are arranged in a non-ergonomic position with respect to the display. For instance, in some cases the ends of two leaf springs extend upward and therefore require a user to reach over a top edge of a display screen which makes it awkward to support the display while compressing the leaf springs to decouple the display from the support.

Fourth, in known cases where support assemblies allow adjustment of a counterbalancing force so that a single assembly can accommodate display screens having different weights, the adjusting interfaces typically are difficult to access and/or require special tools (i.e., a screw driver, a wrench, etc.).

Fifth, in the case of known flat panel support assemblies, there is no "secondary movement" that occurs when one component is moved with respect to another that aids in optimal display screen placement. In this regard, the phrase "secondary movement" is used to refer to mechanical movement that occurs as a result of some other movement caused by an assembly user. For instance, when a display screen is to be tipped so that a top horizontal edge and a bottom horizontal edge tip forward and rearward, respectively, assuming a user's eye's remain at a constant height and that the user will want to maintain a line of sight perpendicular to the display screen surface, an automatic secondary movement may cause the display screen to move slightly upward so that the screen rotates generally about the user's eye level. Similarly, when a display screen is to be tipped so that a top horizontal edge and a bottom horizontal edge tip rearward and forward, respectively, assuming a user's eye's remain at a constant height and that the user will want to maintain a line of sight perpendicular to the display screen surface, an automatic secondary movement may cause the display screen to move slightly downward so that the screen rotates generally about the user's eye level. Known support arms do not automatically facilitate secondary movements.

Sixth, known flat panel display support assemblies often have designs that are not versatile so that the assemblies can only be used in one fashion. For instance, at least some support assemblies include lower and upper support arm subassemblies and a pan tilt subassembly where the lower assembly includes a four bar linkage that facilitates height adjustment generally, the upper arm subassembly is simply an extension member that does not facilitate height adjustment, the pan tilt subassembly is mounted to the upper arm subassembly, the upper arm subassembly is mounted to the lower arm subassembly and each configuration requires each of the upper, lower and pan tilt subassemblies. Here, for instance, the pan tilt subassembly cannot be mounted directly to the lower arm subassembly and the pan tilt and upper arm subassemblies cannot be used without the lower arm subassembly to provide different configurations that may be desirable under certain circumstances.

Seventh, in order to provide an arm assembly that has a quality feel during operation, components have to fit together with minimal slop. For instance, where a first arm member includes a post received in a cylindrical cavity formed by a second arm member to facilitate relative movement of the first and second arm members about a common axis, the external surface of the post has to precisely mirror the internal surface of the cavity to facilitate a quality feel during rotation. Here, precise machining requirements appreciably increase arm component cost.

Eighth, where arm assemblies include a counterbalancing spring mechanism, typically the spring mechanism is juxtaposed between other arm assembly components which makes it difficult at best to access the spring mechanism. Here, spring mechanism access may be desirable for maintenance purposes or, in at least some cases, so that springs having different characteristics can be installed (e.g., spring characteristics may be different depending on weight of the screen supported thereby).

Thus, it would be advantageous to have a flat panel display support assembly that operates smoothly and with minimal effort and that exhibits good position maintenance. In addition, it would be advantageous to have a support structure of the above kind that allows quick and ergonomically optimal release of a flat panel display screen from the structure and that could be used in any of several different advantageous configurations. Moreover, it would be advantageous to have a support structure of the above kind that causes optimal secondary movement in at least some cases and that is designed to be easily maintained and relatively inexpensive to manufacture.

BRIEF SUMMARY OF THE INVENTION

It has been recognized that several features can be included in a monitor support arm assembly that result in a better overall design. To this end, a versatile and flexible arm configuration can be provided by providing several different subassemblies to configure an arm assembly where different subsets of the subassemblies can be selected depending on the specific needs of an application. Here, a small number of standardized coupling structures can be provided on each subassembly for linking together different arm subassemblies.

It has also been recognized that a four bar subassembly including a counterbalancing gas spring to facilitate a vertical range of motion can be configured where the spring is easily accessible for maintenance and replacement. Here, in at least some cases, easy access is facilitated by configuring the four bar mechanism with at least one, and in at least some cases two, open lateral sides. In at least some cases covers are provided for the open sides.

In addition, it has been recognized that two four bar subassemblies can be cobbled together in at least some embodiments where a vertical pivot is provided between the four bar subassemblies to facilitate particularly advantageous display movement.

Moreover, it has been recognized that a quick release display mounting assembly can be configured that is relatively more ergonomic than known monitor release configurations. To this end, in at least some cases, a single leaf spring type mechanism is provided to latch a second mount member to a first mount member where a distal end of the leaf spring extends toward an edge of the display. In at least some cases the distal spring end extends downward toward a lower edge of the rear surface of the display. Here, to release the display from the arm, a user can cradle the lower part of the display with a hand or arm while reaching upward to the spring to release which is a more ergonomic action than the activity required to activate other known release mechanisms.

Furthermore, it has been recognized that overall assembly costs can be reduced by providing compensating components. To this end, in at least some embodiments, uniquely featured bushings are provided that compensate for imperfections in other coupling components. Specifically, frusto-conical and ribbed bushings are provided where the ribs are deformable when compressed. A uniquely featured bushing is placed between facing surfaces of a cavity and a post where force between the cavity and post compress and deform the ribs to an extent that the bushing compensates for imperfections in the dimensions of the coupling cavity and post.

In addition, it has been recognized that a four bar assembly can be provided as part of a pan tilt assembly such that when a display is tilted, the tilting action results in a secondary upward or downward movement of the display such that the display rotates about a horizontal axis that is generally in front of a rear surface of the display. This rotating action is believed to be more ergonomically correct than tilting action that occurs with other known pan tilt assemblies. To accomplish this dual movement tilting action, the tilting four bar assembly includes links where distal ends are closer together than proximate ends.

Consistent with the above, at least some inventive embodiments include an apparatus for linking a device at a distal end of a support structure where the device includes a surface and the surface includes at least one edge, the apparatus comprising a first coupler supported by one of the distal end and the device surface, the first coupler including a first bearing surface, a second coupler supported by the other of the distal end and the device surface, the second coupler forming a second bearing surface arranged to bear against at least portion of the first bearing surface when the device is supported by the support structure, one of the first and second couplers including a latch surface; and a single latch member including a first end linked to the other of the first and second couplers, a second end that extends from the first end and a central portion between the first and second ends, wherein, when the device is supported by the support structure and the second bearing surface bears against at least a portion of the first bearing surface, the second end of the latch member extends toward the device surface edge and the second end of the latch is moveable between a latched position wherein the central portion is adjacent the latch surface and maintains the couplers coupled and an unlatched position wherein the central portion is separated from the latch surface and the device and coupler supported thereby are freely removable from the support structure.

In some cases the first coupler forms at least a first channel that includes the first bearing surface and wherein the second coupler forms at least a first edge that forms the second bearing surface and that is at least partially received within the first channel. In some cases the first coupler also forms a second channel that forms a third bearing surface and the second coupler forms a second edge that forms a fourth bearing surface and wherein, when the couplers are coupled, the third bearing surface contacts at least a portion of the fourth bearing surface. Here, in some cases the first and third bearing surfaces generally face each other and wherein the second and fourth bearing surfaces generally face in opposite directions.

In some embodiments each of the first and second channels includes first and second ends and wherein the second ends are closer than the first ends. In some cases the distance between the first and second channels gradually decreases between the first and second ends thereof. in some cases each of the first and second edges formed by the second coupler has first and second ends and wherein the distance between the first and second edges gradually decreases between the first and second ends thereof. In some cases the first coupler is supported by the device surface. The first ends of the channels may be lower than the second ends. The second coupler may form the latch surface. The latch surface may generally face downwardly. The second end of the latch member may extend downward. The latch member may be a spring member that is biased toward the latched position. The spring member may be a leaf spring and the leaf spring may move toward the device surface when moved from the latched to the unlatched position.

In some cases the central portion includes a finger member that extends therefrom and wherein the portion of the latch member adjacent the latch surface when the latch member is in the latched position is a surface of the finger member. In some embodiments the finger member generally extends from the central portion in a direction from the second end toward the first end of the leaf spring.

In some cases the device is a flat panel display screen, the surface is a rear surface and the surface edge is a lower edge. In some cases the first coupler is supported by the device surface. In some cases the second coupler forms the latch surface. In some cases the second end of the latch member extends downward. In some cases the latch member is a spring member that is biased toward the latched position. In some cases the spring member is a leaf spring and wherein the leaf spring moves toward the device surface when moved from the latched to the unlatched position. In some cases the first coupler includes a rotating member and a coupler member, the coupler member forming the first bearing surface, the rotating member is linked to the device surface and mounted to the coupler member for rotation about an axis.

Some inventive embodiments include an apparatus for linking a device at a distal end of a support structure where the device includes a surface and each of the device surface and the distal end of the support arm is a supporting feature, the apparatus comprising a first coupler supported by one of the supporting features, a second coupler supported by the other of the supporting features and configured to at least in part receive a portion of the first coupler and a latch member supported by one of the first coupler, the second coupler and one of the supporting features and including a distal end, wherein, when the first coupler is at least in part received by the second coupler, the latch member distal end extends laterally to at least one side of the first and second couplers and substantially parallel to the device surface and is moveable substantially perpendicular to the device surface between latched and unlatched positions wherein the latch member latches and unlatches the first coupler to the second coupler, respectively.

In some cases the latch member moves toward the device surface when moving form the latched position to the unlatched position. In some cases the latch member is a leaf spring. In some cases the second coupler is secured to the device surface and the latch member is secured to the second coupler.

In addition, some embodiments include an assembly for supporting a device for movement between several positions, the assembly comprising a first four-bar subassembly including proximate and distal ends and a second four-bar subassembly including proximate and distal ends and first and second link members that pivot about substantially parallel axis, the distal end of the first four-bar subassembly linked to the proximate end of the second four-bar subassembly for rotation about an additional axis that is substantially perpendicular to the parallel axis.

In some cases the distal end of the second four-bar subassembly is linked to the device. In some cases the apparatus further includes a base and a third arm subassembly between the base and the device. In some cases the third arm subassembly is linked between the base and the first four-bar subassembly. In some cases the third arm subassembly includes first and second curved sections and a substantially straight section between the first and second curved sections and wherein oppositely facing ends of the first and second curved sections extend along substantially parallel first and second trajectories. In some cases the elongated member extends generally along an axis that forms first and second angles with each of the first and second trajectories, respectively, where each of the first and second angles is between 5 and 30 degrees. In some cases the elongated member is tubular. In some cases the least one of the four-bar subassemblies includes first and second link members where each of the link members includes first and second ends and where the first and second ends are mounted for rotation to first and second end members, respectively, and, wherein, the first ends are mounted closer together than the second ends.

In some cases the second four-bar subassembly includes first and second link members where each of the link members includes first and second ends and where the first and second ends are mounted for rotation to first and second end members, respectively, and, wherein, the first ends are mounted closer together than the second ends.

In some cases the arm assembly further includes a third arm subassembly that includes proximate and distal ends, the first four-bar subassembly includes proximate and distal ends, each of the base and the distal end of the third arm subassembly form couplers of a first type and each of the proximate end of the first four-bar subassembly and the proximate end of the third arm subassembly form a coupler of a second type, each of the second type couplers configured to couple with either of the first type couplers.

In some cases each of the first type couplers forms one of a cavity and a post and each of the second type couplers forms the other of a cavity and a post and wherein the posts are dimensioned to be receivable within the cavities to facilitate rotation about common cup-post axis.

Moreover, some embodiments include a variably configurable kit assembly for adjustably supporting a device, the assembly comprising a base forming a first coupler of a first type, an arm assembly linking the base to the device, the arm assembly comprising, a first arm subassembly including proximate and distal ends and forming a first coupler of a second type at the proximate end and a second coupler of the first type at the distal end and a second arm subassembly including proximate and distal ends and forming a second coupler of the second type at the proximate end and supporting the device at the distal end, wherein, each of the second type couplers is configured to be couplable to either of the first type couplers.

In some cases each of the first type couplers forms one of a cup and a post and each of the second type couplers forms the other of a cup and a post and wherein the posts are dimensioned to be receivable within the cups to facilitate rotation about an axis common to the coupled post and cup. In some cases each of the first type of couplers forms a cup that narrows from an upper end to a lower end and each of the second type couplers forms a post that narrows from an upper end to a lower end. In some cases the apparatus further includes a frusto-conical bushing between each pair of adjacent first and second couplers.

In some cases the arm assembly can be configured with the proximate ends of the first arm subassembly and the second arm subassembly coupled to the base and the distal end of the first arm subassembly, respectively and wherein the arm assembly can be configured with the proximate end of the second arm subassembly coupled to the base. In some cases the second arm subassembly includes at least one four-bar subassembly. In some cases the base includes a first base for mounting a work surface and wherein the assembly further includes at least a second base for mounting to a vertical surface wherein the second base forms an additional coupler of the first type configured to optionally receive any of the couplers of the first type. In some cases the second base coupler includes a clip for mounting the second base to a slat wall.

In some cases the assembly further includes a device mount subassembly including proximal and distal ends, the mount subassembly forming a first coupler of a third type at the distal end, the second arm subassembly forming a first coupler of a fourth type configured to be couplable to a coupler of the third type. In some cases the assembly further includes a third arm subassembly including proximate and distal ends and forming a third coupler of the second type at the proximate end and a second coupler of the fourth type. In some cases each of the second and the third arm subassemblies has a length dimension and wherein the length dimension of the second arm subassembly is greater than the length dimension of the third arm subassembly. In some cases the first arm subassembly includes a four-bar mechanism and the second arm subassembly includes a fixed member.

In addition, some inventive embodiments include an arm assembly for adjustably supporting a flat panel display, the assembly comprising a first arm member including proximate and distal ends and including a surface that forms one of an open ended frusto-conical cavity and a frusto-conical post at the distal end and a second arm member including proximate and distal ends and including a surface that forms the other of an open ended frusto-conical cavity and a frusto-conical post at the proximal end, the display supported by the distal end of the second arm member, wherein the post is at least partially received within the cavity with the post forming surface facing the cavity facing surface and for rotation about an axis.

I some cases the assembly further includes a bushing having internal and external surfaces where the internal surface defines a frusto-conical shape that is substantially similar to the shape of the surface forming the post and the external surface defines a frusto-conical shape that is substantially similar to the shape of the surface forming the cavity, the bushing positioned between the surfaces that form the post and cavity. In some cases the internal surface of the bushing is generally a mirror image of the external surface of the bushing. In some cases the bushing further includes at least one malleable and deformable rib that extends from at least one of the internal and external surfaces. In some cases the bushing includes a plurality of malleable and deformable ribs that extend from at least one of the internal and external surfaces. In some cases the ribs extend from the external surface. In some cases at least one of the internal surface, the external surface and one of the surfaces that forms the cavity and that forms the post includes at least one malleable and deformable rib.

In some cases the bushing is formed of plastic. In some cases the first arm member forms the cavity at the distal end. In some cases the cavity and the post are a first cavity and a first post, the first arm member also including a surface that forms one of a second open ended frusto-conical cavity and a second frusto-conical post at the proximate end, the assembly further including a base member that forms the other of a second open ended frusto-conical cavity and a second frusto-conical post at the proximate end and a second bushing having internal and external surfaces where the internal surface defines a frusto-conical shape that is substantially similar to the shape of the surface forming the second post and the external surface defines a frusto-conical shape that is substantially similar to the shape of the surface forming the second cavity wherein, the second post is at least partially receivable within the second cavity with the second bushing between the surfaces that form the second post and second cavity and for rotation about an axis.

In some cases an aperture is formed in a base of the cavity and a threaded opening is formed in an end of the post and further including a bolt that extends through the aperture and that is received in the threaded opening to maintain the bushing under a compressive force between the surfaces that form the cavity and the post. In some cases the external surface of the bushing further includes at least one malleable and deformable extending member that deforms when compressed between the surfaces that form the post and the cavity.

According to one aspect, some embodiments include a tilter apparatus for adjustably mounting a flat panel display to a support member, the apparatus comprising a rigid mount member coupled to the device, first and second link members, each link member including first and second ends, the first ends of the link members coupled to the support member for pivotal motion about substantially parallel first and second axis where the first and second axis are separated by a first dimension, the second ends of the link members coupled to the mount member for pivotal motion about substantially parallel third and fourth axis where the third and fourth axis are separated by a second dimension that is different than the first dimension.

In some cases the second dimension is less than the first dimension. In some cases the mount member is coupled to a rear surface of the display. In some cases each of the first and second link members includes a generally V-shaped member.

In some cases the first, second, third and fourth axis are substantially horizontal, the support member forms a collar and wherein the first and second link members are coupled to the collar by a coupling including at least one post member that extends into the collar where the post is rotatable about a substantially vertical axis formed by the collar.

Other embodiments include an apparatus for adjustably mounting a flat panel display to a support arm wherein the support arm includes a distal end and the display includes a rear surface, the apparatus comprising a tilt assembly coupling the rear surface of the display to the distal end of the support arm, the tilter assembly configured to facilitate display rotation about a substantially horizontal axis that resides on a side of the rear surface opposite the tilter assembly.

In some cases the tilter assembly includes rigid mount member coupled to the rear surface of the display and first and second link members, each link member including first and second ends, the first ends of the link members coupled to the distal end of the support arm for pivotal motion about substantially parallel first and second axis where the first and second axis are separated by a first dimension, the second ends of the link members coupled to the mount member for pivotal motion about substantially parallel third and fourth axis where the third and fourth axis are separated by a second dimension and wherein the second dimension is less than the first dimension.

Some embodiments include a four-bar assembly for use in a support arm for adjustably supporting a device, the assembly comprising first and second end members, a first link member, the first link member including a substantially flat elongated rigid member having at least a first lateral edge and first and second ends that are coupled to the first and second end members, respectively and a second link member, the second link member including a substantially flat elongated rigid member having at least a first lateral edge and first and second ends that are coupled to the first and second end members, respectively, so as to be substantially parallel to the first link member with the first lateral edge of the second link member facing in the same direction as the first lateral edge of the first link member, wherein, the space between the first and second link members is open between the first lateral edges of the first and second link members.

In some cases each of the first and second link members also includes a second lateral edge that faces in the direction opposite the first lateral edge and wherein the space between the first and second link members is open between the second lateral edges of the first and second link members. In some cases the assembly further includes first and second cover members that are removably coupled to at least one of the end members so as to block the space between the first edges and to block the space between the second edges, respectively. In some cases each of the covers is removably coupled to each of the end members. In some cases each of the first and second end members includes a generally C-shaped member including first and second distal ends, the first ends of the first and second link members linked to the first ends of the end members and the second ends of the first and second link members linked to the second ends of the end members. In some cases the assembly further includes at least a first cover member removably coupled to at least one of the first and second end members, the cover member including a rectilinear portion and integral semi-circular portions at opposite ends of the rectilinear portion.

In some cases each of the end members includes an extension member that extends between and generally in the same direction as the distal ends of the end member and wherein the cover member is coupled to the extension members at coupling points. In some cases the coupling point with the first end member extension member is generally midway between the distal ends of the first end member and the coupling point with the second end member extension member is generally midway between the distal ends of the second end member.

In some cases the first link member is an upper link member, the assembly further including a spring mechanism including first and second ends wherein the first end is coupled to the first end member and the second end is coupled to the upper link member. In some cases the spring mechanism is a gas spring. In some cases an adjusting mechanism is provided at one of the first and second ends of the spring mechanism for adjusting the force applied by the spring mechanism to the upper link member.

In some cases the assembly further includes at least one retaining member mounted to an external surface of at least one of the first and second link members for retaining wires adjacent the external surface.

According to another aspect, some embodiments include an apparatus for use as one of two link members in a four-bar support arm subassembly, the arm subassembly including first and second end members, the apparatus comprising a substantially single thickness, elongated rigid link member having first and second ends and first and second oppositely facing lateral edges and first and second rollers at the first and second ends of the link member for mounting to the first and second end members, respectively.

In some cases the first and second rollers are integrally formed at the first and second ends of the link member. In some cases the link member is substantially flat and planar.

In some cases the apparatus is also for use with a four-bar subassembly including a spring mechanism wherein the link member includes oppositely facing internal and external surfaces, the apparatus further including a collar member extending from the internal surface adjacent the first end of the link for attachment to one end of the spring mechanism.

Some embodiments include a lower arm assembly for use in an extension arm that includes an upper arm assembly, the arm for adjustably mounting a device to a support member, the lower arm assembly comprising an elongated member having first and second ends, respectively, and forming an internal cavity along at least a portion of the member's length wherein the cavity opens to at least one side, the member including first and second couplers at the first and second ends for coupling to the support member and the and the upper arm assembly, respectively.

In some cases the cavity opens downward. In some cases the cavity forms a cavity edge with an external surface of the elongated member and wherein the assembly further includes a cover receivable within a portion of the cavity for substantially closing the cavity edge cavity. In some cases the cavity includes first and second ends and wherein an edge of the cover at opposite ends of the cover forms openings with the cavity edge adjacent the first and second ends of the cavity. In some cases the elongated member includes first and second curved sections and a substantially straight section between the first and second curved sections and wherein oppositely facing ends of the first and second curved sections extend along substantially parallel first and second trajectories. In some cases the elongated member extends generally along an axis that forms first and second angles with each of the first and second trajectories, respectively, where each of the first and second angles is between 5 and 30 degrees. In some cases the elongated member is tubular.

At least some embodiments include a support arm assembly for supporting a device with respect to a support, the assembly comprising a rigid arm member having first and second ends that extend along trajectories that are substantially parallel to first and second axis, respectively, where the first and second axis are misaligned, a first linkage post having opposite first and second ends and supported for rotation at the first end of the arm member about the first axis, the first end of the first linkage post supported by the support and a second linkage post having opposite first and second ends and supported for rotation at the second end of the arm member about the second axis, the second end of the second linkage post supporting the device, the first end of the second linkage post linked to the second end of the first linkage post so that rotation of the first post causes rotation of the second post.

In some cases the assembly further includes an elongated intermediate linkage linked between the second end of the first linkage post and the first end of the second linkage post to translate rotational movement between the first linkage post about the first axis and the second linkage post about the second axis. In some cases the first and second axis are parallel. In some cases the arm member includes first and second curved end portions and a central substantially straight portion. In some cases the arm member forms a cavity substantially along the entire length of the arm member and wherein the intermediate linkage is positioned within the cavity.

In some cases the intermediate linkage is substantially straight and rotates around an axis that is angled with respect to each of the first and second axis. Some embodiments further include first and second transfer blocks, the first block mounted between the first end of the intermediate linkage and the second end of the first linkage post and the second block mounted between the second end of the intermediate linkage and the first end of the second linkage post. In some cases the assembly further includes a differential subassembly that links the second end of the second linkage post to the device. In some cases the differential assembly has a two-to-one ratio.

Some embodiments further include a support structure that is mounted to the support and that forms a surface, the first end of the first linkage post frictionally engaging the surface. In some cases the device is a flat panel display screen. In some cases the first and second axis are parallel.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefor, to the claims herein for interpreting the scope of the invention.

BRIEF DESCRIPTION OF THE SEVERAL VIEWS OF THE DRAWINGS

FIG. 3 is a top plan view of the arm of FIG. 1;

FIG. 4 is a perspective view of the base subassembly and a portion of the lower arm subassembly of FIG. 1 in partial exploded view;

FIG. 5 is a partial cross-sectional side plan view of the arm assembly of FIG. 1, albeit where a cover member has been removed from an upper arm subassembly;

FIG. 6 is a cross-sectional view taken along the line 6-6 of FIG. 5;

FIG. 7 is a cross-sectional view taken along the line 7-7 of FIG. 5;

FIG. 8 is a partially exploded perspective view of the lower arm subassembly of FIG. 1 and a portion of the upper arm subassembly;

FIG. 9 is a cross-sectional view taken along the line 9-9 of FIG. 6;

FIG. 10 is a cross-sectional view taken along the line 10-10 of FIG. 6;

FIG. 12 is a cross-sectional view taken along the line 12-12 of FIG. 1;

FIG. 13 is an exploded view of the yolk subassembly of FIG. 12;

FIG. 14 is similar to FIG. 12, albeit illustrating an adjusting member in an extended position where an end of a gas spring has been forced into a second juxtaposition;

FIG. 15 is a partial cross-sectional view taken along the line 15-15 of FIG. 14;

FIG. 16 is a view similar to of FIG. 5, albeit where an upper arm subassembly has been forced into a second operating position;

FIG. 17 is a cross-sectional view taken along the line 17-17 in FIG. 5;

FIG. 18 is a cross-sectional view taken along the line 18-18 in FIG. 17;

FIG. 19 is an exploded view of a portion of the pan/tilt subassembly of FIG. 1;

FIG. 21A is a perspective view of the mount member of FIG. 21;

FIG. 26 is a perspective view of another arm subassembly consistent with at least some embodiments of the present invention;

FIG. 27 is a perspective view of an additional type of base subassembly that may be used with other arm subassemblies like those illustrated in FIGS. 1 and 26;

FIG. 28 is similar to FIG. 27, albeit illustrating a third base subassembly;

DETAILED DESCRIPTION OF THE INVENTION

Figure 1:
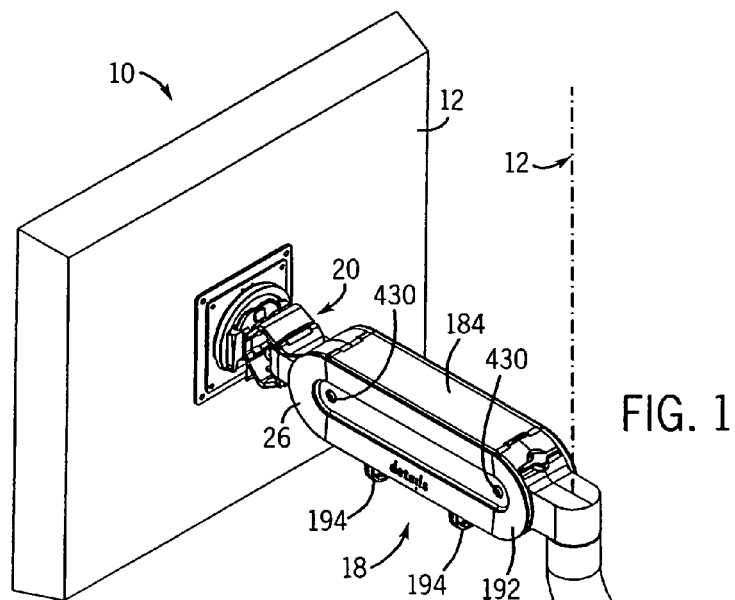
FIG. 1 is a perspective view of one embodiment of a support arm assembly according to at least some aspects of the present invention.

One or more specific embodiments of the present invention will be described below. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Referring now to the drawings wherein like reference numerals correspond to similar elements throughout the several views and, more specifically, referring to FIGS. 1, 2 and 3, the present invention will be described in the context of an exemplary support arm assembly 10 for supporting a flat panel electronic display 12 that is consistent with at least some aspects of the present invention. As an initial matter, it should be appreciated that, while the invention is described in the context of an arm assembly 10 for adjustably supporting a flat panel display 12, the arm assembly 10 may be used to support other devices or subassemblies. In the description that follows, assembly 10 will be described generally in the frame of reference of FIG. 2 where a subassembly 18 is disposed generally vertically higher than an assembly 16 and generally in front of assembly 16 (e.g., to the left of assembly 16 as illustrated) where display 12 has front and rear surfaces 33 and 34, respectively.

Assembly 10 includes a base subassembly 14, a lower arm subassembly 16, an upper arm subassembly 18 and a pan/tilt subassembly 20. In general, base subassembly 14 is mountable to some type of support structure such as the edge of a table top (see FIG. 1) and supports lower arm subassembly 16 thereabove for rotation about a first vertical axis 22 (see FIG. 2). Lower arm subassembly 16 supports upper arm subassembly 18 at an end opposite the end supported by base subassembly 14 for rotation about a second vertical axis 24 that is offset from first vertical axis 22. Upper arm subassembly 18 includes a four-bar mechanism to allow generally vertical movement of a distal end 26 thereof within a range (e.g., ±4-7 inches) upward and downward as indicated by dual-ended arrow 28. Pan/tilt subassembly 20 is mounted proximate distal end 26 of upper arm subassembly 18 for rotation about a third vertical axis 30. Display 12 is secured a the tilt portion or subassembly (see also FIG. 21) of pan/tilt subassembly 20 for rotation about a horizontal axis identified by numeral 32 in FIG. 2. In addition, the tilt portion of the pan/tilt subassembly 20 facilitates a range (e.g., ±25°) of, as the label implies, tilting motion of display 12 such that display 12 generally tilts or rotates about a horizontal axis perpendicular to each of the third vertical axis 30 and horizontal axis 32 (i.e., a horizontal axis that extends into the plane of FIG. 2) where the horizontal axis is on a side of rear surface 34 of display 12 opposite arm assembly 10.

Referring now to FIGS. 4 and 5, exemplary base subassembly 14 includes a base member 36, an L-shaped extension member 38, an L-shaped clamp member 40, a threaded tightening rod 42, an elongated foot member 43, three plastic or rubber disk shaped foot members 44 and a bushing 46. Base member 36 is a rigid, integrally formed component including a generally circular disk-shaped member 48 having an undersurface 50 and a top surface 52 and a generally cup-shaped member 54 that extends upward from a central portion of top surface 52. Foot members 44 are mounted to undersurface 50 in an equispaced orientation. Cup-shaped member 54 includes an upper edge 64 and forms an upwardly opening cavity 56 that tapers from top edge 64 toward a lower end of the cavity 56 so that the cavity 56 is generally of frustoconical shape.

Referring also to FIGS. 6, 9 and 1, at the lower end of cavity 56, cup-shaped member 54 forms a stop shelf 58 that extends inwardly along a portion of the circumference of cavity 56 where opposite ends 60 and 62 of the stop shelf 58 form first and second stop surfaces, also referred to herein by numerals 60 and 62, respectively. Stop surfaces 60 and 62 define the ends of an arc about first vertical axis 22 where in the exemplary illustrated embodiment, the arc is approximately 210°. Shelf 58 extends from the rearward facing portion of the internal surface that forms cavity 56 as best seen in FIG. 6. Cup-shaped member 54 forms an opening 49 that opens through undersurface 50 where the bottom edge of opening 49 is recessed from undersurface 50 to receive a bolt head as best illustrated in FIG. 10.

Referring again to FIGS. 4 and 5, L-shaped extension member 38 includes a first rigid essentially flat member 66 and a second integrally formed rigid and essentially flat member 68 that forms a right angle with member 66. Member 66 is secured to undersurface 50 of disk-shaped member 48 such that member 68 generally extends away from the undersurface 50 at a right angle. Member 68 forms two pairs of threaded apertures identified by numerals 70 and 72.

L-shaped clamp member 40 includes first and second rigid and integrally formed essentially flat members 74 and 76 that form a right angle. Although not illustrated, member 74 forms a pair of openings that are arranged to mirror either of the first and second pairs of openings 70 or 72, respectively, formed by member 68. Two screws 78 (only the head of one screw 78 shown in FIG. 5) are used to mount member 74 to member 68 so that second member 76 extends generally parallel to undersurface 50 of base member 36. Member 76 forms a threaded aperture (not illustrated) near a distal end which is generally aligned below cup-shaped member 54.

Referring still to FIG. 5, threaded tightening rod 42 includes a threaded shaft 82 that has a diameter and a thread pitch such that it is threadably receivable within the threaded opening formed by member 76. Foot member 43 is an elongated flat and rigid member that forms a bearing surface 45. Foot member 43 is mounted at one end of shaft 82 and, when shaft 82 is received within the threaded opening formed by member 76, bearing surface 45 faces undersurface 50 of base member 36. Thus, as shaft 82 is rotated in one direction, foot member 43 moves toward undersurface 50 and, when shaft 82 is rotated in the opposite direction, foot member 43 moves away from undersurface 50.

Referring once again to FIGS. 4, 5, 9 and 10, bushing 46 includes a hollow generally cylindrical member 84 having oppositely facing upper and lower edges (not labeled) where a lateral flange 86 extends laterally from the upper edge. As best seen in FIG. 10, cylindrical member 84 includes an internal surface 88 and an external surface 94 where the external surface 94 is formed to be receivable within cavity 56 formed by cup-shaped member 54. Here, flange 86 is dimensioned so that an undersurface thereof is receivable on upper edge 64 of cup-shaped member 54 when cylindrical member 84 is received within cavity 56. External surface 94 tapers from the upper edge to the lower edge of member 84 such that the shape formed by external surface 94 mirrors the shape of the surface that forms cavity 56.

In at least some embodiments, a plurality of ribs 92 are integrally formed on external surface 94 and extend laterally therefrom. In the illustrated embodiment, as best seen in FIG. 4, ribs 92 extend along and generally parallel to a length dimension of cylindrical member 84 from the upper to the lower edge thereof and the ribs 92 are generally equispaced about the circumference of member 84.

Referring still to FIGS. 4 and 5, while cylindrical member 84 is dimensioned such that member 84 generally fits within cavity 56, in at least some embodiments, external surface 94 is dimensioned such that when the lower surface of flange 86 rests on upper edge 64 with cylindrical member 84 centered within cavity 56, the internal surface of cavity 56 and external surface 94 form a slight gap. Similarly, ribs 92 extend laterally from surface 94 such that oppositely extending ribs (i.e., a pair of ribs extending in opposite directions from opposite sides of external surface 94) define dimensions that are slightly greater than the dimension formed by the tapered surface that defines cavity 56 when the lower surface of flange 86 rests on upper edge 64. Thus, at least initially, when bushing 46 is placed within cavity 56 so that ribs 92 contact the surface that forms cavity 56, ribs 92 generally suspend bushing 46 within cavity 56 such that the lower surface of flange 86 is slightly above upper edge 64.

Bushing 46 is formed of a deformable or malleable material such that at least certain portions thereof can be deformed when compressed. In particular, ribs 92 are formed such that they can be deformed to at least a certain degree when compressed. In this regard, in at least some embodiments, bushing 46 will be formed of a plastic material such that when a compressive force is applied thereto, the ribs 92 are compressed toward external surface 94. Thus, with bushing 46 in cavity 56, when a compressive force is applied to internal surface 88, ribs 92 are compressed between external surface 94 and the surface that forms cavity 56 and, when a sufficiently large force is applied, ribs 92 compress until the undersurface of flange 86 contacts and rests on upper edge 64.

Referring once again to FIGS. 1, 2 and 5 and also to FIG. 8, lower arm subassembly 16 includes a rigid arm member 100, a cover member 102 and a bushing 104. Arm member 100, in at least some embodiments, has a generally tubular appearance. In at least some embodiments member 100 is an integrally formed member having a proximal or first end 106 and a distal or second end 108. Between the first and second ends 106 and 108, respectively, arm member 100 generally has three sections including first and second curved sections 110 and 112 that are disposed at the first and second ends 106 and 108, respectively, and a substantially straight central section 114 between the first and second curved sections 110 and 112, respectively. As illustrated, each of the curved sections 110 and 112 curve essentially the same amount but in opposite directions such that oppositely facing ends of the first and second curved sections (i.e., the ends of arm member 100) extend along substantially parallel but off-axis trajectories (i.e., the trajectories corresponding to parallel first and second vertical axes 22 and 24, respectively, as illustrated in FIG. 2).

Referring to FIGS. 5 and 8, a central portion of arm member 100 including straight section 114 and adjacent portions of curved sections 110 and 112 form a cavity 148 that extends substantially along the entire length of arm member 100. In the illustrated embodiment, cavity 148 is only closed at the first and second ends 106 and 108, respectively, of arm member 100. An opening 150 is formed into one side (e.g., a lower side) of cavity 148 and slots are formed along the length of opening 150 in oppositely facing edges thereof. Three of the slots are collectively identified by numeral 152 (oppositely facing slots that face illustrated slots 152 not illustrated).

Referring still to FIGS. 5 and 8, and also to FIGS. 4, 6, 9 and 10, arm member 100 forms a generally post-shaped coupler at first end 106 which, as its label implies, includes an extending post 116. Post 116 has a radius less than the radius of first end 106 so that a limiting surface 118 circumscribes post 116 at end 106. In general, post 116 tapers from first end 106 to a distal end 120 and the taper mirrors the taper of internal surface 88 of bushing 46 such that post 116 is snugly receivable within cavity 90 formed by bushing 46.

An intermediate post member 122 extends coaxially from distal end 120 of post 116 and an end post member 124 having a radius smaller than the radius of the intermediate post member 122 extends axially from intermediate post member 122 such that a small shelf 126 is formed at the base of post 124 and extends laterally therefrom. A threaded aperture 128 is formed axially in the end of post 124 (see specifically FIGS. 6, 9 and 10). In addition, a wedge or pie shaped key 130 extends laterally from a small portion of intermediate post member 122 to a radius equal to the radius of post 116 at distal end 120 (i.e., the lateral surface of key 130 is flush with the lateral surface of post 116 at distal end 120). Key 130 is formed about an axis through opening 128 that forms an arc of, in the illustrated embodiment, approximately 20° (see specifically FIG. 6).

Referring to FIGS. 6, 9 and 10, end post member 124 is sized to be receivable through opening 49 while the lateral edge formed by intermediate post member 122 is dimensioned to provide a slight clearance with an adjacent surface of stop shelf 58 when lower arm subassembly 16 is mounted to base subassembly 36. In addition, as best seen in FIGS. 9 and 10, post 116 and intermediate post 122 have length dimensions such that, when received within bushing 46 and cavity 56 (see also FIG. 4), with limiting surface 118 (see also FIG. 8) and upper edge 64 sandwiching flange 86 of bushing 46 therebetween, the downwardly facing surfaces 121 and 126 form slight gaps with facing surfaces formed by stop shelf 58 and an upwardly facing surface 57 of cavity 56. Thus, bushing 46 completely separates arm member 100 from disk/cup member 36.

Referring yet again to FIGS. 5 and 8 and also to FIG. 12, at second end 108, arm member 100 forms another cup-shaped member 134 that has characteristics similar to cup-shaped member 54 described above. To this end, cup-shaped member 134 forms an upper edge 142 and includes an internal surface 136 that forms a cavity 144 that tapers from upper edge 142 downward to a lower end (not labeled) that is generally closed except for a central axial opening 138. A surface 140 faces upward and circumscribes opening 138. In at least some embodiments consistent with at least some aspects of the present invention, cavity 144 has dimensions that are nearly identical or at least are substantially similar to the dimensions of cavity 56 formed by cup-shaped member 54. Thus, the diameter of cavity 144 adjacent upper edge 142 is identical to the diameter of cavity 56 adjacent upper edge 64. Similarly, the depth of cavity 144 and the degree of taper between the upper edge 142 and surface 140 are identical to the depth of cavity 56 and the degree of taper between upper edge 64 and the upwardly facing surface 57 that circumscribes opening 49. In the illustrated embodiment cup shaped member 134 does not form a shelf akin to shelf 58.

Referring yet again to FIGS. 4, 8 and 12, bushing 104, in at least some embodiments, is identical to bushing 46 described above and therefore, in the interest of simplifying this explanation, will not be described here again in detail. It should suffice to say that bushing 104 is receivable within cavity 144 and includes a plurality of ribs, two of which are collectively identified by numeral 146 in FIG. 8, where the ribs 146 deform when compressed as described above and where bushing 104 serves to separate the surfaces of cup-shaped member 134 from surfaces of upper-arm subassembly 18 when subassembly 18 is mounted to member 134.

Referring again to FIGS. 5 and 8, cover member 102 is an integrally formed rigid yet resilient member that is designed to be snap fit within opening 150 to substantially close the opening 150. To this end, cover member 102, in at least some embodiments, includes a plastic elongated member 158 having first and second ends 160 and 162, respectively, and first and second lateral edges (only one illustrated and labeled 164) that extend along the length of member 158. Here, the dimension between the lateral edges (e.g., 164) is similar to the dimension between facing edges that form opening 150. Finger members, three of which are collectively identified by numeral 166 in FIG. 8, extend from each of the lateral edges (e.g., 164) at locations along the edges such that they align with slots 152 formed within opening 150 when cover member 102 is placed within opening 150. An external surface 168 of member 158, in at least some embodiments, includes a contour that is similar to the contour of arm member 100. Thus, when finger members 166 are received in slots 152 to mount cover member 102 within opening 150, a smooth transition occurs between the adjacent portions of the external surface of member 100 and external surface 168 of cover member 102 and an aesthetically appealing subassembly results.

Cover member 102 has a length dimension that is less than the length of opening 150 such that the edges of opening 150 at first and second arm member ends 106 and 108, respectively, and adjacent cover member edges form a lower opening 170 and an upper opening 172, respectively (see specifically FIG. 5), when cover member 102 is secured within opening 150.

Referring once again to FIGS. 1 and 8 and also to FIGS. 11 through 16, upper arm subassembly 18 includes, among other components, a first yoke member 180, a yoke subassembly 182, a first or upper link member 184, a second or lower link member 186, a gas spring 188, a first cover member 190, a second cover member 192 and first and second retaining members collectively identified by numeral 194.

Referring specifically to FIGS. 12 and 13, yoke subassembly 182 includes a second yoke member 198 and a force adjustment subassembly 200. Second yoke member 198 is a rigid integrally formed and multi-featured member. To this end, yoke member 198 includes a shoulder member 202, a post member 204, a C-shaped member 206, first and second cover mount members 208 and 210, a track member 212 and a cavity forming member 214.

Shoulder member 202 is generally a semi-cylindrical member that forms an undersurface 216 and includes a lateral external surface that forms a semi-circular shape. Post member 204 is a substantially cylindrical member that extends from undersurface 216 to a distal end 220 and that tapers from undersurface 216 toward distal end 220. Here, the dimensions of post member 204 are such that member 204 is snugly receivable within the cavity formed by bushing 104.

Referring still to FIGS. 12 and 13, a generally cylindrical end post member 222 extends from distal end 220 of post member 204 along axis 218 and forms a threaded aperture 224 that also extends along axis 24. End post member 222 is dimensioned such that it can pass through opening 138 (see specifically FIG. 12) without contacting the edge that forms opening 138.

C-shaped member 206, as the label implies, includes a rigid and generally C-shaped member where upper and lower distal ends thereof 226 and 228, respectively, extend up and away from and down and away from the lateral surface of shoulder member 202, respectively. At upper distal end 226, member 206 forms a roller channel 230. Similarly, at lower distal end 228, member 206 forms a roller channel 232. The roller channels 230 and 232 are juxtaposed such that a line 225 that passes through both channels (i.e., perpendicular to each channel) is parallel to axis 24 as illustrated in FIG. 12. Between upper distal end 226 and shoulder member 202, C-shaped member 206 forms a threaded opening 229 that extends along a trajectory generally directed at the roller channel 232 formed at the lower distal end 228. Cavity forming member 214 extends from an internal surface of C-shaped member 206 proximate roller channel 232 and forms a cylindrical recess 234 that is generally aligned with and opens toward threaded opening 229.

Referring to FIGS. 12 through 15, track member 212 extends from an internal surface of C-shaped member 206 and forms a channel 236 that is parallel to and offset from the trajectory about which threaded opening 229 is formed. Thus, channel 236 is angled with respect to axis 24 as best illustrated in FIG. 12.

Cover mount member 210 extends generally in the same direction as upper and lower distal ends 226 and 228 of C-shaped member 206 and generally from a midpoint of C-shaped member 206 to a distal end approximately midway between roller channels 230 and 232. Cover mount member 210 forms a coupling point 238 at a distal end which, in the illustrated embodiment, includes a threaded aperture. Similarly, cover mount member 208 extends from a midpoint of C-shaped member 206 to a distal end substantially midway between roller channels 230 and 232 and forms a threaded aperture at a coupling point 240. Here, the threaded apertures formed at coupling points 238 and 240 are coaxial and members 208 and 210 extend from C-shaped member 206 adjacent opposite lateral edges thereof (i.e., are located on opposite sides of track member 212).

Referring to FIGS. 12 and 13, force adjustment subassembly 200 includes an adjustment member 242, a thumb screw 244, a washer 246, a cylinder 248, a slider member 250, a friction member 252 and a screw 254. Threaded cylinder 248 is generally a hollow cylindrical member having first and second oppositely facing ends 256 and 258, respectively. An external surface 260 of cylinder 248 is threaded. The internal surface 262 of cylinder 248 that forms passageway 251 has sections that have two different cross-sectional characteristics. To this end, referring specifically to FIG. 12, approximately the bottom three-quarter section of passageway 251 which is labeled 264 is cylindrical. Referring also to FIGS. 13 and 15, the top approximately one-quarter section of passageway 251 that is labeled 266 has a cross-shaped cross section. The lower end 258 of cylinder 248 has a reduced radius portion 268 that is dimensioned to be receivable within cylindrical recess 234 formed by member 214.

Slider member 250 includes a torso member 270, a fin member 272 and first and second leg members 274 and 276, respectively. Torso member 270 forms a threaded opening 278 where the thread has a pitch suitable for threading to external surface 260 of cylinder 248. Fin member 272 is integrally formed with torso member 270, extends laterally to one side thereof along a trajectory that is perpendicular to an axis about which threaded opening 278 is formed and is dimensioned to be receivable within track 236 (see FIGS. 12 and 15). Similarly, leg members 274 and 276 are integrally formed with torso member 270 and extend laterally therefrom perpendicular to the axis about which opening 278 is formed. Leg members 274 and 276 extend in a direction opposite the direction in which fin member 272 extends, are parallel to each other and form a gap 280 therebetween. Leg member 274 forms a hole 282 proximate a distal end. Similarly, leg member 276 forms a hole 284 proximate a distal end where hole 284 is aligned with hole 282 on opposite sides of gap 280.

Referring still to FIGS. 12 and 13, friction member 252 has the form of a washer including wing members that extend from opposite edge portions thereof partially axially and partially radially. Friction member 252 is sized such that, when member 252 is received within the bottom three-quarter section 264 of passageway 251, the wings thereof are compressed toward each other and member 252 is wedged within passageway 251 and stays in its position unless affirmatively forced into another position within passageway 251.

Handle adjustment member 242 is a T-shaped member including a handle member 288 and a shaft 290 that extends at a right angle from a central portion of handle member 288 and to a distal end 294. Proximate distal end 294, member 242 forms four equispaced radially extending ribs collectively identified by numeral 296. The ribs 296 form a keyed cross-shaped pattern when viewed in cross section where the cross-shaped pattern mirrors the cross-shaped pattern formed by the top one-quarter section 266 of internal surface 251. Between handle member 288 and ribs 296, an intermediate section 298 of shaft 290 is cylindrical and has a reduced radius.

Referring still to FIGS. 12 and 13, thumb screw 244 is a disk shaped screw member that includes a threaded external surface 300 and that forms a central opening 302. Screw 244 is receivable within threaded opening 229.

To assemble force adjustment subassembly 200, slider member 250 is positioned such that opening 278 is generally aligned with cylindrical recess 234 and so that fin member 272 is received within channel 236. Next, cylinder 248 is slid through opening 229 and is threadably received within opening 278. As cylinder 248 is rotated, slider member 250 moves upward along external surface 260. With slider member 250 threaded at least part way onto cylinder 248, shaft 290 is slid through the openings formed by thumb screw 244 and washer 246 and is slid through opening 229 and into passageway 251 formed by cylinder 248. Next, with end 268 of cylinder 248 positioned to one side of recess 234, screw 254 and friction member 252 are fed into the end of the distal cylinder channel and screw 254 is threaded into an opening formed at distal end 294 of shaft 290. Continuing, cylinder 248 is pushed upward until lower end 268 clears member 214 and is placed within cylindrical recess 234. Screw 244 is threadably received and tightened in opening 229.

Referring specifically to FIG. 13, in at least some embodiments, a handle receiving recess is formed in an external surface of C-shaped member 206 adjacent opening 229 for, as the label implies, receiving handle member 288 when adjustment member 242 is in a stowed position. In the illustrated embodiment, receiving recess 304 is an elongated recess for receiving member 288. Referring also to FIG. 12, in the illustrated embodiment, handle member 288 includes a lip or edge 306 useable to pull adjustment member 242 upward into a force adjusting position (see FIG. 14).

Referring now to FIGS. 12 and 14, it should be appreciated that adjusting member 242 is forcible down into the stowed position as illustrated in FIG. 12 where handle member 288 is received within handle receiving recess 304 and where ribs 296 are disposed within the lower cylindrical portion 264 of passageway 251. To use adjusting member 242 to modify an upper arm counterbalancing force, edge 306 is pulled upward as indicated by arrow 307 in FIG. 14 until ribs 294 are received within the upper cross-shaped portion 266 of passageway 251. Here, as adjusting member 242 is pulled upward, friction member 252 follows and performs two functions. First, friction member 252 stops the user from pulling adjusting member 242 completely out of cylinder 248 when friction member 252 moves to the lower edge of the cross-shaped section of passageway 251. Second, friction member 252 applies a force on the internal surface 264 of cylinder 248 that maintains adjusting member 242 in a current position until adjusting member 242 is affirmatively forced into some other position.

With ribs 296 received in the cross-shaped section of passageway 251, when handle member 288 is rotated as indicated by arrow 309, shaft 290 and cylinder 248 follow suit and rotate. As cylinder 248 rotates, slider member 250 moves upward (see arrow 311) or downward therealong with fin member 272 journaled in channel 236, depending on which way member 288 is rotated.

Figure 11:
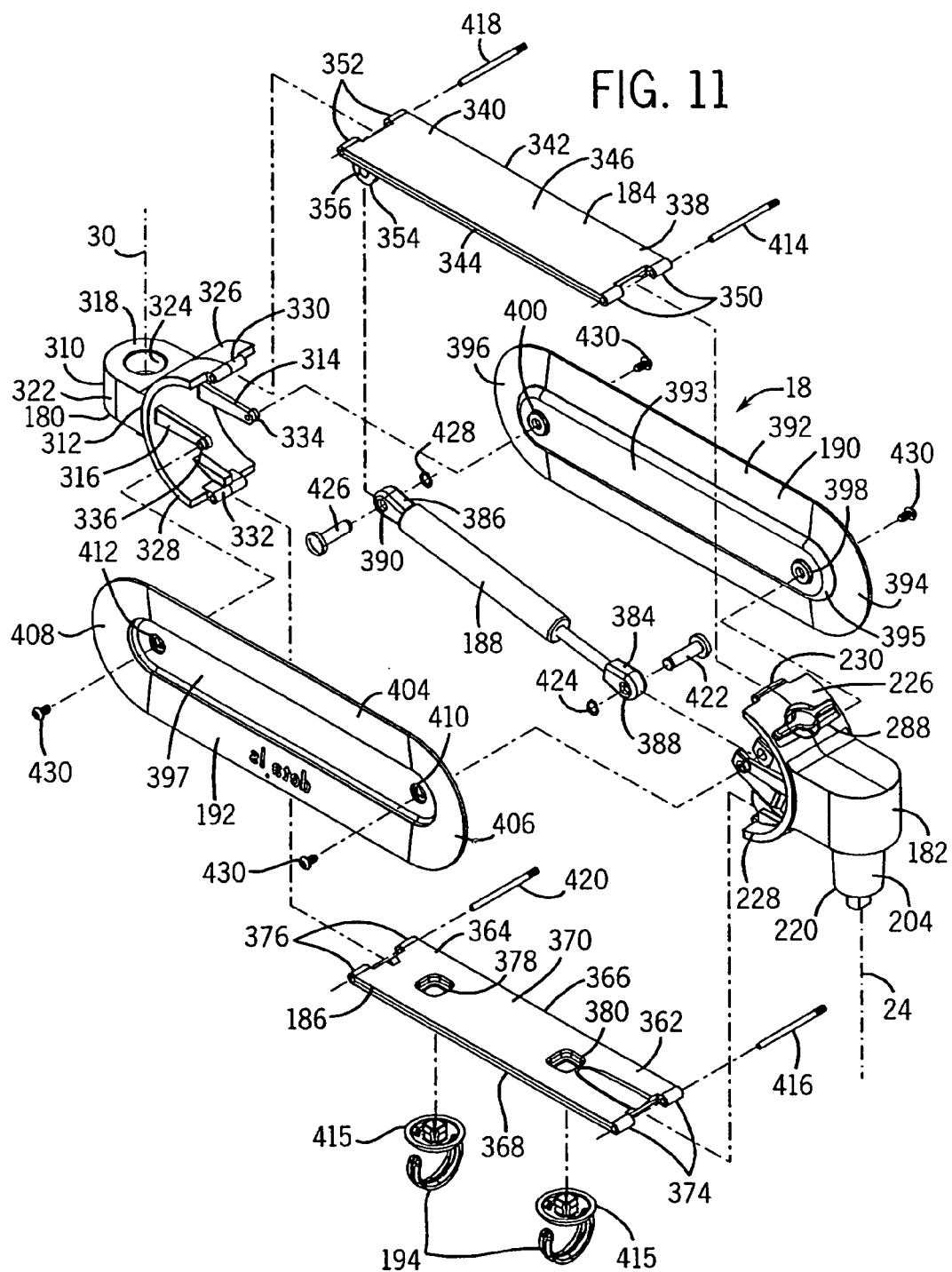
FIG. 11 is an exploded view of the upper arm subassembly of FIG. 1.

Referring to FIGS. 11, 16 and 18, first yoke member 180 includes a shoulder member 310, a C-shaped member 312 and first and second cover mount members 314 and 316, respectively. Shoulder member 310 is generally a semi-cylindrical member including a top surface 318, an undersurface 320 (see FIG. 5) and a semi-cylindrical lateral surface 322. Shoulder member 310 forms an opening 324 centered on second vertical axis 30 that extends between the top and under surfaces 318 and 320, respectively.

C-shaped member 312, as the label implies, includes a rigid generally C-shaped member that is integrally formed with shoulder member 310 at a central portion and that includes upper and lower distal ends 326 and 328 that extend upward and away from and downward and away from shoulder member 310, respectively. At upper distal end 326, member 312 forms a roller channel that is perpendicular to the axis 308 about which opening 324 is formed. Similarly, member 312 forms a roller channel 332 at lower distal end 328 that is parallel to roller channel 330. Channels 330 and 332 are juxtaposed such that a line 331 that passes through both channels (i.e., perpendicular to each channel) is parallel to axis 30 as illustrated in FIG. 16. In the illustrated embodiment, the distance between channels 330 and 332 is identical to the distance between channels 230 and 232.

Referring still to FIG. 11, cover mount member 314 extends from a midsection of C-shaped member 312 in the same general direction as distal ends 326 and 328 adjacent a lateral edge of member 312. Member 314 extends to a distal end where, in the illustrated embodiment, a threaded aperture is formed at a coupling point 334. Similarly, cover mount member 316 extends from a midsection of C-shaped member 312 adjacent to lateral edge of member 312 generally in the same direction as distal ends 326 and 328 to a distal end where a threaded aperture is provided at a coupling point 336. The coupling points 334 and 336 are located generally midway between roller channels 330 and 332 (i.e., midway along the straight line 331 that passes through both channels 330 and 332).

Referring to FIGS. 11 and 16, upper link member 184 is a rigid flat and planer member having first and second ends 338 and 340, respectively. A first lateral edge 342, a second lateral edge 344, a top surface 346 and an undersurface 348. Link member 184 forms a first separated pair of roller channels 350 at first end 338 and a second pair of separated roller channels 352 at second end 340. The channels of pair 350 are spaced apart such that channel 230 (see FIG. 12) is receivable therebetween. Similarly, the channels of pair 352 are separated such that channel 330 is receivable therebetween.

Proximate second end 340, a pair of leg members 354 (only one illustrated) extend from undersurface 348 of link member 184. Leg members 354 are parallel and form a gap (not illustrated) therebetween. Each of the leg members 354 forms an opening 356 (one illustrated in FIG. 11) and the openings 356 are aligned axially.

Lower link member 186 is a generally flat, planer and rigid member having dimensions similar to those of upper link member 184. To this end, link member 186 includes a first end 362, a second end 364, a first lateral edge 366, a second lateral edge 368, a top surface 370 and an undersurface 372. Link member 186 forms a first separated pair of roller channels identified by numeral 374 at first end 362 and a second separated pair of roller channels 376 at second end 364. Here, referring also to FIG. 12, channels 374 are separated by a gap such that roller channel 232 is receivable therebetween. Similarly, channels 376 are separated by a gap such that channel 332 (see FIG. 11) is receivable therebetween. Openings 378 and 380 are formed through link member 186 and generally equispaced along the length thereof for receiving mounting portions of retaining members 194. In the illustrated embodiment, apertures 378 and 380 are each generally square in shape.

Referring again to FIGS. 11 and 16, spring 188 is a gas spring that includes first and second ends 384 and 386 where, when end 384 is forced toward end 386, the spring becomes loaded and applies a force in the opposite direction. Spring 188 forms apertures 388 and 390 at first and second ends 384 and 386, respectively.

Referring still to FIG. 11 and also now to FIG. 17, first cover member 190 is, in general, a rigid and substantially flat member that includes a central rectilinear portion 392 and first and second semi-circular portions 394 and 396 at opposite short ends of the rectilinear portion 392. Portions 392, 394 and 396 are integrally formed in at least some embodiments. Member 190 forms a first opening 398 that is, in at least some embodiments, aligned with an axis of first semi-circular portion 394. Similarly, member 190 forms a second opening 400 that is axially aligned with second semi-circular portion 396. The curved edges of semi-circular portions 394 and 396 are dimensioned to be similar to the curved contours formed by C-shaped members 206 and 312.

Referring still to FIGS. 11 and 17, in at least some embodiments, a central portion 402 of cover member 190 that includes the portion that forms openings 398 and 400 is recessed so that an internal surface 393 of member 190 forms a raised central portion 395. Cover member 190 mounts via two small screws 430 to the threaded apertures at coupling points 240 and 334 (i.e., screw shafts 430 extended through openings 400 and 430 and are secured at points 240 and 334). When cover member 190 is mounted at coupling points 240 and 334, a gap 434 exists between an internal surface 393 of cover member 190 and adjacent lateral edges of C-shaped members 206 (see FIG. 13) and 312 (see FIG. 11) and adjacent lateral edges 342 and 366 of link members 184 and 186. Thus, during relative movement of upper arm subassembly 18 components, cover 190 simultaneously rotates about coupling points 240 and 334 and does not bind with edges of adjacent components.

Referring still to FIGS. 11 and 17, second cover member 192 has a configuration similar to that of first cover member 190, and therefore, in the interest of simplifying this explanation, the detail of cover member 192 will not be described here. Instead, it should suffice to say that second to cover member 192 includes a rectilinear portion 404, a first semi-circular portion 406 and a second semi-circular portion 408, forms first and second openings 410 and 412, respectively, and may include a raised central portion 397 so that the central portion 397 is offset from an edge portion such that when cover member 192 is mounted at coupling points 238 and 336, cover member 192 does not bind with adjacent lateral edges of members 206, 312, 184 and 186 during component movement.

Referring to FIGS. 11 and 16, retaining members 194 may take any of several different forms. In the illustrated embodiment, retaining members 194 each comprise a C-shaped hook that extends down from a mounting post 415 where the mounting posts 415 are configured to be press fit into apertures 378 and 380 formed by lower link member 186. When retaining members 194 are mounted to link member 186, the hook portions thereof extend downwardly from undersurface 372.

Referring to FIGS. 11, 12 and 13, to assemble upper arm subassembly 18, after force adjustment subassembly 200 has been installed as described above, roller channel pair 350 is aligned with roller channel 230 and a dowel pin 414 is forced through the aligned passage formed thereby to secure first end 338 of upper link member 184 to upper distal end 226. Similarly, roller channel pair 374 is aligned with roller channel 232 and a dowel pin 416 is forced through the resulting aligned passage to secure first end 362 of member 186 to lower distal end 228. In addition, a dowel pin 418 is used to secure channel pair 352 to channel 330 and another dowel pin 420 is used to secure channel pair 376 to roller channel 332 thereby forming a four bar mechanism.

Next, referring to FIGS. 11 and 16, aperture 388 formed at first end 384 of spring 188 is aligned with openings 282 and 284 formed in slider leg members 274 and 276, respectively, a pin 422 is slid through the aligned aperture and openings and a C-clamp washer 424 is secured to a distal end of pin 422. Similarly, second spring end 386 is positioned between leg members 354 so that openings 356 formed by leg members 354 are aligned with aperture 390. A pin 426 is slid through the aligned openings 356 and aperture 390 and a C-clamp washer 428 is attached to the distal end to secure pin 426 within the openings and aperture. Continuing, retaining members 194 are attached to link member 186 by pressing mounting posts 415 into apertures 378 and 380 such that hooks formed thereby extend below undersurface 372 of member 186.

Referring once again to FIGS. 1, 11 and 17, cover members 190 and 192 are mounted to mount members 208, 210, 314 and 316 via four screws collectively identified by numeral 430. To this end, the shafts of two of the screws 430 pass through openings 410 and 412 formed in cover member 192 and are received in threaded apertures formed at coupling points 238 and 336, respectively. Similarly, the shafts of the other two screws 430 pass through openings 398 and 400 formed by cover member 190 and into threaded apertures at coupling points 240 and 334. When cover members 190 and 192 are mounted, the cover members generally close the space between link members 184 and 186 and, in at least some embodiments, the small gaps best illustrated in FIG. 15 and identified by numerals 434 and 436 are formed between lateral edges of link members 184 and 186 and lateral edges of C-shaped members 206 and 312 and facing lateral edges of cover members 190 and 192 so that cover members 190 and 192 do not bind with other components during relative movement.

Figure 20:
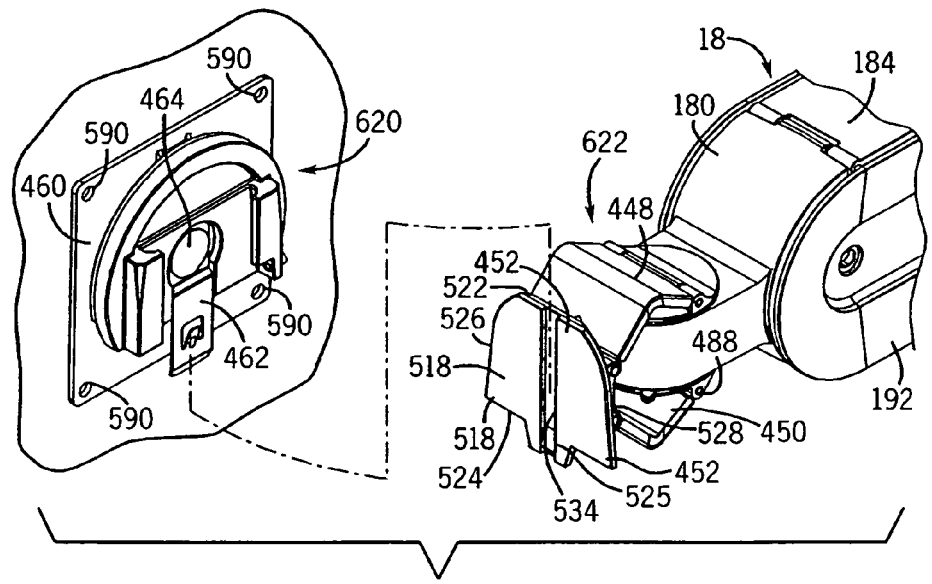
FIG. 20 is a perspective view illustrating the pan/tilt subassembly of FIG. 1, albeit where a pan subassembly has been removed from a tilt subassembly.
Figure 21:
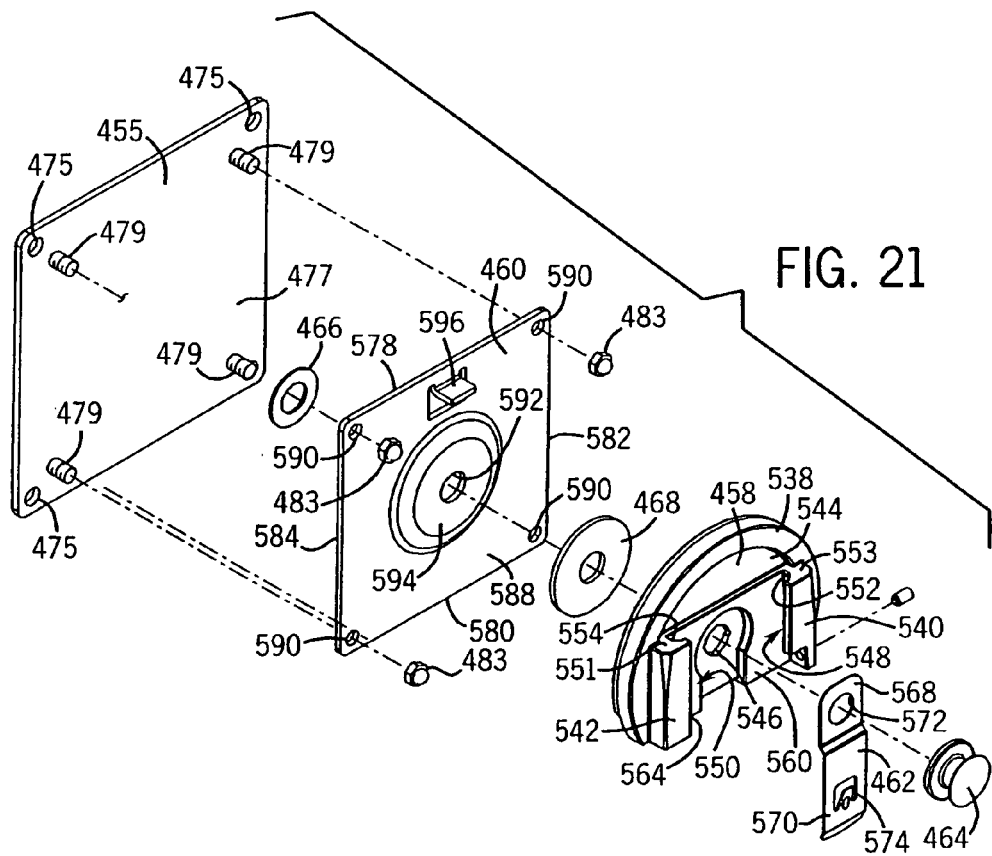
FIG. 21 is an exploded view of the pan subassembly of FIG. 20.

Referring once again to FIG. 1 and also to FIGS. 19, 20 and 21, pan/tilt subassembly 20 includes a tilt subassembly 622 and a pan assembly 620. Tilt subassembly 622 includes, among other components, an upper disk member 440, a lower disk member 442, a first washer 444, a second washer 446, a first elbow link member 448, a second elbow link member 450, a first mount member 452, a first binder clamp 454 and a second binder clamp 456.

Upper disk member 440 includes a generally flat circular member 472 and a post 478. Circular member 472 includes a top surface 474 and an oppositely facing bottom surface 476. Post 478 extends from a central portion of bottom surface 476, has a cylindrical shape and has a radial dimension such that post 478 is snugly receivable within a top portion of opening 324 formed by shoulder member 310. Post 478 forms a threaded opening in a distal end thereof. On top surface 474, circular member 472 forms a pair of spaced apart and aligned roller channels 482 that are perpendicular to an axis about which opening 480 is formed.

Lower disk member 442 is configured in a similar fashion to upper disk member 440 and therefore, in the interest of simplifying this explanation, will not be described here in detail. It should suffice to say that lower disk member 442 includes a flat circular member 484, a post member 486 dimensioned to be receivable within a lower portion of opening 324 formed by shoulder member 310 and a pair of spaced apart roller channels 488 (only one illustrated). One difference between disc members 440 and 442 is that, instead of forming a threaded opening 480, lower disc member 442 forms a recessed opening 600 that passes axially through disc shaped member 484 and post 486. When each of posts 478 and 486 is received in shoulder member opening 324, opening 600 is aligned with threaded opening 480.

Referring to FIGS. 18 and 19, elbow link member 450 includes first and second flat rigid members 500 and 502. Members 500 and 502 are integrally formed along a common edge such that member 502 extends away from member 500 at an angle ζ where angle ζ is greater than 90 degrees in at least some embodiments. In the illustrated embodiment, angle ζ is approximately 110 degrees. At a proximal end, link member 450 forms a single roller channel 504 where channel 504 has a length dimension such that it is receivable within the space formed between the pair of roller channels 488 formed by lower disk member 442. At a distal end opposite roller channel 504, member 450 forms a pair of aligned and spaced apart roller channels 506. Member 502 forms a threaded aperture 508 that extends there through and that is generally located between the channels of pair 506.

Elbow link member 448 is similar in construction and operation to link member 450 and therefore, in the interest of simplifying this explanation, is not described here in detail. It should suffice to say that elbow link member 448 includes first and second integrally formed members 496 and 498 that form an angle ζ therebetween where a single roller channel 510 is formed at a proximal end and a pair of aligned spaced apart roller channels (only one identified by numeral 512 in FIG. 16) are formed at a distal end and where a threaded aperture 514 is formed by second member 498 proximate the distal end and generally between the channels of pair 512.

Binder clamps 454 and 456 are identical and therefore only clamp 456 is described here in any detail. Clamp 456 is generally a stamped elongated metal piece where one end thereof is formed into a C-shape and the other end is flat. Clamps 454 and 456 form holes at the flat ends.

Referring to FIGS. 18 through 20, first mount member 452 is a multi-featured integrally formed member which, in at least some embodiments, will be formed of molded plastic. Member 452 is generally a flat member including a front surface 518, a rear surface 520, a top edge 522, a bottom edge 524 that forms a latch surface, a first lateral edge 526 and a second lateral edge 528. Mount member 452 forms an upper pair of aligned and separated roller channels 530 and a lower pair of aligned and separated roller channels 532 where the channel pairs 530 and 532 are parallel and are separated with pair 530 relatively closer to top edge 522 and pair 532 relatively closer to bottom edge 524. For example, in at least some embodiments, pairs 530 and 532 may be separated by one or more inches. Pair 532 forms a gap therebetween such that roller channel pair 506 formed by member 450 is receivable therebetween. Similarly, pair 530 forms a gap therebetween such that the roller pair 512 formed by member 448 is receivable therebetween. Referring specifically to FIG. 18, in the illustrated embodiment channel pairs 530 and 532 are closer together than are channel pairs 482 and 488 when disc members 440 and 442 are mounted to shoulder member 310. Where pairs 530 and 532 are closer than pairs 440 and 442, dual movement (i.e., tilting and height adjustment) results as member 452 moves with respect to disc members 440 and 442 as is described in greater detail below with reference to FIG. 24.

Each of first and second lateral edges 526 and 528 taper toward each other from bottom edge 524 toward top edge 522 and form bearing surfaces. In addition, each of lateral edges 526 and 528 taper toward each other from front surface 518 toward rear surface 520. Referring specifically to FIG. 20, front surface 518 forms an elongated channel 534 that separates surface 518 into halves, that is generally equidistant from edges 526 and 528 and that extends from upper edge 522 to lower bottom edge 524. At lower edge 524, a ramp 525 tapers from a base surface 527 of the channel 534 toward front surface 518 and terminates at lower edge 524.

Referring once again to FIGS. 18 and 19, to assemble tilt subassembly 622 and mount subassembly 622 to the distal end of upper arm subassembly 18, the following process is performed. First, post 478 of upper disk member 440 is placed through the opening formed by washer 444 and is received within the upper half of opening 324 formed by shoulder member 310. Next, post 486 of disk member 442 is placed through the opening formed by washer 446 and is received within the lower half of opening 324 formed by shoulder member 310. The shaft of a threaded screw 598 is fed up through opening 600 formed by lower disk member 442 and is threadably received within opening 480.

Continuing, channel pair 506 is positioned between channel pair 532 formed by mount member 452 and a dowel pin 606 is forced through the aligned passageway to mount elbow link member 450 to mount member 452. Similarly, a dowel pin 608 is used to mount elbow link member 448 to mount member 452 via channel pairs 512 and 530.

Next, the C-shaped portion of binder clamp 456 is placed around the portion of dowel pin 606 that resides between the channels of pair 506 and the shaft of a small screw 604 is passed through the hole formed by binder clamp 456 and into opening 508 to secure clamp 456 to member 450. Similarly, a small screw 602 secures binder clamp 454 to member 498 via hole 514.

Roller channel 510 is positioned between the channels of pair 482 and a dowel pin 610 is forced through the aligned passageways to secure member 448 to disk member 440. Similarly, a dowel pin 612 is used to secure elbow link member 450 to lower disk member 442 via channel 504 and channel pair 488. At this point, subassembly 622 will appear as in FIG. 20.

Referring to FIGS. 18-21 and 21A, pan subassembly 620 includes a second mount member 458, a rotating plate 460, a leaf spring or latch member 462, a rivet 464, a washer 466, another washer 468 and a lock screw 470. Second mount member 458 is a multi-featured integral member that, in at least some embodiments, is formed of molded plastic. Member 458 includes a central member 544, a track member 538 and first and second channel members 540 and 542, respectively. Central member 544 includes a front surface 556, a rear surface 560 and lower edge 564. Central member 544 forms a central opening 546. Rear surface 560 forms a recess about opening 546 that extends to bottom edge 564. Channel members 540 and 542 extend from rear surface 560 and are located on opposite lateral sides of recess 562. Channel member 540 forms a first channel 548 while channel member 542 forms a second channel 550 where channels 548 and 550 generally include oppositely facing first and second bearing surfaces 552 and 554, respectively. While bearing surfaces 552 and 554 are generally parallel, in the illustrated embodiment, surfaces 552 and 554 converge toward each other at top ends 551 and 553 and, in at least some embodiments, form a space therebetween that compliments (e.g., mirrors) the form defined by oppositely facing lateral edges 526 and 528 of first mount member 452. Thus, first mount member 452 is receivable within the space between channel members 540 and 542.

Referring to FIG. 21A, track member 538 is a generally C-shaped member that circumscribes central member 544 where the arc in the C-shaped member is open near bottom edge 564 of central member 544. Track member 538 forms a recessed track 565 along its C-shaped length that is equidistant from opening 546 and that opens to a front side (i.e., opens in the same direction that front surface 544 faces). Track 565 is limited at opposite ends by stop surfaces 567 and 569

Leaf spring or latch member 462 is an elongated metal spring member having a proximal end 568, distal end 570 and a central portion between the ends. Spring 462 forms an opening 572 at proximal end 568 and forms a finger member 574 at the central portion that extends outward near distal end 570. Proximal end 568 is dimensioned to be receivable within recess 562 formed by central member 544 so that distal end 570 can extend therefrom past lower edge 564 (see specifically FIG. 20).

Rotating plate 460 is a rigid square and essentially flat member having a top edge 578, a bottom edge 580, a first lateral edge 582, a second lateral edge 584, a front surface (not labeled) and a rear surface 588. Plate 460 forms four mounting apertures collectively identified by numeral 590, a separate aperture 590 proximate each of the four plate corners. In addition, plate 460 forms a central opening 592 which, in the illustrated embodiment, is surrounded by a recessed front surface (again, the front surface not illustrated) such that a raised portion 594 circumscribes opening 592 on rear surface 588. A finger member 596 extends from rear surface 588 adjacent top edge 578 equidistant between apertures 590 on either side thereof. A dimension between opening 592 and finger member 596 is similar to the dimension between second mount member opening 546 and recessed track 565 (see FIGS. 21 and 21A) such that, when openings 592 and 546 are aligned, finger member 596 is aligned with and receivable in track 565.

Referring now to FIGS. 18 and 21, to assemble pan subassembly 620, proximate end 568 of spring 462 is positioned within recess 562 so that openings 568 and 546 are aligned and so that distal end 570 extends through recess 562 and generally away from bottom edge 564. Next, washer 468 is sandwiched between raised portion 594 and a facing surface of member 458 such that the washer opening as well as central opening 592 are aligned with openings 546 and 572. Rivet 464 and washer 466 are used to secured all of the other components together by passing the shaft of rivet 464 through the aligned openings. After rivet 464 is secured, pan subassembly 620 will appear as in FIG. 20.

Referring to FIGS. 18 and 20, pan subassembly 620 is mountable and dismountable from tilt subassembly 622 as follows. To mount pan subassembly 620, subassembly 620 is positioned so that channels 550 and 548 formed thereby are above tapered lateral edges 528 and 526, respectively, with finger member or latch 574 aligned with channel 534. Subassembly 620 is lowered until finger member 574 slides over ramp 525 which compresses spring 462 (see phantom in FIG. 18) as lateral edges 526 and 528 enter channels 548 and 550. Eventually, finger member 574 passes below lower edge 524 and spring 462 springs back to a normal position where finger member 574 is adjacent lower edge 524. At this point, lateral edges 526 and 528 bear against surfaces 552 and 554 and are retained in channels 548 and 550 and finger member 574 holds subassembly 620 to first mount member 452.

To disconnect pan subassembly 622 from tilt subassembly, a user pushes distal end 570 of spring 462 toward rear surface 588 (see phantom in FIG. 18) until finger member 574 clears ramp member 525. Once finger member 574 clears ramp member 525, the user is free to lift subassembly 620 upward to disconnect.

Next an assembly process to connect base subassembly 14 to a supporting structure (e.g., the edge of work surface), to connect lower arm subassembly 16 to base subassembly 14 and to connect upper arm subassembly 18 to lower arm subassembly 16 is described.

Referring once again to FIGS. 2, 4 through 6, 9 and 10, prior to mounting base subassembly 14 to a work surface and the like, lower arm subassembly 16 is mounted to base subassembly 14. To this end, bushing 46 is placed in cavity 56 and the lower end of arm subassembly 16 including post 116 is placed within bushing cavity 90. Here, once post 116 is generally within cavity 90, arm subassembly 16 should be rotated about first vertical axis 22 until key 130 drops down into the space between stop surfaces 60 and 62 (see specifically FIG. 6) and end post 124 drops down through opening 49 (see specifically FIGS. 9 and 10). Arm subassembly 16 is forced downward until flange 86 is sandwiched between upper edge 64 of cup-shaped member 54 and limiting surface 118 (see FIGS. 9 and 10). When so positioned so that bushing 46 has been forced into opening 56 the maximum amount, ribs 92 on the external surface of bushing 46 compress and deform at least somewhat to compensate for imperfect component form. As seen in FIG. 10, the threaded shaft of a bolt 624 is received in threaded opening 128 with a bolt head butting up against a surface that circumscribes opening 49 to secure subassembly 16 to subassembly 14.

Referring still to FIGS. 4 and 5, to secure base subassembly 14 to a work surface or the like, the shaft of threaded tightening rod 42 is received within the opening formed by member 76 of clamp member 40. Next, clamp member 40 is secured to extension member 28 via screws 78 and one of the pairs of threaded apertures 70 or 72, depending upon work surface thickness. Foot member 43 is disposed on the distal end of rod 42. Continuing, subassembly 14 is moved to the edge of a supporting work surface and is slid toward the edge such that the edge is received between foot member 43 and foot members 44. Tightening rod 42 is rotated to force foot member 43 into contact with the bottom of the work surface such that the work surface is clamped between foot member 44 and foot member 43.

Referring now to FIGS. 8 and 12, to mount upper arm assembly 18 to lower arm assembly 16, bushing 104 is placed in cavity 144, post member 204 is placed within the cavity formed by bushing 104 and is forced along second vertical axis 24 until end post member 222 extends through opening 138. Again, as post member 204 is forced into the bushing cavity, the bushing ribs 146 deform to compensate for component imperfections. The threaded shaft of a bolt 626 is received within threaded opening 224 with the bolt head butting up against a surface circumscribing opening 138. Bolt 626 is tightened to secure subassembly 18 to subassembly 16.

Referring once again to FIG. 20, to secure pan subassembly 620 to a rear surface of a display, apertures 590 are aligned with similarly spaced apertures on the rear surface of the display and the shafts of four screws (not illustrated) are passed through apertures 590 and are received within the similarly arranged holes in the rear surface of the display.

Referring again to FIGS. 2, 5 and 8, after subassemblies 14, 16, 18 and 20 have been configured as described above, power and data cables/wires 710 (see phantom in FIGS. 2 and 22) for display 12 can be routed from below the support surface to display 12 through opening 170 and into lower arm cavity 148, out of cavity 148 through opening 172, through the C-shaped hook portions of retaining members 194 and to rear surface hook-ups on display 12. To help feed the cables/wires 710 through cavity 148, cover member 158 can be removed and subsequently replaced.

Figure 2:
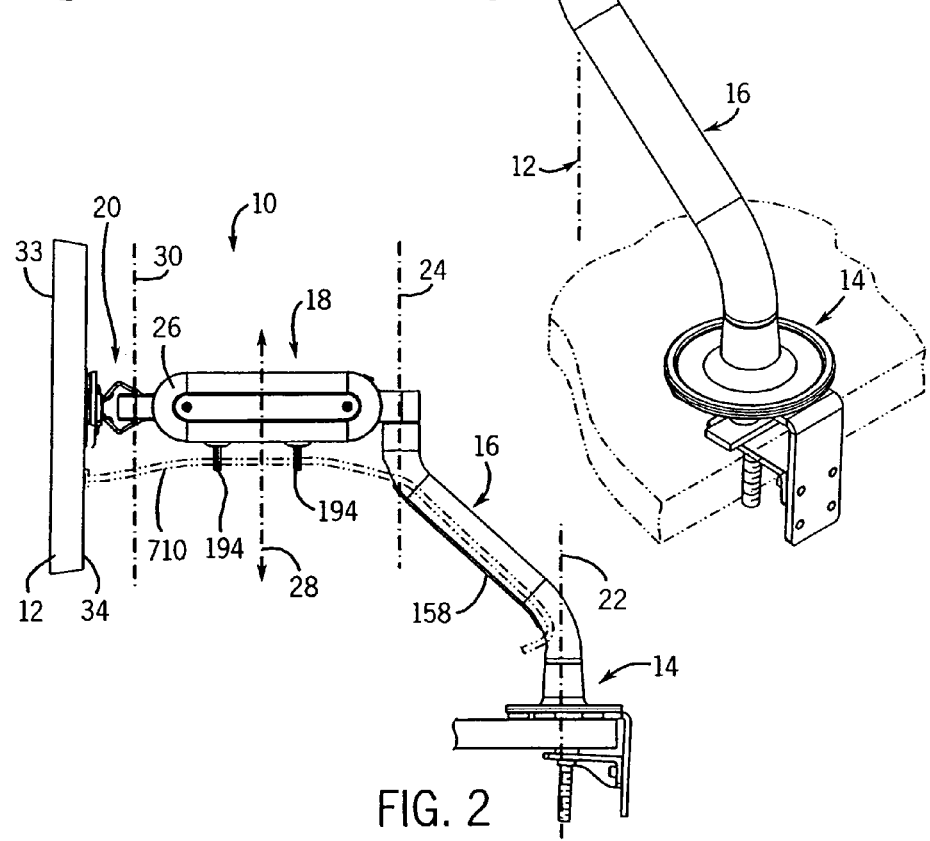
FIG. 2 is a side plan view of the arm of FIG. 1.
Figure 22:
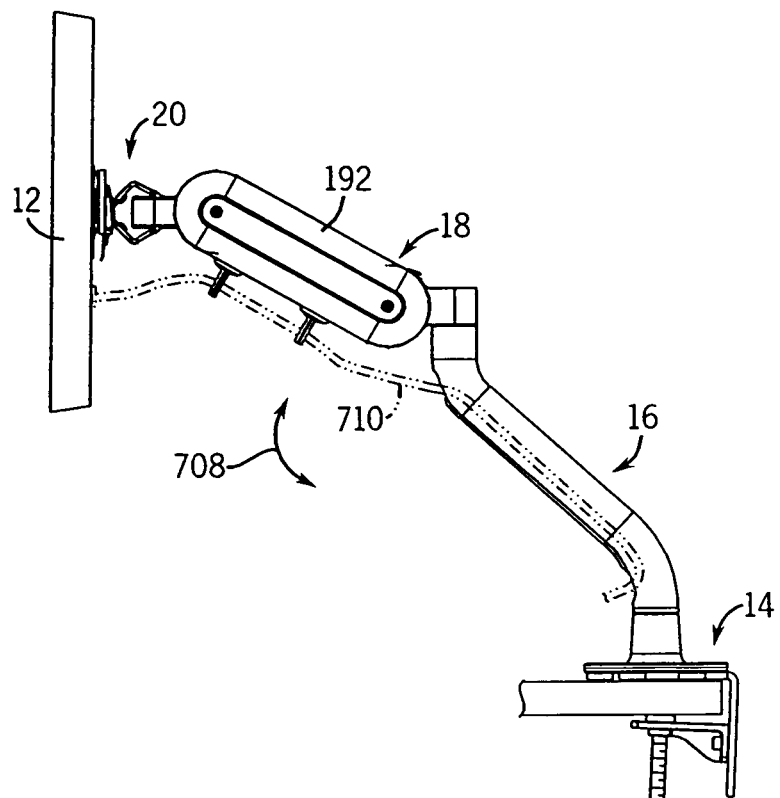
FIG. 22 is a view similar to FIG. 2, albeit illustrating the arm subassemblies in a different relative juxtapositions.

Referring now to FIGS. 2 and 3, it should be appreciated that arm assembly 10 can be used to position display 12 in many different positions. Referring also to FIG. 22, a user can apply a force to move display 12 upward or downward (not illustrated) without tilting display 12 and upper arm subassembly 18 will accommodate the movement within a range (e.g., 4-7 inches upward or downward) as illustrated by arrow 708. After raising or lowering, when display 12 is released, referring also to FIG. 16, counterbalancing spring 188 operates to maintain subassembly 18 components in the released position (i.e., spring 188 increases position maintenance).

Spring 188 also aids in raising movements and tends to impede lowering movements so that a user has a greater feeling of control during these activities.

Figure 23:
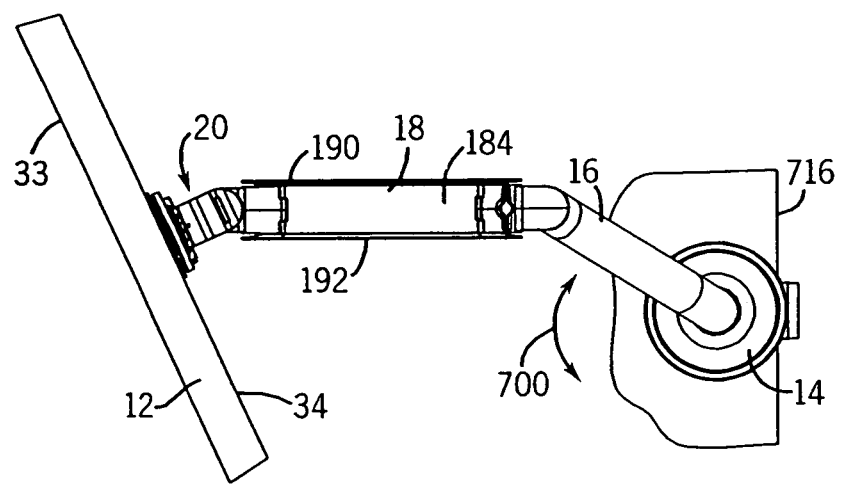
FIG. 23 is a view similar to FIG. 3, albeit illustrating the arm subassemblies in a different relative juxtaposition.

Referring to FIGS. 2 and 6 and also to FIG. 23, lower arm subassembly 16 is rotatable about first vertical axis 22 as illustrated by arrow 700 within the range allowed by key 130 and stop surfaces 60 and 62. Thus, as shown in phantom in FIG. 6, when key 130 contacts surface 62, lower arm subassembly rotation is limited. In the illustrated embodiment lower arm rotation about axis 22 is limited to approximately 180 degrees.

Referring to FIGS. 1 and 23, upper arm subassembly 18 is rotatable about second vertical axis 24 through 3600 while pan/tilt subassembly 20 is rotatable about third vertical axis 30 through approximately 180°.

Figure 24:
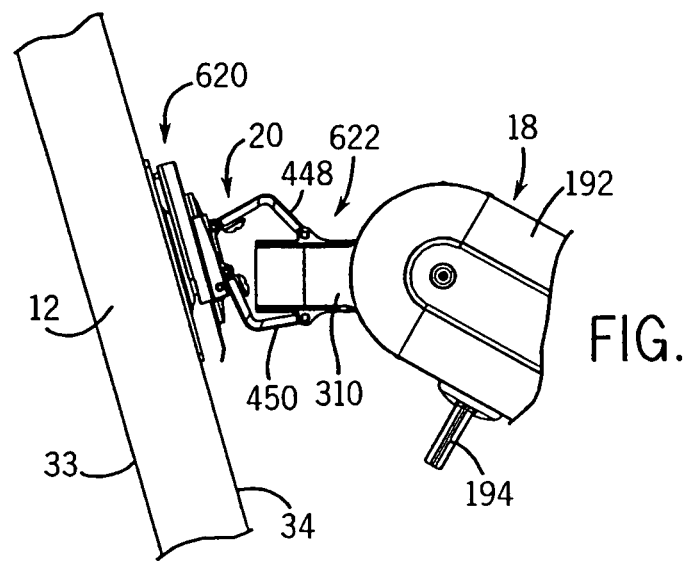
FIG. 24 is a partial view similar to FIG. 22, albeit wherein the pan tilt subassembly is in a different relative position thereby facilitating tilting of a display.
Figure 25:
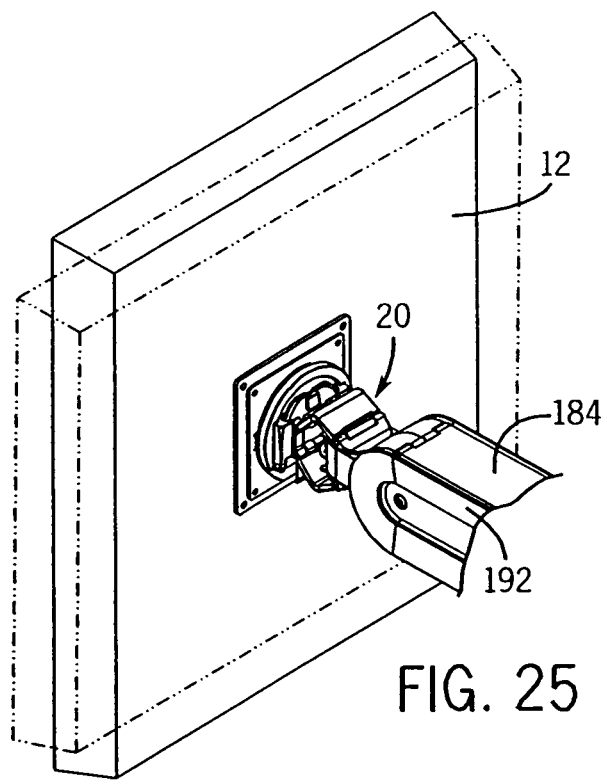
FIG. 25 is a perspective view of a portion of the arm assembly of FIG. 1 where a display supported by the arm assembly has been rotated about a horizontal axis perpendicular to the front surface of the display.

Referring to FIGS. 10 and 24, tilt subassembly 622 enables first mount member 452 and components (e.g., display 12) mounted thereto to tilt upward (as illustrated) and downward (not illustrated) through a range of approximately ±25°, respectively. The elbow link design enables easy and minimal effort tilting action while still facilitating extremely stable position maintenance (i.e., the display stays in any set position after being released). Here, it should be appreciated that tilt subassembly 622 is designed so that display 12 rotates about a horizontal axis that resides in front of rear surface 34 when tilting action occurs as opposed to rotating about an axis where elbow members 448 and 450 are linked to shoulder member 310. Thus, as illustrated in FIG. 24, as a top edge of display 12 is moved forward and a bottom edge is moved rearward, elbow links 448 and 450 also cause display 12 to move upward. Similarly, as the top edge of display 12 is moved rearward and the bottom edge is moved forward, elbow links 448 and 450 cause display 12 to move downward (not illustrated). This dual movement action is ergonomically advantageous as tilting action causes display rotation that is more appropriate given the location of a display user (i.e., the display tends to rotate about the location of a user's eyes as opposed to tilting about an axis that is rearward from the viewing surface).

Referring to FIGS. 1, 2, 21 and 25, display 12 can be rotated about horizontal axis 32 to change display orientation from landscape to portrait. Here, when a user grasps and rotates display 12 about axis 32, rotating plate 460 rotates along with display 12 and relative to second mount member 458 (i.e., about the shaft of rivet 464). Referring also to FIG. 21A, as plate 460 rotates about axis 32, finger member 596 moves within track 565. Eventually, member 596 contacts one of stop surfaces 567 or 569 and rotation is limited. In at least some embodiments member 596 and surfaces 567 and 569 limit rotation to approximately 180° (i.e., 90° in either direction from a central landscape orientation of display 12).

Referring again to FIGS. 12, 14 and 16, to adjust the counterbalancing force applied by spring 188, a user pulls up on edge 306 so that member 242 moves into the force adjusting position illustrated in FIG. 14. Then, as handle member 288 is rotated (see arrow 309 in FIG. 14), proximal end 384 of spring 188 moves along with slider member 250 along rotating member 248. As end 384 moves upward (see phantom in FIG. 16), the applied spring force increases and hence heavier displays can be supported. Referring also to FIG. 2, where a particularly heavy display 12 is to be supported, it is contemplated that cover members 190 and 192 may be removed to expose spring 188 and spring 188 may then be replaced by a more forceful spring mechanism.

In at least some cases, it is contemplated that the mounting holes in the rear surface of a display will have a spacing arrangement that is different than the arrangement of apertures 590 formed by plate 460. In fact, two hole spacing standards have emerged. A first hole spacing standard includes holes spaced 75 mm apart while the second standard includes holes spaced 100 mm apart.

Referring again to FIG. 21, according to one aspect of at least some embodiments, where apertures 590 are 75 mm apart, an adapter plate 455 may be provided that can be positioned between a rear surface of a display and plate 460 to accommodate 100 mm hole spacing. To this end, exemplary adapter plate 455 is a square, flat and rigid member having a rear surface 477 that forms four apertures collectively identified by numeral 475. Apertures 475 form a square where adjacent apertures are separated by 100 mm. Four threaded pem studs collectively identified by numeral 479 extend from rear surface 477 and define a square that is 75 mm on each side. Thus, studs 479 align with apertures 590 formed by plate 460. To mount plate 455 to plate 460, studs 479 are placed through apertures 590 and nuts 483 (only three shown) are tightened thereon. The exemplary adapter plate 455 including studs 479 is considered advantageous over an adapter plate that includes holes instead of studs and that requires bolts to mount plate 455 to plate 460 as bolt heads or associated nuts would have to be positioned between the rear surface of display 12 and the adapter plate 455 in that case and hence a flat adapter plate could not be flush up against the rear display surface.

Referring again to FIG. 23, it should be appreciated that, when desired, lower arm subassembly 16 may be rotated to a point where subassembly 16 extends parallel to a support surface edge 716 to which it is mounted, upper arm subassembly 18 can be rotated to a position where subassembly 18 generally extends above subassembly 16 and subassembly 20 and display 12 can be rotated so that display 12 is generally parallel to edge 716 thereby moving display into a stowed position in front of edge 716 yet generally out of the way of a work surface user. When display 12 is to be used, the user can simply grasp display 12 and move display 12 to a desired position/orientation.

Referring again to FIG. 5, one additional advantage associated with assembly 10 is that, if desired, lower arm subassembly 16 can be removed and upper arm subassembly 18 can be mounted directly to base subassembly 14. This configuration flexibility is facilitated by the fact that the coupler configurations for coupling upper arm subassembly 18 to lower arm subassembly 16 and subassembly 16 to base subassembly 14 are compatible. That is, either of the coupler at the proximal end (e.g., the lower end) of subassembly 16 or the proximal end (e.g., the right most end in FIG. 5) of subassembly 18 is receivable within the cavity formed by bushing 46. Thus, couplers 54 and 108 are both of a first construction and couplers 116 and 204 are both of a second construction where either of the couplers 116 and 204 is receivable within either of the couplers 54 and 108. An exemplary application where the lower arm subassembly may not be required is where base subassembly 14 is to be mounted to the edge of a shelf or the like.

Referring now to FIG. 26, in at least some embodiments it is contemplated that an alternate arm subassembly 720 may be provided as part of a larger arm kit including the subassemblies 14, 16, 18 and 20 described above where several different combinations of subassemblies could be configured depending on specific application requirements. In this regard, it is contemplated that alternate subassembly 720 could be used to replace subassembly 18 when vertical display adjustability is not required. Referring also to FIG. 5, subassembly 720 includes components akin to the proximal and distal portions of subassembly 18 but does include the four bar configuring components that are intermediate the end portions. More specifically, subassembly 720 includes proximal and distal shoulder members 722 and 724 that are akin to shoulder members 202 and 310 in FIG. 5 where shoulder members 722 and 724 are integrally formed. As in the case of subassembly 18, a post member 726 and an end post member 728 extend from an undersurface of proximal should member 722 and have dimensions identical to the dimensions of post members 204 and 222, respectively. Although not illustrated, distal shoulder member 724 forms an opening that is identical to opening 324 formed by shoulder member 310. Thus, pan/tilt subassembly 20 is optionally couplable to shoulder member 724 as illustrated in FIG. 26.

Referring still to FIG. 26 and also to FIG. 5, with pan/tilt subassembly 20 mounted to alternate subassembly 720, posts 726/728 may be received within bushing 104 at the upper/distal end of lower arm subassembly 16 to configure one alternate configuration. Similarly, posts 726/728 may be received in bushing 46 to mount subassembly 720 directly to base subassembly 14 to configure another alternate configuration.

Referring now to FIGS. 27 and 28, alternate base subassemblies 740 and 750 are illustrated. In FIG. 17, alternate base subassembly 740 includes a cup shaped member 742 akin to cup shaped member 54 in FIG. 5 that forms a cavity 744 dimensioned to receive bushing 46. In addition, subassembly 740 includes a lateral extension member 746 that extends from member 742 and a slat wall mounting subassembly 748 for mounting to a slat wall and slat wall features generally are known in the art and therefore subassembly 748 is not described here in detail. It should suffice to say here that slat wall is typically a vertical structure including rails (see phantom) and subassembly 748 is releasably mountable thereto. Here, any of subassemblies 16, 18 or 720 may be mounted to cup-shaped member 742 for rotation about a vertical axis.

In FIG. 28, subassembly 750 includes a cup-shaped member 752 akin to member 54 in FIG. 5. Member 752 forms a cavity 754 for receiving bushing 46. A lateral extension member 756 extends laterally from member 752 and a mounting plate 758 is secured to the distal end of member 756. Plate 758 forms screw holes collectively identified by numeral 760 for mounting subassembly 750 to a wall structure. Here, any of subassemblies 16, 18 or 720 may be mounted to member 752 for rotation about a vertical axis.

Figure 29:
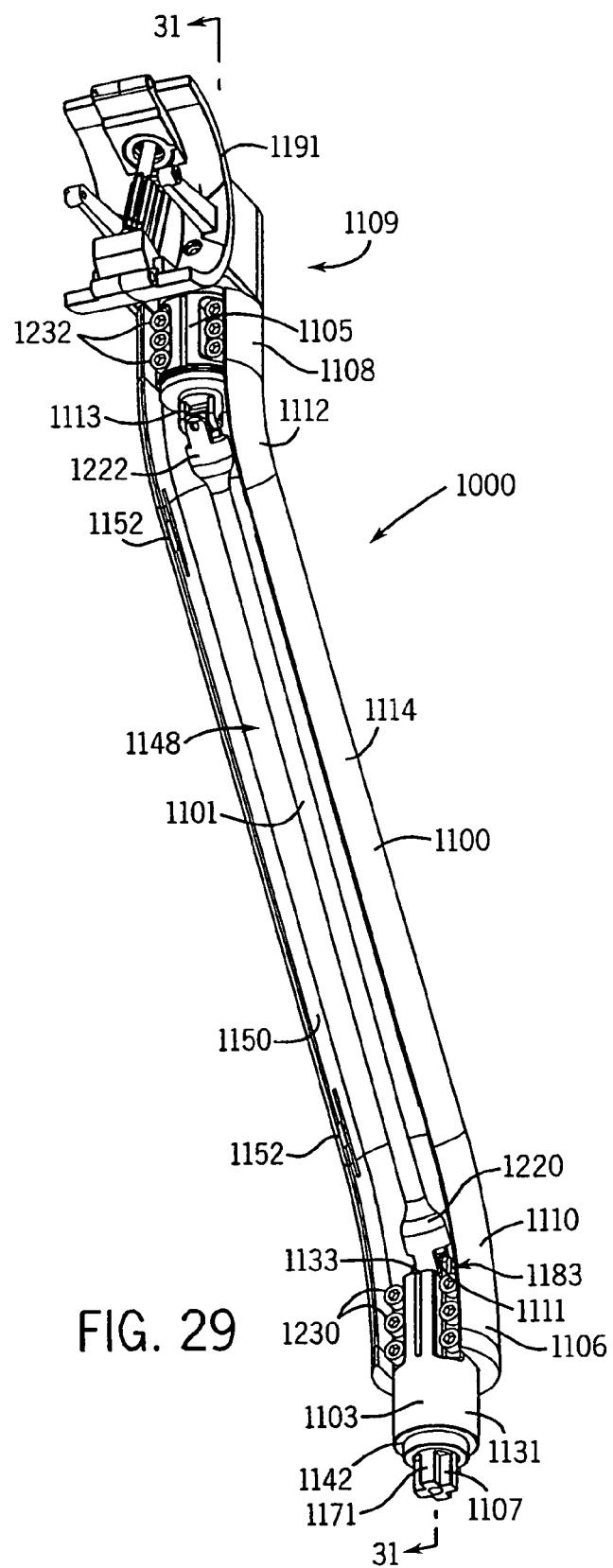
FIG. 29 is a perspective view of a second lower arm assembly embodiment.
Figure 30:
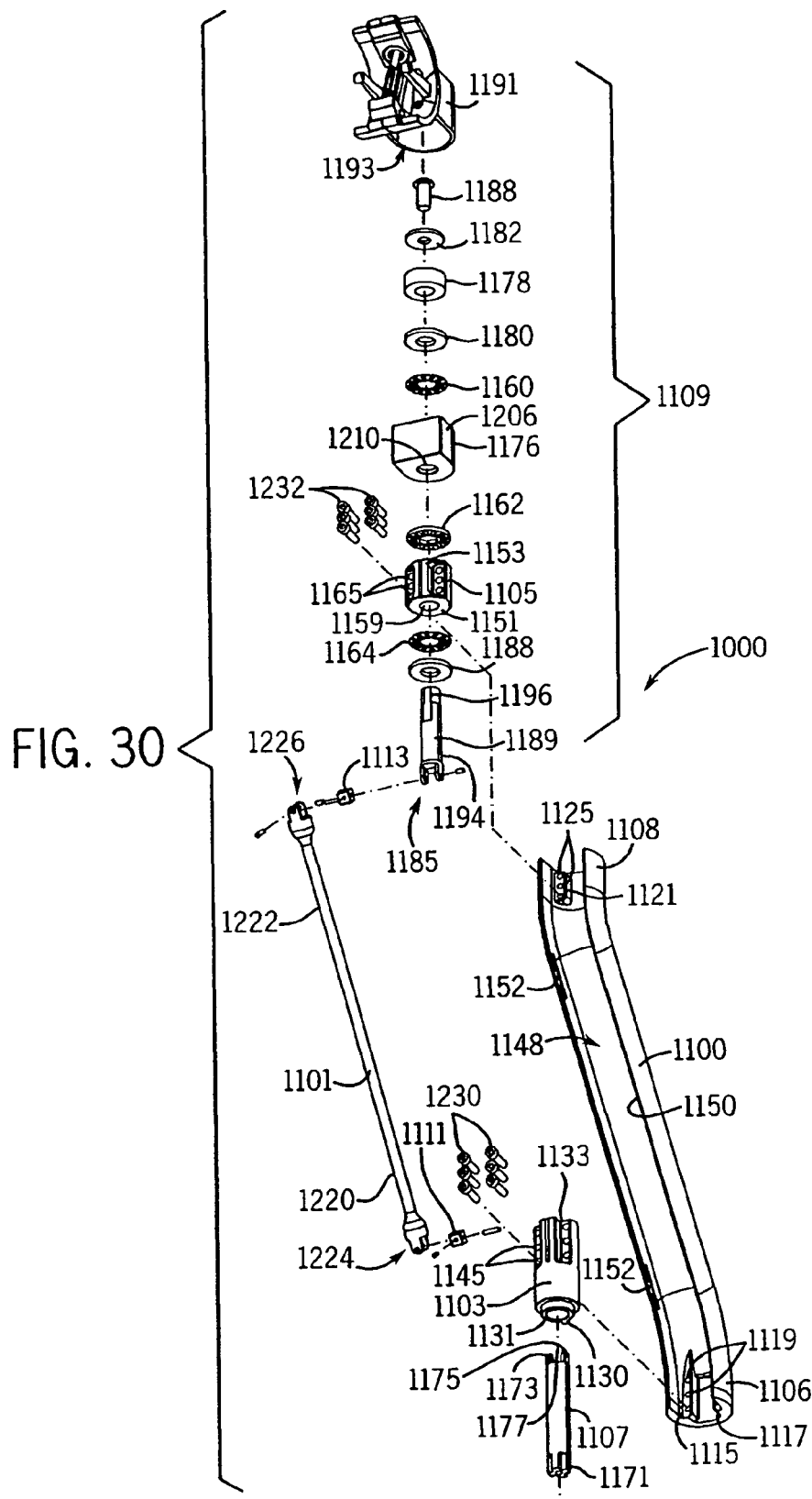
FIG. 30 is an exploded view of the lower arm assembly of FIG. 29.
Figure 31:
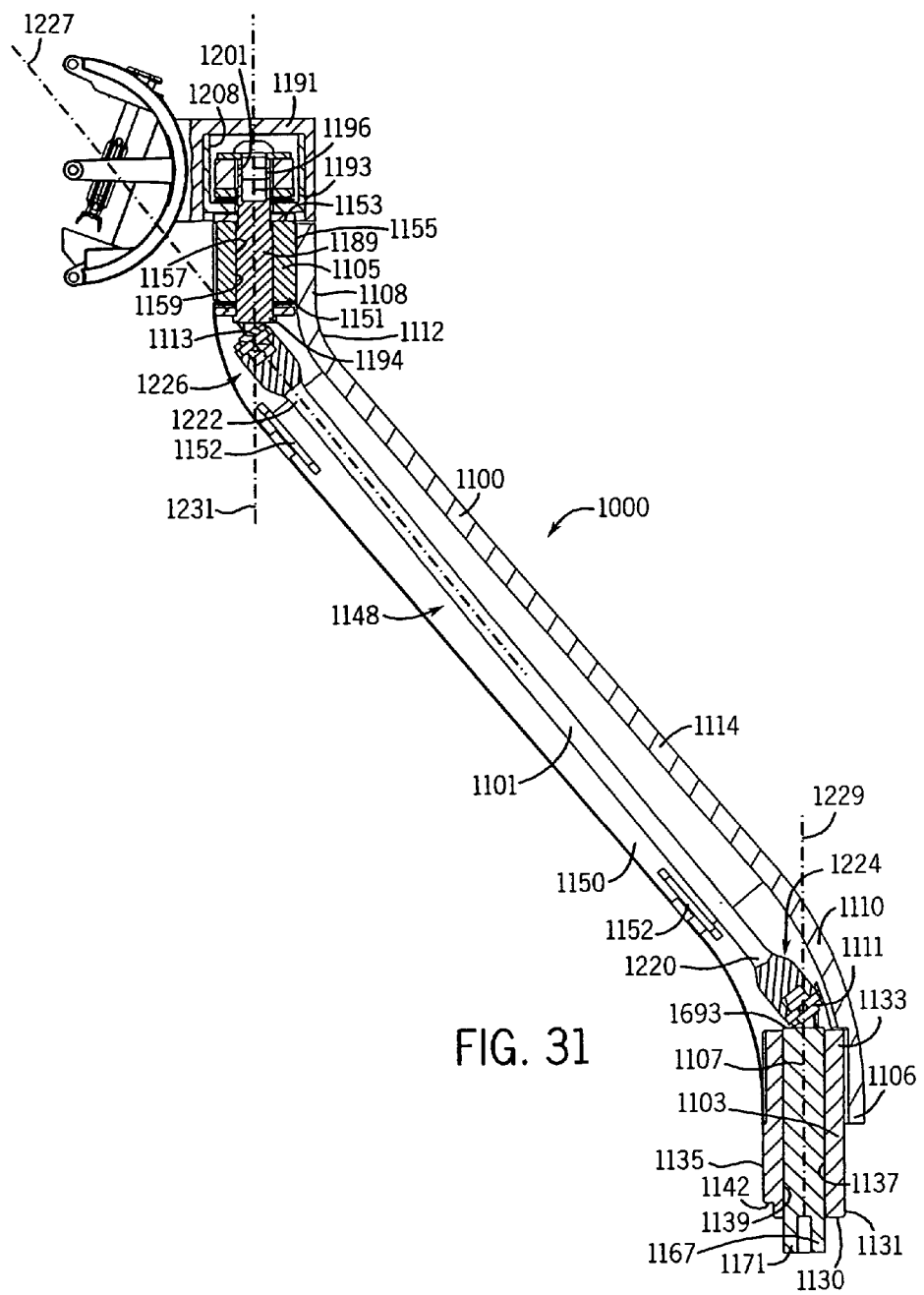
FIG. 31 is a cross sectional view of the arm assembly of FIG. 29 taken along the line 31-31.

Referring now to FIGS. 29 through 31, a second embodiment 1000 of a lower arm assembly is illustrated that includes several features that facilitate display screen movement activity that is particularly advantageous. More specifically, referring again to FIG. 3, with the assembly oriented as illustrated, if a display user wants to push the display screen 12 away from the user and pushes on the right side (i.e., the lower side as illustrated) of the screen 12, screen 12 rotates at 20 about the distal end of upper arm assembly 18 in a counterclockwise direction (as illustrated in FIG. 3) which causes upper arm assembly 18 to rotate in a clockwise direction. Referring still to FIG. 3 and also to FIGS. 29-31, as upper arm assembly 18 makes a slight angle with the lower arm assembly, a linkage formed between a yolk member 1191, an upper linkage post 1189, an intermediate linkage 1101 and a lower linkage post 1107 drives the second embodiment 1000 of the lower arm member in the counterclockwise direction (as illustrated in FIG. 3). Thus, the upper and lower arm assemblies collapse on each other and the screen 12 rotates about location 20 so that the screen remains substantially parallel to its original orientation while still being moved backward away from the original screen position.

To facilitate the above described advantageous movement, arm assembly 1000 includes a rigid arm member 1100, intermediate linkage 1101, a lower collar member 1103, an upper collar member 1105, a lower linkage post 1107, a yolk subassembly 1109, a first transfer block 1111, a second transfer block 1113 and a bushing 1104. Arm member 1100, in at least some embodiments, has a generally tubular appearance. In at least some embodiments member 1100 is an integrally formed member having a proximal or first end 1106 and a distal or second end 1108. Between the first and second ends 1106 and 1108, respectively, arm member 1100 generally has three sections including first and second curved sections 1110 and 1112 that are disposed at the first and second ends 1106 and 1108, respectively, and a substantially straight central section 1114 between the first and second curved sections 1110 and 1112, respectively. As illustrated, each of the curved sections 1110 and 1112 curves essentially the same amount but in opposite directions such that oppositely facing ends of the first and second curved sections (i.e., the ends of arm member 1100) extend along substantially parallel but off-axis trajectories.

Referring still to FIGS. 29-31, a central portion of arm member 1100 including straight section 1114 and adjacent portions of curved sections 1110 and 1112 form a cavity 1148 that extends substantially along the entire length of arm member 1100. In the illustrated embodiment, an opening 1150 is formed into one side (e.g., a lower side) of cavity 1148 along the entire length of cavity 1148 and slots are formed along the length of opening 1150 in oppositely facing edges thereof. Three of the slots are collectively identified by numeral 1152 (oppositely facing slots that face illustrated slots 1152 not illustrated). Proximate ends 1106 and 1108 the cavity opens axially as illustrated.

Referring to FIG. 30, proximate first end 1106 and inside cavity 1148, arm member 1100 forms two mounting surfaces 1115 and 1117 that face out opening 1150. Threaded apertures 1119 are formed in each of the mounting surfaces 1115 and 1117. Similarly, at distal second end 1108 and inside cavity 1148, arm member 1100 forms two mounting surfaces (only one illustrated and labeled 1121) that face out opening 1150. Threaded apertures 1125 are formed in each of the mounting surfaces (e.g., 1121).

Referring to FIGS. 29 through 31, lower collar member 1103 includes a substantially cylindrical and rigid member that includes first and second ends 1131 and 1133, an external surface 1135 and an internal surface 1137 that forms a collar passage 1139. At first end 1131, collar member 1103 forms a recessed edge such that a shelf 1142 is formed so that an end extension or post akin to intermediate post 124 in FIG. 8 is formed. A wedge or pie shaped key 1130 that is akin to key 130 (see again FIGS. 8 and 9) and that serves a similar purpose extends outward from post 1142. At the second end 1133, collar member 1103 forms a plurality of screw holes collectively identified by numeral 1145 that are juxtaposed so that they align with threaded apertures 1119 when the collar member 1103 is received within cavity 1148 proximate first end 1106. Collar member 1103 is dimensioned so that it is fittedly receivable within cavity 1148 at first end 1106. When screw holes 1145 are aligned with apertures 1119, first end 1131 extends from cavity 1148 and forms an extension or post that is akin to post 116 described above and illustrated best in FIG. 8.

Upper collar member 1105 includes a substantially cylindrical and rigid member that includes first and second ends 1151 and 1153, an external surface 1155 and an internal surface 1157 that forms a collar passage 1159. Intermediate first and second ends 1151 and 1153 collar member 1105 forms a plurality of screw holes collectively identified by numeral 1165 that are arranged so that they align with the threaded apertures 1123 when collar 1105 is received within cavity 1148 at the second end 1108. Collar member 1105 is dimensioned so that it is matingly receivable within cavity 1148 at second end 1108. When screw holes 1165 are aligned with apertures 1123, the second end 1153 is substantially flush with the adjacent end 1108 of lower arm member 1100.

Lower linkage post 1107 is an elongated rigid post member that extends between first and second ends 1167 and 1169. Post 1107 is radially dimensioned to be receivable within passage 1139 and has a length dimension such that, when positioned within passage 1139 with collar member 1103 about midway along the length of post 1107, first and second post ends 1167 and 1169 extend out opposite ends of collar member 1103. At the first end 1167, the extending end of post 1107 forms a base member 1171 that is similar to the base member 124 described above with respect to FIG. 8. Here, however, as described in greater detail hereafter, base member 1171 (and post 1107 as a whole) is rotatable about an axis that is formed by passage 1139. At second end 1169, post 1107 includes two spaced apart and parallel axial extensions 1173 and 1175 that extend from end 1169 along a direction that is parallel to the length dimension of member 1107 and that form a gap 1177 there between. Extension 1173 forms a pin hole (not labeled) proximate a distal end and extension 1175 forms another pin hole (not labeled) proximate a distal end where the pin holes are aligned along an axis that is perpendicular to the length of post 1107. Hereafter, unless indicated otherwise, the combined extensions 1173 and 1175 at second end 1169 will be referred to as a first shoulder linkage 1183.

Yolk subassembly 1109 has several features that are similar to the features of yolk subassembly 182 described above with respect to FIGS. 12 and 13 and therefore, in the interest of simplifying this explanation, similar features that operate in a similar fashion will not be described again here in detail. Here, the primary differences between subassemblies 1109 and 182 relate to the structure that is used to link subassembly 1109 for pivotal motion at the upper end 1108 of arm member 1100. To this end, subassembly 1109 includes a yolk member 1191, an upper linkage post 1189, a bolt member 1188, two end washers 1182 and 1188, a central washer 1180, an annular spacer 1178, a pivot block 1176 and first, second and third annular roller races 1160, 1162 and 1164, respectively. Yolk member 1191 is akin to yolk member 198 (see again FIG. 13) except that member 1191 forms a keyed cavity 1193 that opens downward.

Linkage post 1189 is generally an elongated member that extends between first and second ends 1194 and 1196, respectively. Post 1189 is radially dimensioned to be receivable within the passageway 1159 formed by collar 1105. Post 1189 has a length dimension such that, when yolk member 1191 is adjacent collar member 1105 with passageway 1159 aligned with cavity 1192 and when post 1189 is received within passageway 1159, first end 1194 extends out the end of collar 1105 opposite yolk member 1191 and second end 1196 extends into cavity 1193. At first end 1194 linkage post 1189 forms a second shoulder linkage 1185 that is similar to first shoulder linkage 1183 in configuration and operation. Because of the similarity and in the interest of simplifying this explanation, linkage 1185 is not described here in detail: At second end, post 1189 forms an axial threaded opening 1201 that extends partially along the length dimension of post 1189.

Referring still to FIG. 30, bolt member 1188 is an elongated bolt having a head end and a threaded shaft end that is dimensioned to be received in threaded opening 1201. Spacer 1178, as the label implies, is essentially a thick annular washer type member that forms a central axial hole. Pivot block 1176 is a block type member that includes a defining external surface 1206 that has a shape that mirrors the keyed cavity 1153 formed by yolk member 1191. In a top end, block 1176 forms an annular cavity 1208 sized to receive washers 1182 and 1180, bearing race 1160 and spacer 1178. A hole 1210 opens from cavity 1208 through an undersurface of block 1176. Hole 1210 is dimensioned to pass post 1189.

To assemble yolk subassembly, race 1160, washer 1180, spacer 1178 and washer 1182 are positioned within cavity 1208. Second end 1196 of post 1189 is aligned with and slid through washer 1188, race 1164 and collar passage 1156 so that second end 1196 extends from collar end 1105. Next, race 1162 is aligned with and slid onto second end 1196 and the combination of block 1176, race 1160, washer 180 and 1182 and spacer 1178 are aligned with and slid onto second end 1196. At this point the surface of washer 1182 facing spacer 1178 is immediately adjacent second end 1196 of post 1189 and bolt 1188 is aligned with and threadably received in hole 1201. Continuing, cavity 1193 is aligned with the keyed external surface of block 1176 and slid thereover. Although not illustrated, in at least some cases a locking/retaining device (e.g., one or more screws, etc.) may be provided to secure member 1191 only block 1176. In at least some embodiments the races will include a slip bearing feature that operates on friction such that as block 1176 rotates, post 1189 only rotates by half the amount. Thus, for instance, in at least some cases, when bock 1176 rotates completely once, the post 1176 will only rotate through 180 degrees.

Intermediate linkage 1101 includes an elongated and relatively thin rigid rod type member that extends between first and second oppositely extending ends 1220 and 1222, respectively. At the first end 1220, linkage 1101 forms a third shoulder linkage 1224. Similarly, at second end 1222, linkage 1101 forms a fourth shoulder linkage 1226. Linkages 1224 and 1226 are similar to first linkage 1183 in configuration and operation and, because of the similarity and in the interest of simplifying this explanation, linkages 1224 and 1226 are not described here in detail.

Each of transfer blocks 1111 and 1113 have similar constructions and operate in a similar fashion and therefore, in the interest of simplifying this explanation, only block 1111 will be described here in detail. As the label implies, block 1111 is a rigid and substantially cubic block member that includes six sides that form a cube. Four cavities are formed in block 1111 including a pair of cavities formed in a first pair of opposite sides and a second pair formed in a second pair of opposite sides.

To assemble lower arm 1100, the yolk subassembly 1109 is assembled as described above. Next, first transfer block 1111 is positioned in the gap formed between the two axial extensions 1173 and 1175 that form first shoulder linkage 1183 with the pin holes formed in extension 1173 and 1175 aligned with one pair of the cavities formed by block 1111. A first pin (not labeled) is slid through one of the pin holes so that a distal end is received in the aligned cavity and the first pin is secured in the hole so that the pin cannot fall out. Similarly, a second pin (not labeled) is slid through the other aligned pin hole so that a distal end is received in the aligned cavity and the second pin is secured in hole 1181 so that the pin cannot fall out. At this point it should be appreciated that transfer block 1111 is mounted to intermediate linkage 1101 and can rotate about a pivot axis formed by the aligned pin holes.

Second transfer block 1113 is mounted to the second shoulder linkage 1185 in a fashion similar to that describe above with respect to first should linkage 1183. Next, first transfer block 1111 is mounted to third shoulder linkage 1224 and second transfer block 113 is mounted to the fourth shoulder linkage 1226 in a fashion similar to that describe above with respect to the first shoulder linkage, albeit via the second cavity pairs formed by the blocks 1111 and 1113.

A plurality of screws 1230 are used to secure collar 1103 in cavity 1148 at first end 1106 of arm 1100 so that the end of collar member 1103 and the end of lower linkage post 1107 opposite intermediate linkage 1101 extend from first end 1106 of member 1100. Similarly, a plurality of screws 1232 are used to secure collar 1105 in cavity 1148 at second end 1108 of arm 1100 so that the end of collar member 1105 opposite intermediate linkage 1101 is substantially flush with the adjacent end surface of member 1100.

Here, when the distal end of post 1107 is received in the supporting structure, a lateral surface of base member 1171 frictionally contacts a facing surface (e.g., see 49 in FIGS. 9 and 10) of the supporting structure. Here, the friction fit is sufficient to restrain rotation of base member 1171 in the support structure but not to stop the rotation. A bolt (not illustrated) akin to bolt 624 in FIG. 10 may be used to secure arm assembly 1000 to the supporting structure.

Referring again to FIGS. 29-31, once arm assembly 1000 is assembled, intermediate linkage 1101 rotates about a rotation axis 1227 that is angled with respect to the rotation axis 1229 and 1231 associated with the linkage posts 1107 and 1189 where axis 1229 and 1231 are misaligned and substantially parallel.

In operation, referring still to FIGS. 29-31 and also to 1, 2 and 23, as described above, as the yolk member 1191 is rotated during screen movement, the rotation is translated along intermediate linkage 1101 to lower linkage post 1107 and base member 1171 which frictionally engages the surrounding supporting structure. As force is applied to base member 1171, the friction fit between the base member 1171 and the surrounding support structure tends to restrain movement of the base member 1171 and therefore much of the applied force is transferred through the lower collar member 1103 to the arm member 1100 which causes the arm member 1100 to rotate. Thus, the advantageous assembly collapsing activity described above occurs.

While the invention may be susceptible to various modifications and alternative forms, specific embodiments have been shown by way of example in the drawings and have been described in detail herein. However, it should be understood that the invention is not intended to be limited to the particular forms disclosed. For example, while the assembly 10 above is described as, in at least one embodiment, including a base subassembly, a lower arm subassembly, an upper arm subassembly and pan/tilt subassembly, there are various aspects of at least some of the subassemblies that are considered inventive in and of themselves and, in those cases, the other subassemblies may be optional. For example, the concept of providing a four bar link upper arm subassembly where lateral sides therefore are open is considered novel in and of itself. Similarly, the frustro-conical and ribbed bushings are considered novel in the support arm assembly application.

In addition, while upper arm subassembly 18 is described above as including first and second cover members 190 and 192, in at least some embodiments it is contemplated that the cover members may not be provided such that the space between upper and lower link members 184 and 186 is open. Similarly, in other embodiment, one of the cover members 190 or 192 may be relatively more permanently attached in its space enclosing position while the other cover member is easily removably for gaining access to the space between links 184 and 816.

Moreover, while upper arm subassembly 18 is described above as including a force adjusting mechanism, in at least some cases there may be no force adjusting mechanism. In some case lower arm subassembly 16 may not form an internal channel 148 and instead, retaining members similar to members 194 (see again FIG. 5) may be provided that attach to subassembly 16 for holding cables/wires adjacent thereto.

In addition, while the bushing described above include deformable ribs on an external surface thereof that extend along the length of the bushing, in at least some embodiments it is contemplated that the ribs may be formed on the internal surface of the bushing or both the internal and external surfaces of the bushing. Similarly, instead of providing axially extending ribs, in at least some cases annular ribs may be provided that extend around the circumference of the of the bushing.

Moreover, while the second lower arm assembly that is describe with respect to FIGS. 29-31 includes a relatively complex linkage assembly and a complimentary modified yolk assembly 1191 that has features that are only useful when a lower arm assembly is employed, in at least some cases it is contemplated that other support structure may be provided that could be used with the modified yolk assembly where a lower arm assembly is not required. For instance, see the supporting structures shown in FIGS. 26-28 as examples of other types of supporting structures.

Thus, the invention is to cover all modifications, equivalents, and alternatives falling within the spirit and scope of the invention as defined by the following appended claims.

To apprise the public of the scope of this invention, the following claims are made:

What is claimed is:

1. An assembly for supporting a device for movement between several positions, the assembly comprising:
    a first four-bar subassembly including proximate and distal ends;
    a pan-tilt subassembly including first and second end members at proximate and distal ends and first and second link members that pivot about substantially parallel axis at the first and second end members, respectively, the distal end of the first four-bar subassembly linked to the proximate end of the pan-tilt subassembly for rotation about an additional axis that is substantially perpendicular to the parallel axis, the distal end of the pan-tilt subassembly linked to the device;
    a base and a third arm subassembly between the base and the device, the third arm subassembly linked between the base and the first four-bar sub-assembly;
    wherein the third arm subassembly includes first and second curved sections and a substantially straight section between the first and second curved sections and wherein oppositely facing ends of the first and second curved sections extend along substantially parallel first and second trajectories.

2. The apparatus of claim 1 wherein an elongated member extends generally along an axis that forms first and second angles with each of the first and second trajectories, respectively, where each of the first and second angles is between 5 and 30 degrees.

3. The apparatus of claim 2 wherein the elongated member is tubular.

4. The apparatus of claim 1 wherein the first ends of the first and second link members are mounted closer together than the second ends of the first and second link members.

5. The apparatus of claim 1 wherein the first four-bar subassembly includes proximate and distal ends, each of the base and the distal end of the third arm subassembly form couplers of a first construction and each of the proximate end of the first four-bar subassembly and the proximate end of the third arm subassembly form a coupler of a second construction, each of the second construction couplers configured to couple with either of the first construction couplers.

6. The apparatus of claim 1 wherein the device is a flat panel display.

7. An assembly for supporting a device for movement between several positions, the assembly comprising:
a first four-bar subassembly including proximate and distal ends;
a pan-tilt subassembly including first and second end members at proximate and distal ends and first and second link members that pivot about substantially parallel axis at the first and second end members, respectively, the distal end of the first four-bar subassembly linked to the proximate end of the pan-tilt subassembly for rotation about an additional axis that is substantially perpendicular to the parallel axis;
wherein the first four-bar subassembly includes proximate and distal ends, each of the base and the distal end of the second arm subassembly form couplers of a first construction and each of the proximate end of the first four-bar subassembly and the proximate end of the second arm subassembly form a coupler of a second construction, each of the second construction couplers configured to couple with either of the first construction couplers; and
wherein each of the couplers of the first construction forms one of a cavity and a post and each of the couplers of the second construction forms the other of a cavity and a post and wherein the posts are dimensioned to be receivable within the cavities to facilitate rotation about common cup-post axis.

8. A variably configurable kit assembly for adjustably supporting a device, the assembly comprising:
a base forming a first coupler of a first construction;
an arm assembly linking the base to the device, the arm assembly comprising:
a first arm subassembly including proximate and distal ends and forming a first coupler of a second construction at the proximate end and a second coupler of the first construction at the distal end; and
a second arm subassembly including proximate and distal ends and forming a second coupler of the second construction at the proximate end and supporting the device at the distal end, wherein the second arm subassembly includes at least one four-bar subassembly;
wherein, each of the second construction couplers is configured to be couplable to either of the first construction couplers.

9. The assembly of claim 8 wherein each of the first construction couplers forms one of a cup and a post and each of the second construction couplers forms the other of a cup and a post and wherein the posts are dimensioned to be receivable within the cups to facilitate rotation about an axis common to the coupled post and cup.

10. The assembly of claim 9 wherein each of the first construction of couplers forms a cup that narrows from an upper end to a lower end and each of the second construction couplers forms a post that narrows from an upper end to a lower end.

11. The assembly of claim 10 further including a frusto-conical bushing between each pair of adjacent first and second couplers.

12. The assembly of claim 8 wherein the arm assembly can be configured with the proximate ends of the first arm subassembly and the second arm subassembly coupled to the base and the distal end of the first arm subassembly, respectively and wherein the arm assembly can be configured with the proximate end of the second arm subassembly coupled to the base.

13. The assembly of claim 8 further including a device mount subassembly including proximal and distal ends, the mount subassembly forming a first coupler of a third construction at the distal end, the second arm subassembly forming a first coupler of a fourth construction configured to be couplable to a coupler of the third construction.

14. The assembly of claim 13 further including a third arm subassembly including proximate and distal ends and forming a third coupler of the second construction at the proximate end and a second coupler of the fourth construction.

15. The assembly of claim 14 wherein each of the second and the third arm subassemblies has a length dimension and wherein the length dimension of the second arm subassembly is greater than the length dimension of the third arm subassembly.

16. A variably configurable kit assembly for adjustably supporting a device, the assembly comprising:
a base forming a first coupler of a first construction;
an arm assembly linking the base to the device, the arm assembly comprising:
a first arm subassembly including proximate and distal ends and forming a first coupler of a second construction at the proximate end and a second coupler of the first construction at the distal end; and
a second arm subassembly including proximate and distal ends and forming a second coupler of the second construction at the proximate end and supporting the device at the distal end;
wherein, each of the second construction couplers is configured to be couplable to either of the first construction couplers;
wherein the base includes a first base for mounting a work surface and wherein the assembly further includes at least a second base for mounting to a vertical surface wherein the second base forms an additional coupler of the first base configured to optionally receive any of the couplers of the first base.

17. The assembly of claim 16 wherein the second base coupler includes a clip for mounting the second base to a slat wall.

18. The assembly of claim 17 wherein the first arm subassembly includes a four-bar mechanism and the second arm subassembly includes a fixed member.

19. An arm assembly for adjustably supporting a flat panel display, the assembly comprising:
a first arm member including proximate and distal ends and including a surface that forms one of an open ended frusto-conical cavity and a frusto-conical post at the distal end;
a second arm member including proximate and distal ends and including a surface that forms the other of the open ended frusto-conical cavity and the frusto-conical post at the proximal end, the display supported by the distal end of the second arm member; and wherein the frusto-conical post is at least partially received within the open ended frusto-conical cavity with the post forming surface facing the cavity facing surface and for rotation about an axis;

a bushing having internal and external surfaces where the internal surface defines a frusto-conical shape that is substantially similar to the shape of the surface forming the post and the external surface defines a frusto-conical shape that is substantially similar to the shape of the surface forming the cavity, the bushing positioned between the surfaces that form the post and cavity, and wherein at least one of the internal surface, the external surface and one of the surfaces that forms the cavity and that forms the post includes at least one malleable and deformable rib.

20. The assembly of claim 19 wherein the internal surface of the bushing is generally a mirror image of the external surface of the bushing.

21. The assembly of claim 19 wherein the bushing further includes at least one malleable and deformable rib that extends from at least one of the internal and external surfaces.

22. The assembly of claim 21 wherein the bushing includes a plurality of malleable and deformable ribs that extend from at least one of the internal and external surfaces.

23. The assembly of claim 22 wherein the ribs extend from the external surface.

24. The assembly of claim 19 wherein the bushing is formed of plastic.

25. The assembly of claim 19 wherein the first arm member forms the cavity at the distal end.

26. The assembly of claim 19 wherein the cavity and the post are a first cavity and a first post, the first arm member also including a surface that forms one of a second open ended frusto-conical cavity and a second frusto-conical post at the proximate end, the assembly further including a base member that forms the other of a second open ended frusto-conical cavity and a second frusto-conical post at the proximate end and a second bushing having internal and external surfaces where the internal surface defines a frusto-conical shape that is substantially similar to the shape of the surface forming the second post and the external surface defines a frusto-conical shape that is substantially similar to the shape of the surface forming the second cavity wherein, the second post is at least partially receivable within the second cavity with the second bushing between the surfaces that form the second post and second cavity and for rotation about an axis.

27. An arm assembly for adjustably supporting a flat panel display, the assembly comprising:

a first arm member including proximate and distal ends and including a surface that forms one of an open ended frusto-conical cavity and a frusto-conical post at the distal end;

a second arm member including proximate and distal ends and including a surface that forms the other of the open ended frusto-conical cavity and the frusto-conical post at the proximal end, the display supported by the distal end of the second arm member; and wherein the frusto-conical post is at least partially received within the open ended frusto-conical cavity with the post forming surface facing the cavity facing surface and for rotation about an axis;

a bushing having internal and external surfaces where the internal surface defines a frusto-conical shape that is substantially similar to the shape of the surface forming the post and the external surface defines a frusto-conical shape that is substantially similar to the shape of the surface forming the cavity, the bushing positioned between the surfaces that form the post and cavity; and wherein an aperture is formed in a base of the cavity and a threaded opening is formed in an end of the post and further including a bolt that extends through the aperture and that is received in the threaded opening to maintain the bushing under a compressive force between the surfaces that form the cavity and the post.

28. The assembly of claim 27 wherein the external surface of the bushing further includes at least one malleable and deformable extending member that deforms when compressed between the surfaces that form the post and the cavity.

29. A tilt apparatus for adjustably mounting a flat panel display to a support member, the apparatus comprising:

a rigid mount member coupled to the flat panel display;

first and second link members, each link member including first and second ends, the first ends of the link members coupled to the support member for pivotal motion about substantially parallel first and second axis where the first and second axis are separated by a first dimension, the second ends of the link members coupled to the rigid mount member for pivotal motion about substantially parallel third and fourth axis where the third and fourth axis are separated by a second dimension that is different than the first dimension;

wherein the first, second, third and fourth axis are substantially horizontal, the support member forms a collar and wherein the first and second link members are coupled to the collar by a coupling including at least one post member that extends into the collar where the post is rotatable about a substantially vertical axis formed by the collar.

30. The apparatus of claim 29 wherein the second dimension is less than the first dimension.

31. The apparatus of claim 29 wherein the mount member is coupled to a rear surface of the display.

32. The apparatus of claim 29 wherein each of the first and second link members includes a generally V-shaped member.

33. The apparatus of claim 32 wherein the first and second ends of each of the link members are at the distal ends of the V-shaped members and each V-shaped member is a rigid member.

34. The apparatus of claim 29 wherein the rigid mount member is coupled to a rear surface of the display device and the first and second link members are configured to facilitate display rotation about a substantially horizontal axis that resides on a side of the rear surface opposite the link members.

35. The apparatus of claim 34 wherein the tilt assembly includes rigid mount member coupled to the rear surface of the display and at least a first member including first and second ends, the first end of the link member coupled to the distal end of the support arm for pivotal motion about a first axis, the second end of the link member coupled to the mount member for pivotal motion about a second axis.

36. A four-bar assembly for use in a support arm for adjustably supporting a device, the assembly comprising:

first and second end members;

a first link member, the first link member including a substantially flat elongated rigid member having first and second lateral edges and first and second ends that are coupled to the first and second end members, respectively;

a second link member, the second link member including a substantially flat elongated rigid member having first and second lateral edges and first and second ends that are coupled to the first and second end members, respectively, so as to be substantially parallel to the first link member with the first lateral edge of the second link member facing in the same direction as the first lateral edge of the first link member;

wherein, a space between the first and second link members is open between the first lateral edges of the first and second link members and between the second lateral edges of the first and second link members; and first and second cover members that are removably coupled to at least one of the end members so as to block the space between the first edges and to block the space between the second edges, respectively.

37. The assembly of claim 36 wherein each of the covers is removably coupled to each of the end members.

38. The assembly of claim 36 wherein each of the first and second end members includes a generally C-shaped member including first and second distal ends, the first ends of the first and second link members linked to the first ends of the end members and the second ends of the first and second link members linked to the second ends of the end members.

39. The assembly of claim 38 further including at least a first cover member removably coupled to at least one of the first and second end members, the cover member including a rectilinear portion and integral semi-circular portions at opposite ends of the rectilinear portion.

40. The apparatus of claim 39 wherein each of the end members includes an extension member that extends between and generally in the same direction as the distal ends of the end member and wherein the cover member is coupled to the extension members at coupling points.

41. The apparatus of claim 40 wherein a coupling point with the first end member extension member is generally midway between the distal ends of the first end member and the coupling point with the second end member extension member is generally midway between the distal ends of the second end member.

42. The assembly of claim 36 wherein the first link member is an upper link member, the assembly further including a spring mechanism including first and second ends wherein the first end is coupled to the first end member and the second end is coupled to the upper link member.

43. The assembly of claim 42 wherein the spring mechanism is a gas spring.

44. The assembly of claim 42 wherein an adjusting mechanism is provided at one of the first and second ends of the spring mechanism for adjusting the force applied by the spring mechanism to the upper link member.

45. The assembly of claim 36 further including at least one retaining member mounted to an external surface of at least one of the first and second link members for retaining wires adjacent the external surface.

46. A tilt apparatus for adjustably mounting a flat panel display to a support member, the apparatus comprising:

a rigid mount member coupled to the flat panel display; and first and second link members, each link member including first and second ends, the first ends of the link members coupled to the support member for pivotal motion about substantially parallel first and second axis where the first and second axis are separated by a first dimension, the second ends of the link members coupled to the rigid mount member for pivotal motion about substantially parallel third and fourth axis where the third and fourth axis are separated by a second dimension that is different than the first dimension;

wherein the first and second axis are misaligned and wherein the third and fourth axis are misaligned.

47. A tilt apparatus for adjustably mounting a flat panel display to a support member, the apparatus comprising:

a rigid mount member coupled to the flat panel display; and first and second link members, each link member including first and second ends, the first ends of the link members coupled to the support member for pivotal motion about substantially parallel first and second axis where the first and second axis are separated by a first dimension, the second ends of the link members coupled to the rigid mount member for pivotal motion about substantially parallel third and fourth axis where the third and fourth axis are separated by a second dimension that is different than the first dimension;

wherein the second dimension is permanent and is set by the rigid mount member.

48. The apparatus of claim 47 wherein the first and second axis are substantially horizontal.

49. The apparatus of claim 47 wherein each of the first and second link members includes a substantially V-shaped and rigid member and wherein the first end of each of the link members is located at a first distal end of the V-shaped member and the second end of each of the link members is located at a second distal end of the V-shaped member.

50. The apparatus of claim 47 wherein the rigid mount member is a single integral member and wherein the first and second link members are directly connected to the rigid mount member.

51. The apparatus of claim 50 wherein each of the link members is a rigid member.

* * * * *